United States Patent
Takashima et al.

(10) Patent No.: US 9,413,531 B2
(45) Date of Patent: Aug. 9, 2016

(54) CRYPTOGRAPHIC SYSTEM, CRYPTOGRAPHIC METHOD, CRYPTOGRAPHIC PROGRAM, AND DECRYPTION DEVICE

(71) Applicants: Mitsubishi Electric Corporation, Chiyoda-ku (JP); NIPPON TELEGRAPH AND TELEPHONE CORPORATION, Chiyoda-ku (JP)

(72) Inventors: Katsuyuki Takashima, Tokyo (JP); Tatsuaki Okamoto, Tokyo (JP)

(73) Assignees: Mitsubishi Electric Corporation, Chiyoda-ku (JP); NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 14/395,655

(22) PCT Filed: Jul. 17, 2013

(86) PCT No.: PCT/JP2013/069368
§ 371 (c)(1),
(2) Date: Oct. 20, 2014

(87) PCT Pub. No.: WO2014/021102
PCT Pub. Date: Feb. 6, 2014

(65) Prior Publication Data
US 2015/0098566 A1    Apr. 9, 2015

(30) Foreign Application Priority Data

Jul. 31, 2012  (JP) ................ 2012-170001

(51) Int. Cl.
*H04L 9/30* (2006.01)
*H04L 9/08* (2006.01)

(52) U.S. Cl.
CPC .............. *H04L 9/0861* (2013.01); *H04L 9/088* (2013.01); *H04L 9/3073* (2013.01); *H04L 9/3093* (2013.01); *H04L 2209/24* (2013.01)

(58) Field of Classification Search
CPC ............. H04L 9/00; H04L 9/065; H04L 9/08; H04L 9/0816; H04L 9/0861; H04L 9/088; H04L 9/30; H04L 9/3066; H04L 9/3073; H04L 9/3093; H04L 2209/24
See application file for complete search history.

(56) References Cited

U.S. PATENT DOCUMENTS 5,613,005 A * 3/1997 Murakami ................ H04L 9/12
 380/243
7,634,085 B1   12/2009 Sahai et al.
(Continued)

FOREIGN PATENT DOCUMENTS

JP    2011-232475    11/2011

OTHER PUBLICATIONS

International Search Report issued Aug. 13, 2013, in PCT/JP2013/069368, filed Jul. 17, 2013.
(Continued)

*Primary Examiner* — Eric W Shepperd
(74) *Attorney, Agent, or Firm* — Oblon, McClelland, Maier & Neustadt, L.L.P

(57) ABSTRACT

In a functional encryption scheme where a decryption key dk can decrypt a ciphertext encrypted by an encryption key ek, when decrypting the encryption key in which a parameter $\Phi$ is set, by the decryption key dk in which a parameter $\Psi$ is set, if and only if a relation $R(\Phi, \Psi)$ holds, a wider range as a relation R is expressed. Of first information including a polynomial $d(x)$, plural polynomials $D_i(x)$, and predicate information, and second information including attribute information, a cryptographic system treats one as a ciphertext and a remaining one as a decryption key. A decryption device, based on the predicate information and attribute information, selects at least one of polynomials $D_i(x)$, and calculates a coefficient $\Delta_i$ enabling a polynomial constituted based on a polynomial $\Delta_i D_i(x)$ to be divided out by a polynomial $d(x)$, the polynomial $\Delta_i D_i(x)$ obtained by multiplying the selected polynomial $D_i(x)$ by coefficient $\Delta_i$.

12 Claims, 13 Drawing Sheets

(56) References Cited

U.S. PATENT DOCUMENTS

| | | | | |
|---|---|---|---|---|
| 8,532,289 | B2* | 9/2013 | Gentry | H04L 9/008 380/277 |
| 2002/0027986 | A1* | 3/2002 | Brekne | H04L 9/3073 380/28 |
| 2003/0152234 | A1* | 8/2003 | Matsushita | H04L 9/0891 380/277 |
| 2004/0165726 | A1* | 8/2004 | Yamamichi | H04L 9/085 380/277 |
| 2006/0034452 | A1* | 2/2006 | Tonomura | G06F 7/724 380/28 |
| 2006/0239459 | A1* | 10/2006 | Yamamichi | H04L 9/3093 380/255 |
| 2008/0098213 | A1* | 4/2008 | Kevenaar | H04L 9/3263 713/156 |
| 2009/0080658 | A1 | 3/2009 | Waters et al. | |
| 2011/0200185 | A1* | 8/2011 | Ghouti | H04L 9/3066 380/28 |
| 2012/0039463 | A1* | 2/2012 | Gentry | H04L 9/008 380/28 |
| 2013/0028415 | A1 | 1/2013 | Takashima et al. | |
| 2013/0114815 | A1* | 5/2013 | Nishimaki | H04L 9/0836 380/278 |
| 2013/0339722 | A1* | 12/2013 | Krendelev | H04L 9/008 713/150 |
| 2014/0229741 | A1* | 8/2014 | Mathew | G06F 21/72 713/189 |

OTHER PUBLICATIONS

Tatsuaki Okamoto, et al., "Fully Secure Functional Encryption with General Relations from the Decisional Linear Assumption", CRYPTO, LNCS, vol. 6223, 2010, pp. 191-208.

Rosario Gennaro, et al., "Quadratic Span Programs and Succinct NIZKs without PCPs", http://eprint.iacr.org/2012/215, Jun. 18, 2012, 56 pages.

Tatsuaki Okamoto, et al., "Homomorphic Encryption and Signatures from Vector Decomposition", PAIRING, LNCS, vol. 5209, 2008, pp. 57-74.

Tatsuaki Okamoto, et al., "Hierarchical Predicate Encryption for Inner-Products", ASIACRYPT, LNCS, vol. 5912, 2009, pp. 214-231.

Tatsuaki Okamoto, et al., "Efficient Attribute-Based Signatures for Non-monotone Predicates in the Standard Model", PKC, LNCS, vol. 6571, 2011, pp. 35-52.

Tatsuaki Okamoto, et al., "Decentralized Attribute-Based Signatures", http://eprint.iacr.org/2011/701, Dec. 23, 2011, 57 pages.

Jonathan Katz, et al., "Predicate Encryption Supporting Disjunctions, Polynomial Equations, and Inner Products", EUROCRYPT, 2008, pp. 146-162.

Brent Waters, "Dual System Encryption: Realizing Fully Secure IBE and HIBE under Simple Assumptions", CRYPTO, LNCS, vol. 5677, 2009, pp. 619-636.

Allison Lewko, et al., "New Techniques for Dual System Encryption and Fully Secure HIBE with Short Ciphertexts", EPRINT, IACR, http://eprint.iacr.org/2009/482, 2009, 22 pages.

Allison Lewko, et al., "Fully Secure Functional Encryption: Attribute-Based Encryption and (Hierarchical) Inner Product Encryption", EPRINT, EUROCRYPT, 2010, 56 pages.

Tatsuaki Okamoto, et al., "Adaptively Attribute-Hiding (Hierarchical) Inner Product Encryption", CRYPTOLOGY EPRINT, http://eprint.iacr.org/2011/543, 2011, 33 pages.

Allison Lewko, et al., "Decentralizing Attribute-Based Encryption", EPRINT, http://eprint.iacr.orq/2010/351, 2010, 29 pages.

Tatsuaki Okamoto, et al., "Achieving Short Ciphertexts or Short Secret-Keys for Adaptively Secure General Inner-Product Encryption", CANS, LNCS, vol. 7092, 2011, pp. 138-159.

Allison Lewko, et al., "Unbounded HIBE and Attribute-Based Encryption", EUROCRYPT, LNCS, 2011, 57 pages.

Extended European Search Report mailed Mar. 7, 2016 in European Patent Application No. 13824763.0.

* cited by examiner

CRYPTOGRAPHIC SYSTEM, CRYPTOGRAPHIC METHOD, CRYPTOGRAPHIC PROGRAM, AND DECRYPTION DEVICE

TECHNICAL FIELD

The present invention to a functional encryption scheme which utilizes the notion of quadratic span program.

BACKGROUND ART

The functional encryption scheme is an encryption scheme that provides more sophisticated and flexible relations between an encryption key ek and a decryption key dk.

According to the functional encryption scheme, a parameter Φ and a parameter Ψ are respectively set in the encryption key ek and the decryption key dk. The decryption key dk can decrypt a ciphertext encrypted by the encryption key ek if and only if a relation R(Φ, Ψ) holds.

Non-Patent Literature 3 describes the functional encryption scheme.

Non-Patent Literature 6 describes the quadratic span program.

CITATION LIST

Non-Patent Literature

Non-Patent Literature 1: Okamoto, T, Takashima, K.: Homomorphic encryption and signatures from vector decomposition. in: Galbraith, S.D., Paterson, K.G. (eds.) Pairing 2008. LNCS, vol. 5209, pp. 57-74, Springer Heidelberg (2008)

Non-Patent Literature 2: Okamoto, T., Takashima, K.: Hierarchical predicate encryption for inner-products, In: ASIACRYPT 2009, Springer Heidelberg (2009)

Non-Patent Literature 3: Okamoto, T., Takashima, K.: Fully secure functional encryption with general relations from the decisional linear assumption. In: Rabin, T. (ed.) CRYPTO 2010. LNCS, vol. 6223, pp. 191-208. Springer Heidelberg (2010). Full version is available at the Cryptology ePrint Archive website Non-Patent Literature 4: Okamoto, T., Takashima, K.: Efficient attribute-based signatures for non-monotone predicates in the standard model, in: PKC 2011, Springer Heidelberg (2011)

Non-Patent Literature 5: Okamoto, T., Takashima, K.:Decentralized Attribute-Based Signatures the Cryptology ePrint Archive website Non-Patent Literature 6: Rosario Gennaro and Craig Gentry and Bryan Parno and Mariana R.aykova: Quadratic Span Programs and Succinct NIZKs without PCPs the Cryptology ePrint Archive website

SUMMARY OF INVENTION

Technical Problem

The functional encryption scheme described in Non-Patent Literature 3 is a scheme that utilizes linear span program. This functional encryption scheme can express only a limited range as a relation R.

It is an object of the present invention to provide a functional encryption scheme which, by utilizing the notion of quadratic span program, can express a wider range as the relation R.

Solution to Problem

A cryptographic system according to the present invention includes:

an encryption device which generates one of first information including a quadratic span program and second information including attribute information, as a ciphertext; and a decryption device which, treating a remaining one of the first information and the second information, as a decryption key, if the quadratic span program accepts the attribute information, decrypts the ciphertext based on information obtained from the quadratic span program and the attribute information.

Advantageous Effects of Invention

The cryptographic system according to the present invention utilizes the notion of the quadratic span program, so that an ideal range can be expressed as the relation R.

DESCRIPTION OF EMBODIMENTS

Figure 1:
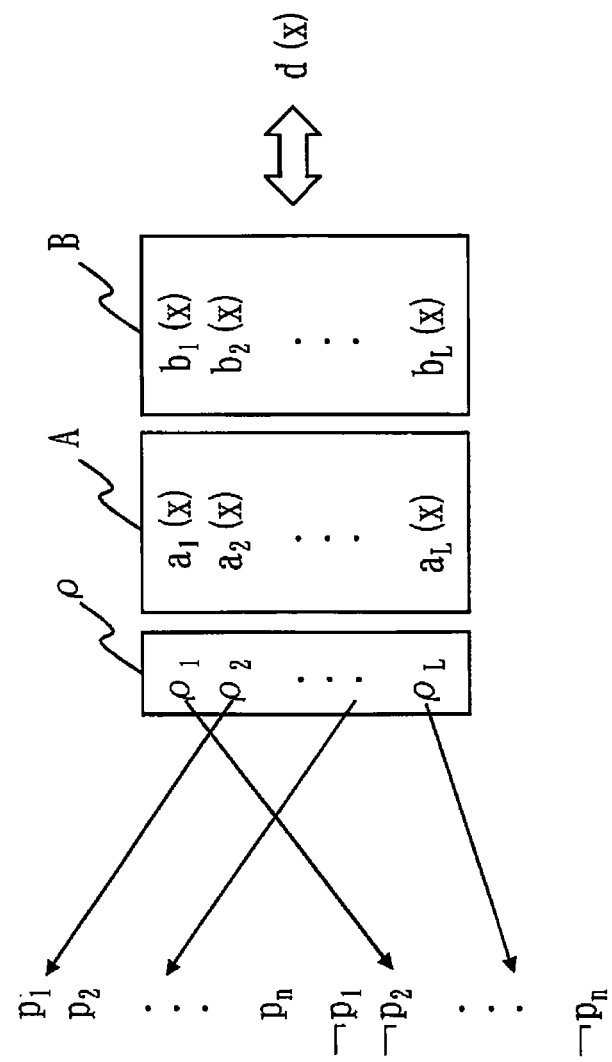
FIG. 1 is an explanatory drawing of a quadratic span program.

Embodiments of the present invention will be described hereinafter with reference to the accompanying drawings.

In the following description, a processing device is a CPU 911 (to be described later) and the like. A storage device is a ROM 913, a RAM 914, a magnetic disk 920 (each will be described later), and the like. A communication device is a communication board 915 (to be described later) and the like. An input device is a keyboard 902, the communication board 915 (each will be described later), and the like. Namely, the processing device, the storage device, the communication device, and the input device are hardware.

The notation in the following description will be explained.

When A is a random variable or distribution, Formula 101 denotes that y is randomly selected from A according to the distribution of A. Namely, in Formula 101, y is a random number.

$$y \xleftarrow{R} A \qquad \text{[Formula 101]}$$

When A is a set, Formula 102 denotes that y is uniformly selected from A. Namely, in Formula 102, y is a uniform random number.

$$y \xleftarrow{U} A \quad \text{[Formula 102]}$$

Formula 103 denotes that y is a set, defined or substituted by z.

$$y := z \quad \text{[Formula 103]}$$

When a is a fixed value, Formula 104 denotes an event that a machine (algorithm) A outputs a on input x.

$$A(x) \to a \quad \text{[Formula 104]}$$

For example, $$A(x) \to 1$$

Formula 105, namely, $F_q$, denotes a finite field of order q.

$$\mathbb{F}_q \quad \text{[Formula 105]}$$

A vector symbol denotes a vector representation over the finite field $F_q$. Namely, Formula 106 is established.

$\vec{x}$ denotes $$(x_1, \ldots, x_n) \in \mathbb{F}_q^n \quad \text{[Formula 106]}$$

Formula 107 denotes the inner-product, indicated by Formula 109, of two vectors $\vec{x}$ and $\vec{v}$ indicated in Formula 108.

$$\vec{x} \cdot \vec{v} \quad \text{[Formula 107]}$$

$$\vec{x} = (x_1, \ldots, x_n),$$
$$\vec{v} = (v_1, \ldots, v_n) \quad \text{[Formula 108]}$$

$$\Sigma_{i=1}^{n} x_i v_i \quad \text{[Formula 109]}$$

Note that $X^T$ denotes the transpose of matrix M.

When $b_i$ (i=1, ..., n) is an element of a vector in a space V, namely, when Formula 110 is established, Formula 111 denotes the subspace generated by Formula 112.

$$b_i \in \mathbb{V} \, (i=1, \ldots, n) \quad \text{[Formula 110]}$$

$$\text{span}\langle b_1, \ldots, b_n \rangle \subseteq \mathbb{V} \, (\text{resp. span}\langle \vec{x}_1, \ldots, \vec{x}_n \rangle) \quad \text{[Formula 111]}$$

$$b_1, \ldots, b_n (\text{resp. } \vec{x}_1, \ldots, \vec{x}_n) \quad \text{[Formula 112]}$$

Note that for bases B and B* indicated in Formula 113, Formula 114 is established.

$$\mathbb{B} := (b_1, \ldots, b_N),$$
$$\mathbb{B}^* := (b_1^*, \ldots, b_N^*) \quad \text{[Formula 113]}$$

$$(x_1, \ldots, x_N)_{\mathbb{B}} := \Sigma_{i=1}^{N} x_i b_i,$$
$$(y_1, \ldots, y_N)_{\mathbb{B}^*} := \Sigma_{i=1}^{N} y_i b_i^* \quad \text{[Formula 114]}$$

In the following description, when "Vt" is indicated as a subscript or superscript, Vt is $V_t$. Likewise, when "δi,j" is indicated as a superscript, δi,j is $\delta_{i,j}$. Likewise, when "fτ" and "κτ" are indicated as superscripts, fτ is $f_\tau$, and κτ is $\kappa_\tau$.

When "→" indicating a vector is attached to a subscript or superscript, "→" is attached as a superscript to the subscript or superscript.

In the following description, a cryptographic process includes a key generation process, an encryption process, and a decryption process.

Embodiment 1.

This embodiment describes a basic concept of the functional encryption scheme that utilizes the quadratic span program, and the outline of the functional encryption scheme that utilizes the quadratic span program.

First, a space having a rich mathematical structure called "dual pairing vector spaces (DPVS)" which is a space for implementing the functional encryption scheme will be described.

Second, a concept for implementing the functional encryption scheme will be described. Here, "quadratic span program", "equalities of attribute information, and quadratic span program", and "secret distribution scheme" will be described.

Third, the outline of the functional encryption scheme that utilizes the quadratic span program will be described.

<2. Dual Pairing Vector Spaces>

First, symmetric bilinear pairing groups will be described. The symmetric bilinear pairing groups (q, G, $G^T$, g, e) are a tuple of a prime q, a cyclic additive group G of order q, a cyclic multiplicative group $G^T$ of order q, g≠0∈G, and a polynomial-time computable nondegenerate bilinear pairing e:G× G→$G_T$. The nondegenerate bilinear pairing signifies e(sg, tg)=e(g, g)$^{st}$ where e(g, g)≠1.

In the following description, let $G_{bpg}$ be an algorithm that takes as input $1^\lambda$ and outputs the value of a parameter param$_G$ := (q, G, $G_T$, g, e) of bilinear pairing groups with a security parameter λ.

Dual pairing vector spaces will now be described.

The dual pairing vector spaces (q, V, $G_T$, A, e) can be constituted by a direct product of symmetric bilinear pairing groups (param$_G$:=(q, G, $G_T$, g, e)). The dual pairing vector spaces (q, V, $G_T$, A, e) are a tuple of a prime q, an N-dimensional vector space V over $F_q$ indicated in Formula 115, a cyclic group $G_T$ of the order q, and a canonical basis A:= ($a_1, \ldots, a_N$) of a space V, and have the following operations (1) and (2) where $a_i$ is as indicated by Formula 116.

$$\mathbb{V} := \overbrace{\mathbb{G} \times \ldots \times \mathbb{G}}^{N} \quad \text{[Formula 115]}$$

$$a_i := (\overbrace{0, \ldots, 0}^{i-1}, g, \overbrace{0, \ldots, 0}^{N-i}) \quad \text{[Formula 116]}$$

Operation (1): Nondegenerate Bilinear Pairing

The pairing on the space V is defined by Formula 117.

$$e(x,y) := \Pi_{i=1}^{N} e(G_i, H_i) \in \mathbb{G}_T \quad \text{[Formula 117]}$$

where $$(G_1, \ldots, G_N) := x \in \mathbb{V},$$

$$(H_1, \ldots, H_N) := y \in \mathbb{V}$$

This is nondegenerate bilinear, i.e., e(sx, ty)=e(s, y)$^{st}$ and if e(x, y)=1 for all y∈V then x=0. For all i and j, e($a_i$, $a_j$)=e(g, g)$^{\delta_{i,j}}$ where $\delta_{i,j}$=1 if i=j, and $\delta_{i,j}$=0 if i≠j. Also, e(g, g)≠1∈$G_T$.

Operation (2): Distortion Maps

Linear transformation $\phi_{i,j}$ on the space V indicated in Formula 118 can achieve Formula 119.

$$\phi_{i,j}(a_j) = a_i \text{ if } k \neq j \text{ then } \phi_{i,j}(a_k) = 0 \quad \text{[Formula 118]}$$

$$\phi_{i,j}(x) := (\overset{i-1}{\overbrace{0,\ldots,0}}, g_j, \overset{N-i}{\overbrace{0,\ldots,0}}) \quad \text{[Formula 119]}$$

Note that $(g_1,\ldots g_N) := x$

Linear transformation $\phi_{i,j}$ will be called distortion maps.

In the following description, let $G_{dpvs}$ be an algorithm that takes as input, $1^\lambda$ ($\lambda\in$ natural number), N$\in$natural number, and the values of the parameter param$_G$:=(q, G, $G_T$, g, e) of bilinear pairing groups, and outputs the value of a parameter param$_v$:=(q, V, $G_T$, A, e) of dual pairing vector spaces which have a security parameter $\lambda$ and which form an N-dimensional space V.

A case will be described where dual pairing vector spaces are constructed from the symmetric bilinear pairing groups described above. Dual pairing vector spaces can be constructed from asymmetric bilinear pairing groups as well. The following description can be easily applied to a case where dual pairing vector spaces are constructed from asymmetric bilinear pairing groups.

<2. Concept for Implementing Functional Encryption>
<2-1. Quadratic Span Program>

FIG. 1 is an explanatory drawing of a quadratic span program.

The quadratic span program over the field $F_q$ includes two polynomial sets, i.e., a set A={$a_i(x)$|i$\in$ {0, ..., L}} and a set B={$b_i(x)$|i$\in$ {0, ..., L}}, and a target polynomial d(x). The quadratic span program includes a label $\rho$ of a set I:={1, ..., L}. All labels $\rho_i$ (i=1, ..., L) are each related to one literal of {$p_0, p_1, \ldots, p_n, \neg p_1, \ldots, \neg p_n$}, namely, $\rho$:I→{$p_0, p_1, \ldots, p_n, \neg p_1, \ldots, \neg p_n$}.

For an input u:=($u_1, \ldots, u_n$)$\in$ {0, 1}$^n$, a true value T of the literal is set from T($p_j$):=$u_j$ and T($\neg p_j$):=$\neg u_j$ concerning each integer j of j=1, ..., n. For any input u, 1 is set as the true value T of $p_0$. Namely, T($p_0$):=1.

A subset $I_u$ of the set I is constructed from the elements of a label for which 1 is set upon input u. Namely, $I_u$:={i$\in$I|T($\rho$(i))=1}. Alternatively, $I_u$:={i$\in$I|[$\rho$(i)=$p_j \wedge u_j$=1] $\vee$ [$\rho$(i)=$\neg p_j \wedge u_j$=0] $\vee$ [$\rho$(i)=$p_0$]}.

Figure 2:
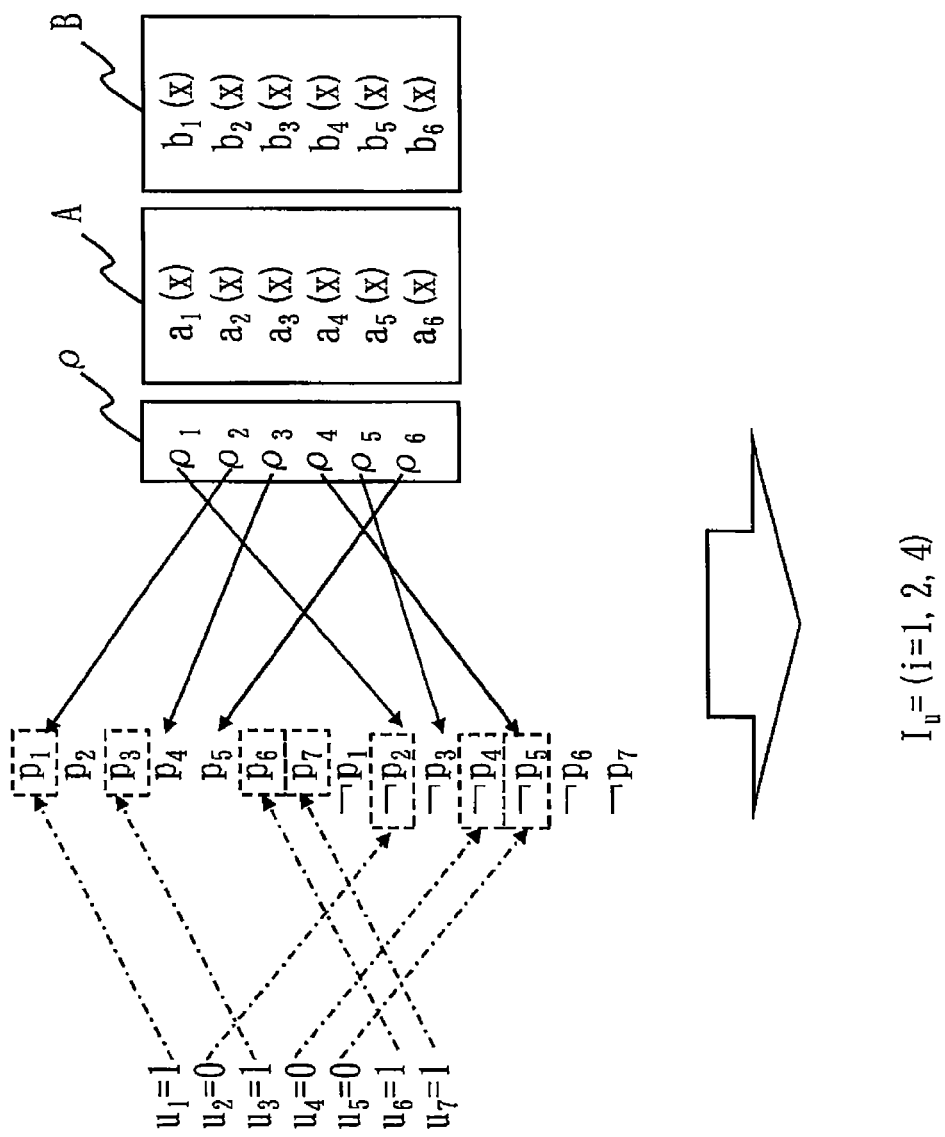
FIG. 2 is an explanatory drawing of a subset $I_u$.

FIG. 2 is an explanatory drawing of the subset $I_u$.

Note that in FIG. 2, n=7 and L=6. Also, in FIG. 2, assume that the labels $\rho$ are related such that $\rho_1$ corresponds to $\neg p_2$, $\rho_2$ to $p_1$, $\rho_3$ to $p_4$, $\rho_4$ to $\neg p_5$, $\rho_5$ to $\neg p_3$, and $\rho_6$ to $p_5$.

Regarding input u:=($u_1, \ldots, u_7$)$\in$ {0, 1}$^7$, assume that $u_1$=1, $u_2$=0, $u_3$=1, $u_4$=0, $u_5$=0, $u_6$=1, and $u_7$=1. In this case, the subset $I_u$ consists of elements i of labels $\rho_i$ related to literals ($p_1, p_3, p_6, p_7, \neg p_2, \neg p_4, \neg p_5$) surrounded by broken lines. That is, the subset $I_u$ consists of the elements i of labels $\rho_1, \rho_2,$ and $\rho_4$, thus the subset $I_u$:={i=1, 2, 4}.

The quadratic span program accepts input u$\in$ {1, 0}$^n$ (or accepts the subset $I_u$) if and only if a tuple of ($\alpha_1, \ldots, \alpha_L$) and ($\beta_1, \ldots, \beta_L$) exists where $\alpha_i$=0=$\beta_i$ concerning every i not included in the subset $I_u$, the tuple of ($\alpha_1, \ldots, \alpha_L$) and ($\beta_1, \ldots, \beta_L$) being a tuple over a field $F_q^L$ in which the target polynomial d(x) divides out Formula 120. Otherwise, the quadratic span program rejects input u$\in$ {1, 0}$^n$.

$$\left(a_0(x) + \sum_{i=1}^{L} \alpha_i \cdot a_i(x)\right) \cdot \left(b_0(x) + \sum_{i=1}^{L} \beta_i \cdot b_i(x)\right) \quad \text{[Formula 120]}$$

That is, the quadratic span program accepts input u$\in$ {1, 0}$^n$ if and only if a tuple of $\alpha_i$ and $\beta_i$ exists concerning i$\in I_u$ in which the target polynomial d(x) divides out Formula 121.

$$\left(a_0(x) + \sum_{i\in I} \alpha_i \cdot a_i(x)\right) \cdot \left(b_0(x) + \sum_{i\in I} \beta_i \cdot b_i(x)\right) \quad \text{[Formula 121]}$$

If the quadratic span program accepts input u$\in$ {1, 0}$^n$, the tuple of $\alpha_i$ and $\beta_i$ concerning i$\in I_u$ is polynomial-time computable (see Non-Patent Literature 6).

With the example shown in FIG. 2, the quadratic span program accepts input u$\in$ {1, 0}$^n$ if and only if a tuple of $\alpha_i$ and $\beta_i$ exists concerning i$\in I_u$:={i=1, 2, 4} in which the target polynomial d(x) divides out Formula 121.

$$\left(a_0(x) + \sum_{i\in\{1,2,4\}} \alpha_i \cdot a_i(x)\right) \cdot \left(b_0(x) + \sum_{i\in\{1,2,4\}} \beta_i \cdot b_i(x)\right) \quad \text{[Formula 122]}$$

<2-2. Inner-Product of Attributes and Quadratic Span Program>

$U_t$ (t=1, ..., d and $U_t \subset$ {0, 1}*) is a sub-universe and an attribute set. Each $U_t$ includes identification information (t) of the sub-universe and attribute information ($\vec{v}$) expressed as an n-dimensional vector. Namely, $U_t$ is (t, $\vec{v}$)) where t$\in$ {1, ..., d} and $\vec{v} \in F_q^n$.

Let $U_t$:=(t, $\vec{v}$) be p, that is, p:=(t, $\vec{v}$). An explanation will be given on a method of determining the subset L in a quadratic span program Q:=(A, B, d(x), $\rho$) by $p_j$:=(t, $\vec{v}_j$) (j=1, ..., n; t$\in$ {1, ..., d}).

Let an access structure S be a quadratic span program Q:=(A, B, d(x), $\rho$) accompanying $p_0$ and {$p_i$:= (t, $\vec{v}_j$)}$_{j=1, \ldots, n}$. That is, $\rho$:{1, ..., L}→{$p_0$, (t, $\vec{v}_1$), ..., (t, $\vec{v}_n$), $\neg$ (t, $\vec{v}_1$), ..., $\neg$ (t, $\vec{v}_n$)}. Let $\Gamma$ be an attribute set, that is, $\Gamma$:={(t, $\vec{x}_t$)|$\vec{x}_t \in F_q^n$, 1$\leq$t$\leq$d}. Note that t is a subset of {1, ..., d} and need not be all indexes.

When an attribute set $\Gamma$ is given to the access structure S, a true value T of the literals {$p_0, p_1, \ldots, p_n, \neg p_1, \ldots, \neg p_n$} is determined as follows. T($p_j$):=1 if and only if $p_j$=(t, $\vec{v}_j$) and (t, $\vec{x}_t$)$\in\Gamma$ and $\vec{v}_j \cdot \vec{x}_t$=0. T($\neg p_j$):=1 if and only if $p_j$=$\neg$ (t, $\vec{v}_j$) and (t, $\vec{x}_t$)$\in\Gamma$ and $\vec{v}_j \cdot \vec{x}_t \neq$0. T($p_0$):=1. Otherwise, the true value T is 0.

Also, $I_u$ (=$I_{(\rho,\Gamma)}$:={i$\in$I|T($\rho$(i))=1}, that is, $I_{(\rho,\Gamma)}$:= {i$\in$I|[$\rho$(i)=(t, $\vec{v}_j$)$\wedge$ (t, $\vec{x}_t$)$\in\Gamma\wedge$ ($\vec{v}_j \cdot \vec{x}_t$)=0] $\vee$ [($\rho$(i)=$\neg$ (t, $\vec{v}_j$)$\wedge$ (t, $\vec{x}_t$)$\in\Gamma\wedge \vec{v}_j \cdot \vec{x}_t \neq$0] $\vee$ [$\rho$(i)=$p_0$]}.

<3. Outline of Functional Encryption Scheme>

A functional encryption scheme is constituted by letting one of a decryption key and a ciphertext have the access structure S described above and the other one have the attribute set $\Gamma$.

A functional encryption scheme in which a decryption key has an access structure S is called Key-Policy functional encryption (KP-FE) scheme, and an encryption scheme in which a ciphertext has an access structure S is called Ciphertext-Policy functional encryption (CP-FE) scheme.

The structures of the KP-FE scheme and CP-FE scheme and the structures of cryptographic systems 10 that execute the respective schemes will be described.

<3-1. KP-FE Scheme>

The KP-FE scheme consists of four algorithms: Setup, KeyGen, Enc, and Dec.

(Setup)

The Setup algorithm is a randomized algorithm that takes as input a security parameter $\lambda$ and outputs public parameters pk and a master key sk.

(KeyGen)

The KeyGen algorithm is a randomized algorithm that takes as input an access structure S, the public parameters pk, and the master key sk, and outputs a decryption key $sk_S$.

(Enc)

The Enc algorithm is a randomized algorithm that takes as input a message msg, an attribute set $\Gamma := \{(t, \vec{x}_t) | \vec{x}_t \in F_q^{n_t}, 1 \leq t \leq d\}$, and the public parameters pk, and outputs a ciphertext $ct_\Gamma$.

(Dec)

The Dec algorithm is an algorithm that takes as input the ciphertext $ct_\Gamma$ encrypted under the attribute set $\Gamma$, the decryption key $sk_S$ for the access structure S, and the public parameters pk, and outputs either the message msg or distinguished symbol $\perp$.

Figure 3:
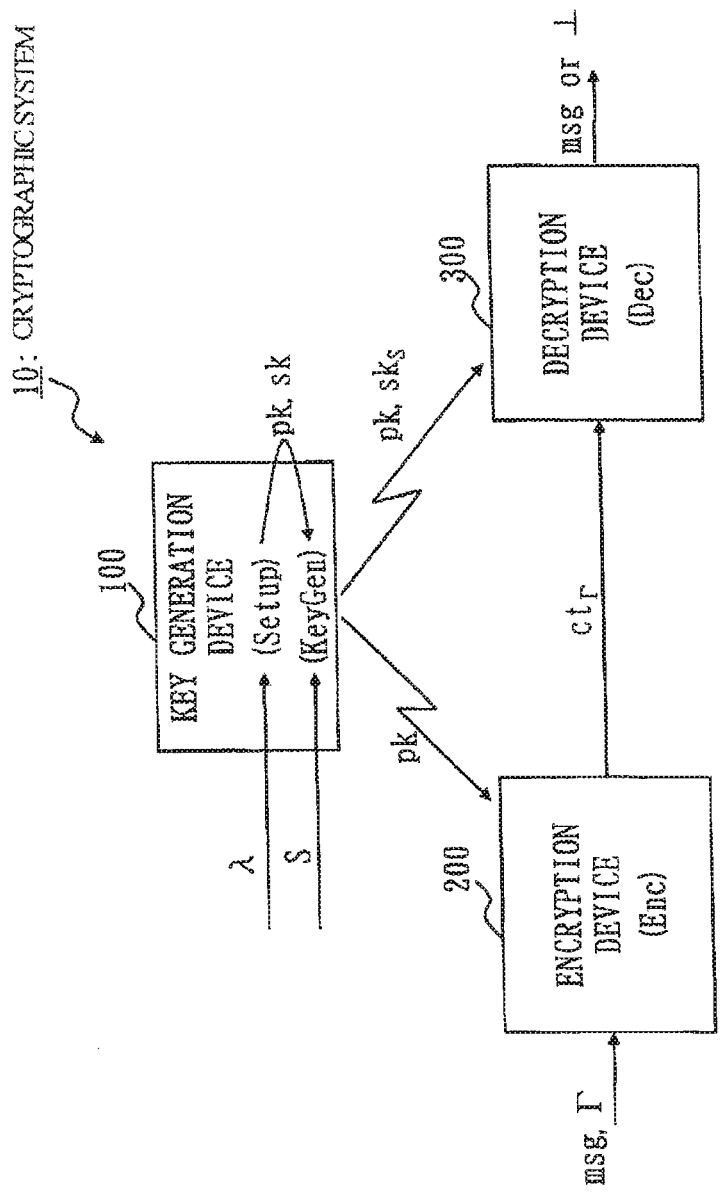
FIG. 3 is a configuration diagram of a cryptographic system 10 which executes a KP-FE scheme.

FIG. 3 is a configuration diagram of a cryptographic system 10 that executes the KP-FE scheme.

The cryptographic system 10 is provided with a key generation device 100, an encryption device 200, and a decryption device 300.

The key generation device 100 executes the Setup algorithm by taking as input a security parameter $\lambda$, and generates public parameters pk and a master key sk. The key generation device 100 publicizes the generated public parameters pk. The key generation device 100 also executes the KeyGen algorithm by taking as input an access structure S, generates a decryption key $sk_S$, and distributes the decryption key $sk_S$ to the decryption device 300 in secrecy.

The encryption device 200 executes the Enc algorithm by taking as input a message msg, an attribute set $\Gamma$, and the public parameters pk, and generates a ciphertext $ct_\Gamma$. The encryption device 200 transmits the generated ciphertext $ct_\Gamma$ to the decryption device 300.

The decryption device 300 executes the Dec algorithm by taking as input the public parameters pk, the decryption key $sk_S$, and the ciphertext $ct_\Gamma$, and outputs a message msg or distinguished symbol $\perp$.

<3-2. CP-FE Scheme>

The CP-FE scheme consists of four algorithms: Setup, KeyGen, Enc, and Dec.

(Setup)

The Setup algorithm is a randomized algorithm that takes as input a security parameter $\lambda$ and outputs public parameters pk and a master key sk.

(KeyGen)

The KeyGen algorithm is a randomized algorithm that takes as input an attribute set $\Gamma := \{(t, \vec{x}_t) | \vec{x}_t \in F_q^{n_t}, 1 \leq t \leq d\}$, the public parameters pk, and the master key sk, and outputs a decryption key $sk_S$.

(Enc)

The Enc algorithm is a randomized algorithm that takes as input a message msg, an access structure S, and the public parameters pk, and outputs a ciphertext $ct_S$.

(Dec)

The Dec algorithm is an algorithm that takes as input the ciphertext $ct_S$ encrypted under the access structure S, a decryption key $sk_\Gamma$ for the attribute set $\Gamma$, and the public parameters pk, and outputs a message msg or distinguished symbol $\perp$.

Figure 4:
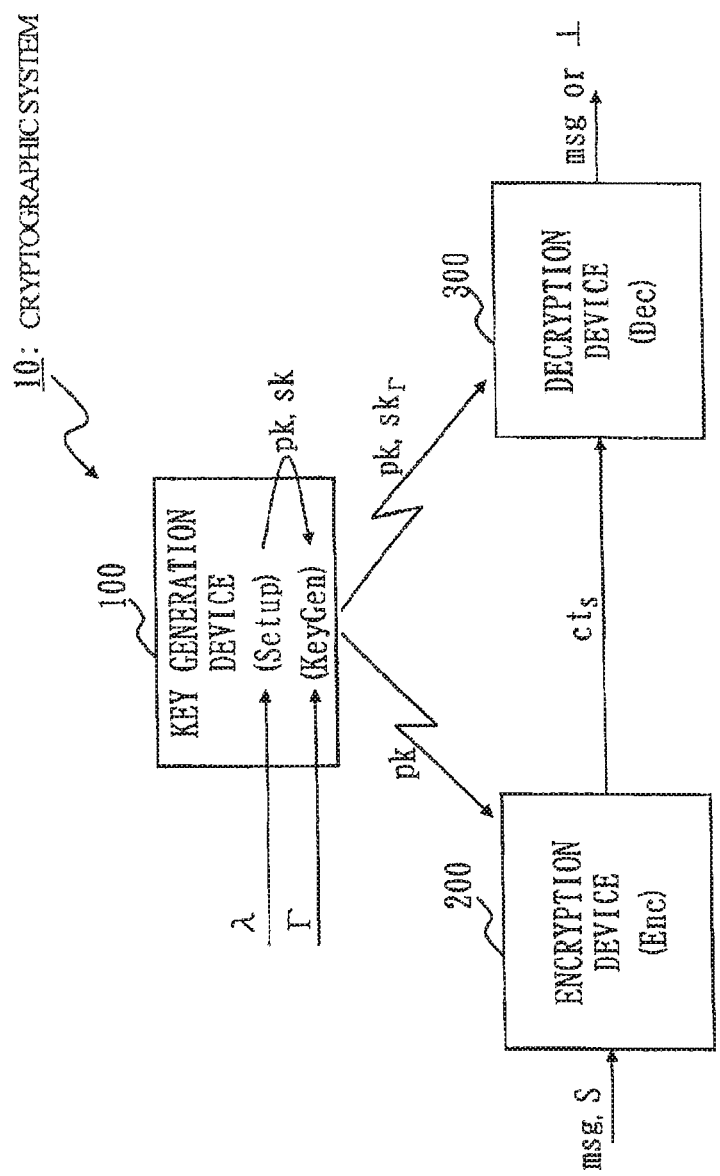
FIG. 4 is a configuration diagram of a cryptographic system 10 which executes a CP-FE scheme.

FIG. 4 is a configuration diagram of a cryptographic processing system 10 that executes the CP-FE scheme.

The cryptographic processing system 10 is provided with a key generation device 100, an encryption device 200, and a decryption device 300.

The key generation device 100 executes the Setup algorithm by taking as input a security parameter $\lambda$ and generates public parameters pk and a master key sk. The key generation device 100 publicizes the generated public parameters pk. The key generation device 100 also executes the KeyGen algorithm by taking as input an attribute set $\Gamma$, generates a decryption key $sk_\Gamma$, and distributes the decryption key $sk_\Gamma$ to the decryption device 300 in secrecy.

The encryption device 200 executes the Enc algorithm by taking as input a message msg, an access structure S, and the public parameters pk, and generates a ciphertext $ct_S$. The encryption device 200 transmits the generated ciphertext $ct_S$ to the decryption device 300.

The decryption device 300 executes the Dec algorithm by taking as input the public parameters pk, the decryption key $sk_\Gamma$, and the ciphertext $ct_S$, and outputs a message msg or distinguished symbol $\perp$.

In both the KP-FE scheme and the CP-FE scheme, with the Dec algorithm, based on the access structure S and the attribute set $\Gamma$, a subset $I_{(\rho,\Gamma)}$ is selected by the method described above, and furthermore a coefficient $(\alpha_1, \ldots, \alpha_L)$ and a coefficient $(\beta_1, \ldots, \beta_L)$ are specified. Based on the subset $I_{(\rho,\Gamma)}$, the coefficient $(\alpha_1, \ldots, \alpha_L)$, and the coefficient $(\beta_1, \ldots, \beta_L)$, the ciphertext $ct_\Gamma$ (or $ct_s$) is decrypted and the message msg is calculated.

Normally, the Setup algorithm is executed only once at the setup of the system. The KeyGen algorithm is executed each time the user decryption key is to be generated. The Enc algorithm is executed each time the message msg is to be encrypted. The Dec algorithm is executed each time the ciphertext is to be decrypted.

In the cryptographic system 10 according to Embodiment 1, the functional encryption scheme is constituted using the access structure S which is based on the quadratic span program. As a result, an ideal range can be expressed as a relation R.

Embodiment 2

In Embodiment 2, an explanation will be given on a configuration example of a functional encryption scheme that utilizes a quadratic span program.

The KP-FE scheme is the example to be explained.

Figure 5:
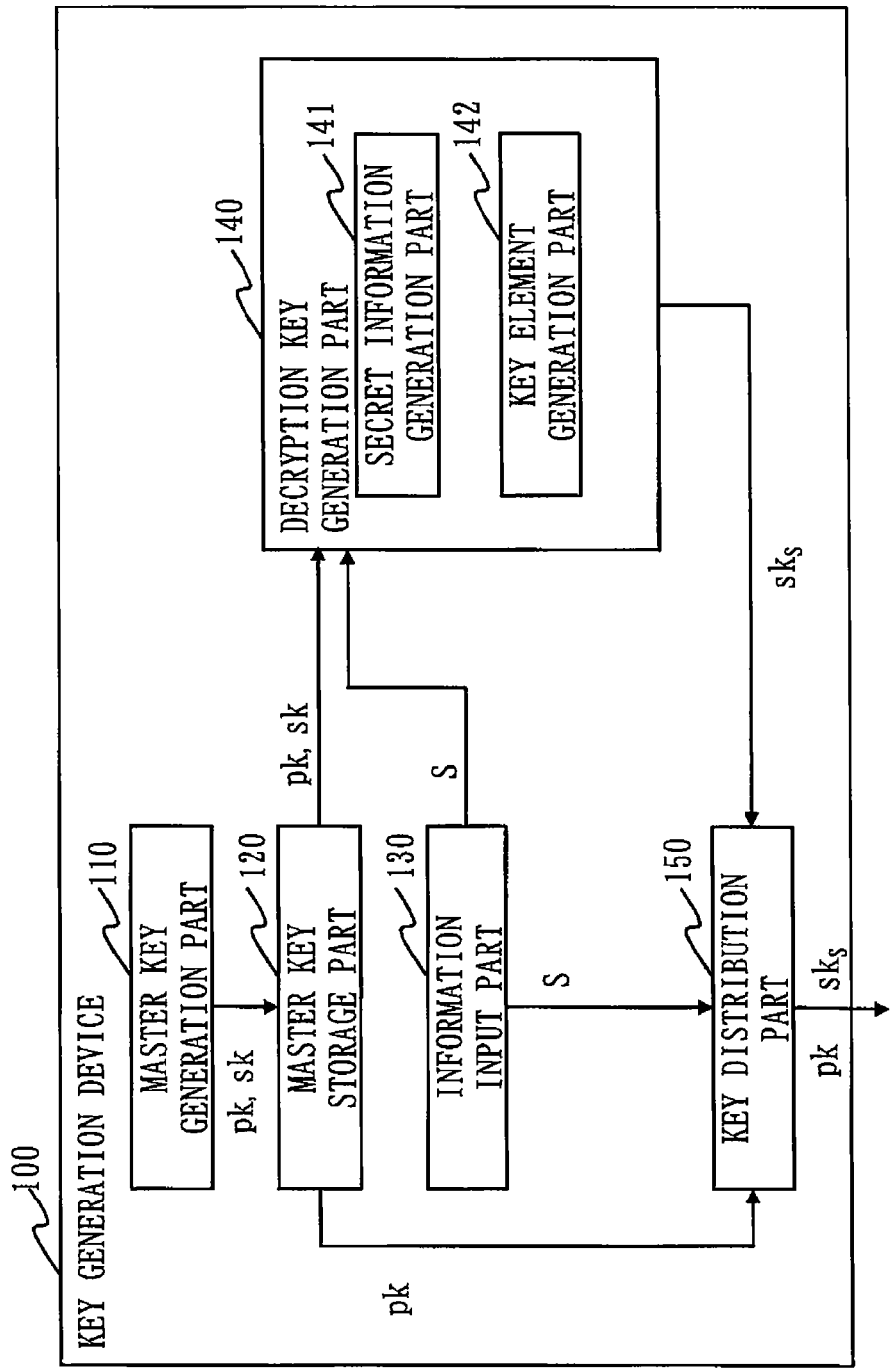
FIG. 5 is a configuration diagram of a key generation device 100 according to Embodiment 2.
Figure 6:
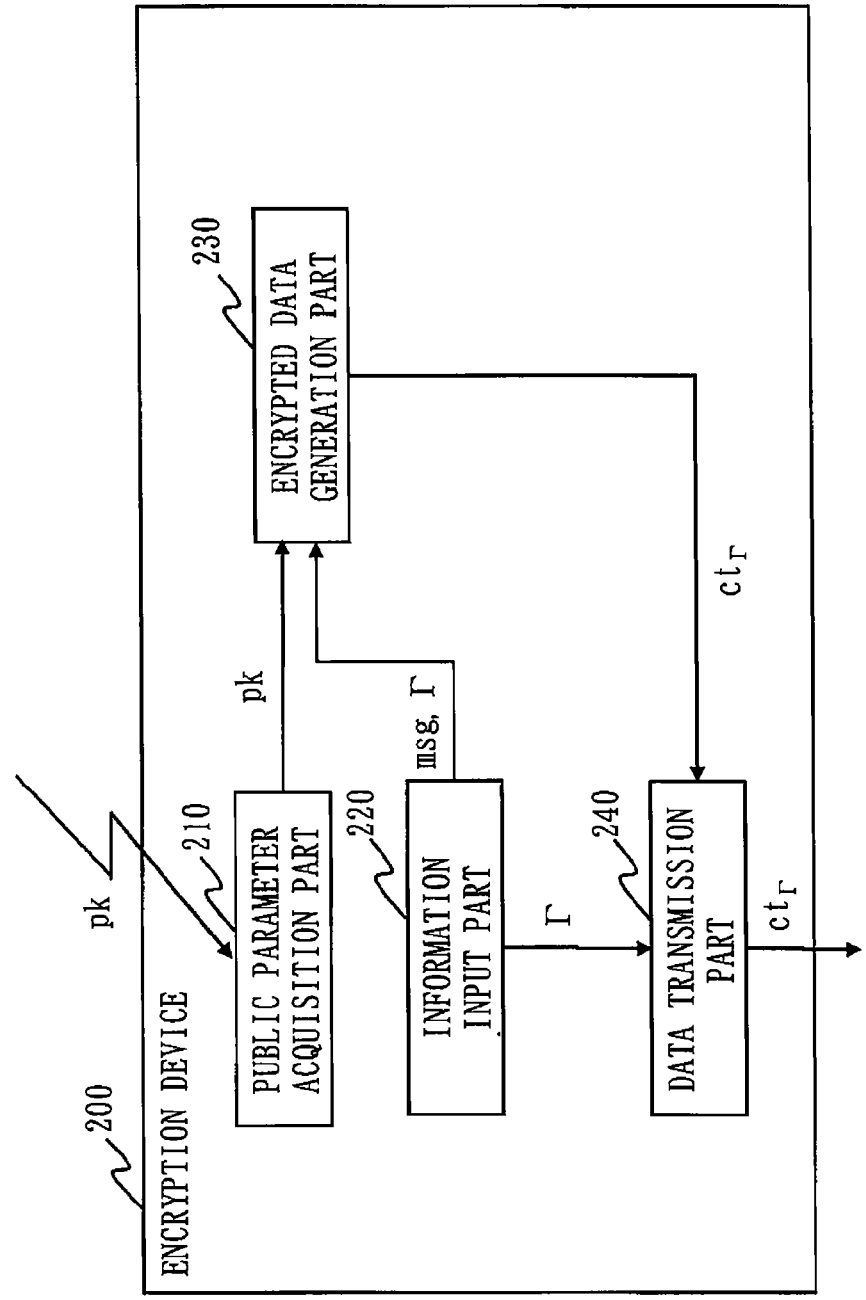
FIG. 6 is a configuration diagram of an encryption device 200 according to Embodiment 2.
Figure 7:
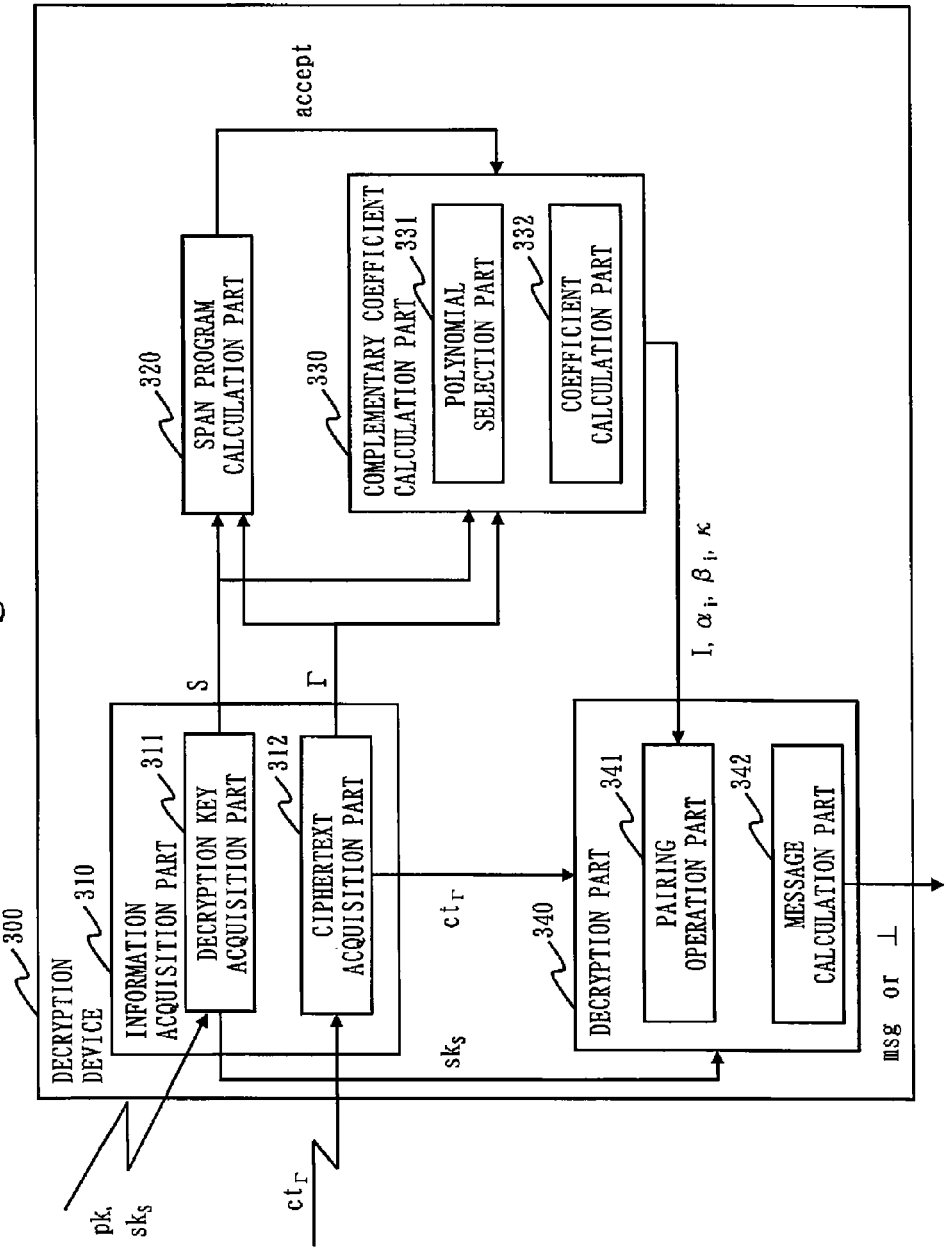
FIG. 7 is a configuration diagram of a decryption device 300 according to Embodiment 2.

FIG. 5 is a configuration diagram of a key generation device 100 according to Embodiment 2. FIG. 6 is a configuration diagram of an encryption device 200 according to Embodiment 2. FIG. 7 is a configuration diagram of a decryption device 300 according to Embodiment 2.

Figure 8:
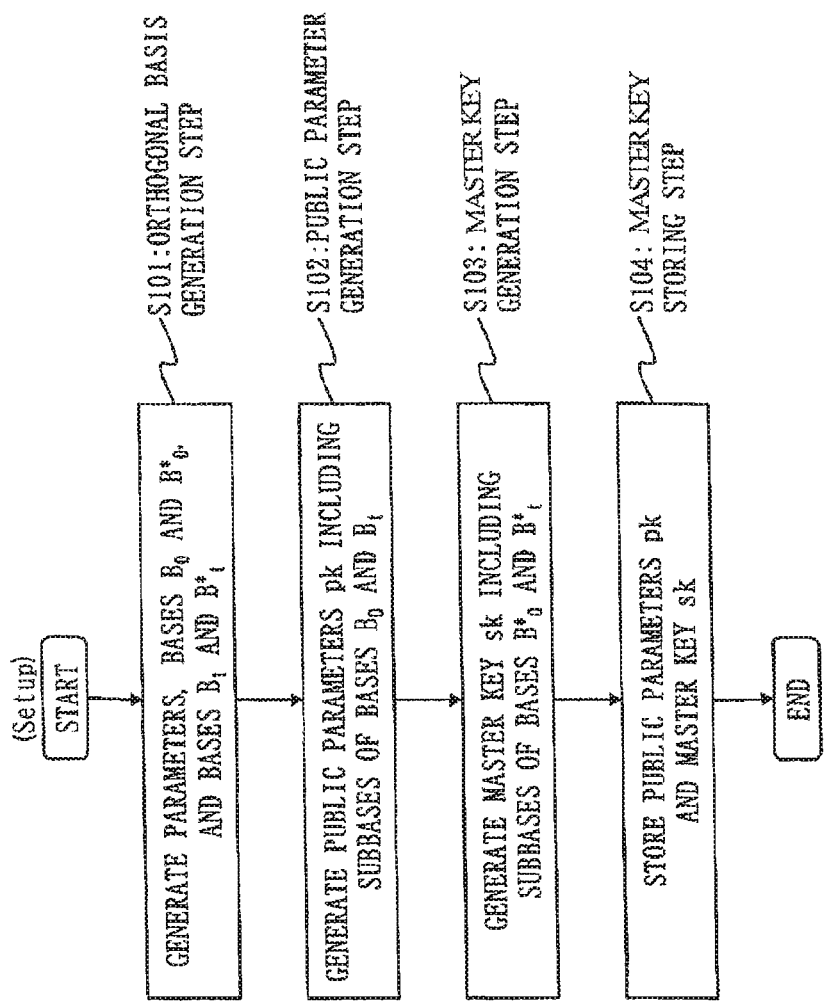
FIG. 8 is a flowchart showing the process of Setup algorithm according to Embodiment 2.
Figure 9:
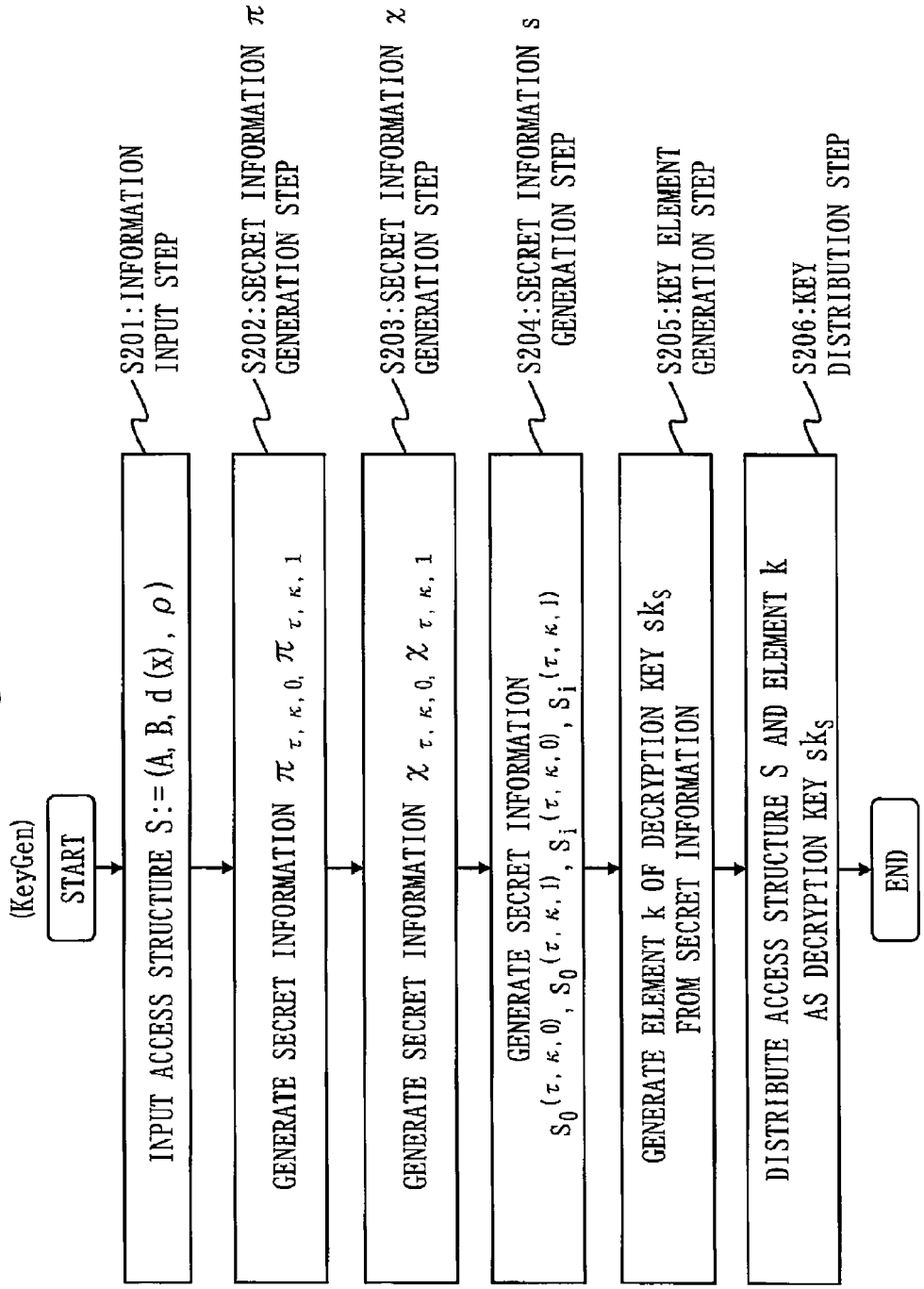
FIG. 9 is a flowchart showing the process of KeyGen algorithm according to Embodiment 2.
Figure 10:
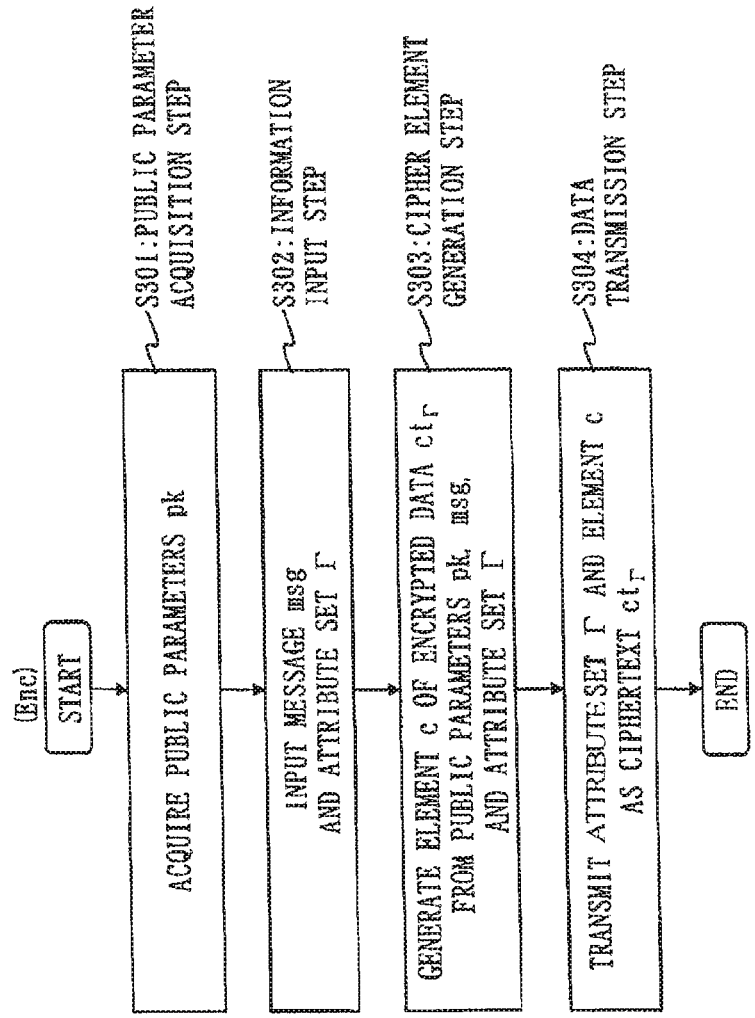
FIG. 10 is a flowchart showing the process of Enc algorithm according to Embodiment 2.
Figure 11:
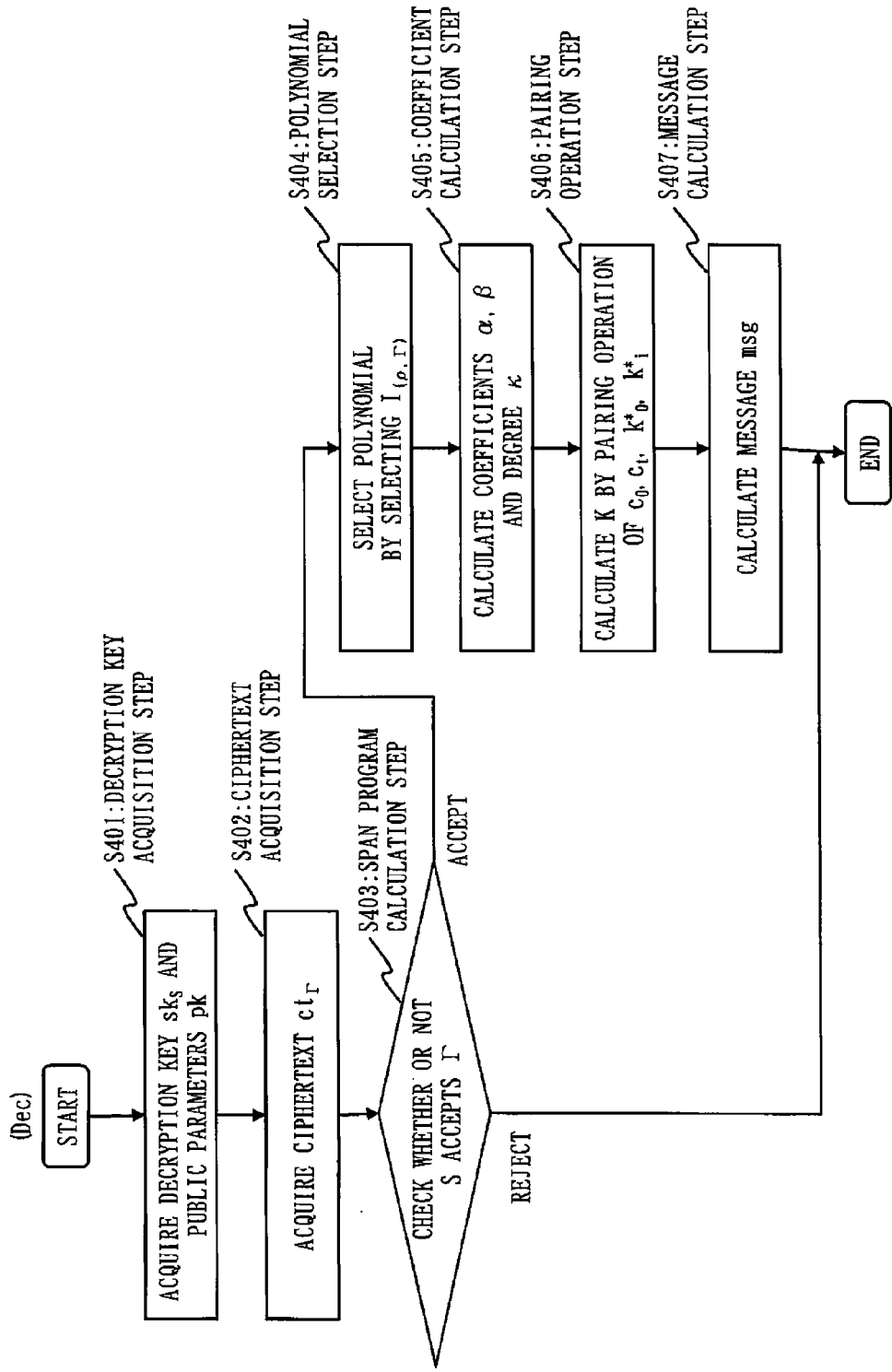
FIG. 11 is a flowchart showing the process of Dec algorithm according to Embodiment 2.

FIGS. 8 and 9 are flowcharts showing the operation of the key generation device 100, in which FIG. 8 is a flowchart showing the process of the Setup algorithm, and FIG. 9 is a flowchart showing the process of the KeyGen algorithm. FIG. 10 is a flowchart showing the operation of the encryption device 200, being the process of the Enc algorithm. FIG. 11 is a flowchart showing the operation of the decryption device 300, being the process of the Dec algorithm.

The function and operation of the key generation device 100 will be described.

The key generation device 100 is provided with a master key generation part 110, a master key storage part 120, an information input part 130, a decryption key generation part 140, and a key distribution part 150. The decryption key generation part 140 is provided with a secret information generation part 141 and a key element generation part 142.

The process of the Setup algorithm will be described with reference to FIG. 8.

(S101: Orthogonal Basis Generation Step)

With the processing device, the master key generation part 110 calculates Formula 123, to generate parameters param, bases $B_0$ and $B^*_0$, and base s $B_t$ and $B^*_t$.

[Formula 123]

$$\text{input } 1^\lambda \quad (1)$$

$$param_{\mathbb{G}} := (q, \mathbb{G}, \mathbb{G}_T, g, e) \xleftarrow{R} \mathcal{G}_{bpg}(1^\lambda) \quad (2)$$

$$\psi \xleftarrow{U} \mathbb{F}_q^x \quad (3)$$

$$n_0 := 2mf_{max} + 1, \quad (4)$$
$$n_t := 2mf_{max}k_{max} + n(t = 1, \ldots, d),$$
$$N_0 := n_0 + u_0 + w_0 + z_0,$$
$$N_t := n_t + u_t + w_t + z_t(t = 1, \ldots, d)$$

Processes of (5) to (9) are executed concerning each t of t=0, ..., d.

$$param_{\mathbb{V}_t} := (q, \mathbb{V}_t, \mathbb{G}_T, \mathbb{A}_t, e) := \mathcal{G}_{dpvs}(1^\lambda, N_t, param_{\mathbb{G}}) \quad (5)$$

$$X_t := (\chi_{t,i,j})_{i,j=1,\ldots,N_t} \xleftarrow{U} GL(N_t, \mathbb{F}_q) \quad (6)$$

$$X_t^* := (\vartheta_{t,i,j})_{i,j=1,\ldots,N_t} := \psi \cdot (X_t^T)^{-1} \quad (7)$$

$$b_{t,i} := (\vec{\chi}_{t,i})\mathbb{A}_t = \sum_{j=1}^{N_t} \chi_{t,i,j} a_{t,j} \text{ for } i = 1, \ldots, N_t, \quad (8)$$

$$\mathbb{B}_t := (b_{t,1}, \ldots, b_{t,N_t})$$

$$b_{t,i}^* := (\vec{\vartheta}_{t,i})\mathbb{A}_t = \sum_{j=1}^{N_t} \vartheta_{t,i,j} a_{t,j} \text{ for } i = 1, \ldots, N_t, \quad (9)$$

$$\mathbb{B}_t^* := (b_{t,1}^*, \ldots, b_{t,N_t}^*)$$

$$g_T := e(g, g)\psi, \quad (10)$$
$$param := \left(\{param_{\mathbb{V}_t}\}_{t=0,\ldots,d}, g_T\right)$$

Namely, the master key generation part 110 executes the following processes.

(1) With the input device, the master key generation part 110 takes as input the security parameter $\lambda(1^\lambda)$.

(2) With the processing device, the master key generation part 110 executes the algorithm $G_{bpg}$ by taking as input the security parameter $\lambda$ inputted in (1), and generates the value of parameters $param_G:=(q, G, G_T, g, e)$ of bilinear pairing groups.

(3) With the processing device, the master key generation part 110 generates a random number $\psi$.

(4) The master key generation part 110 sets $n_0+n_0+w_0+z_0$ in $N_0$, and sets $n_t+u_t+w_t+z_t$ in $N_t$ concerning each integer t of t=1, ..., d (d is an integer of 1 or more). Note that $n_0$ is $2mf_{max}+1$ and $n_t$ is $2mf_{max}k_{max}+n$ where: m is the number of factors obtained by factorizing the target polynomial d(x); $f_{in}$. is the maximum value (maximum value of $f_\tau$ to be described later) of the degrees of the factors obtained by factorizing the target polynomial d(x); $k_{max}$ is the maximum value of the number of labels ρ related to one piece of identification information t; n is an integer of 1 or more; and $u_0, w_0, z_0, u_t, w_t$, and $z_t$ are each an integer of 0 or more.

Subsequently, the master key generation part 110 executes the following processes (5) to (9) concerning each integer t of t=0, ..., d.

(5) With the processing device, the master key generation part 110 executes algorithm $G_{dpvs}$ by taking as input the security parameter $\lambda$ inputted in (1), $N_t$ set in (4), and the values of $param_G:=(q, G, G_T, g, e)$ generated in (2), and generates the values of parameters $param_{Vt}:=(q, V_t, G_T, A_t, e)$ of the dual pairing vector spaces.

(6) With the processing device, the master key generation part 110 takes as input $N_t$ set in (4), and $F_q$, and generates linear transformation $X_t:=(\chi_{t,i,j})_{i,j}$ randomly. Note that GL stands for General Linear. Namely, GL is a general linear group, a set of square matrices in which the determinant is not 0, and a group with respect to multiplication. Note that $(\chi_{t,i,j})_{i,j}$ signifies a matrix concerning suffixes i and j of a matrix $\chi_{t,i,j}$ where i, j=1, ..., $N_t$.

(7) With the processing device and based on the random number $\psi$ and the linear transformation $X_t$, the master key generation part 110 generates $X^*_t:=(v_{t,i,j})_{i,j}:=\psi \cdot (X_t^T)^{-1}$. As $(\chi_{t,i,j})_{i,j}$ does, $(v_{t,i,j})_{i,j}$ signifies a matrix concerning suffixes i and j of a matrix $v_{t,i,j}$ where i, j=1, ..., $N_t$.

(8) With the processing device and based on the linear transformation $X_t$ generated in (6), the master key generation part 110 generates a basis $B_t$ from a canonical basis $A_t$ generated in (5). Note that $\vec{x}_{t,i}$ indicates the i-th row of the linear transformation $X_t$.

(9) With the processing device and based on the linear transformation $X^*_t$ generated in (7), the master key generation part 110 generates a basis $B^*_t$ from the canonical basis $A_t$ generated in (5). Note that $\vec{v}_{t,i}$ indicates the i-th row of the linear transformation $X^*_t$.

(10) With the processing device, the master key generation part 110 sets $e(g, g)_\psi$ in $g_T$. The master key generation part 110 also sets $g_t$ and $\{param_{Vt}\}_{t=0, \ldots, d}$ generated in (5), in param.

In brief, in (S101), the master key generation part 110 executes algorithm $G_{ob}$ indicated in Formula 124, and generates param, the bases $B_0$ and $B^*_0$, and the bases $B_t$ and $B^*_t$.

[Formula 124]

$$G_{ob}(1^\lambda):$$

$$param_{\mathbb{G}} := (q, \mathbb{G}, \mathbb{G}_T, g, e) \xleftarrow{R} \mathcal{G}_{bpg}(1^\lambda), \psi \xleftarrow{U} \mathbb{F}_q^x,$$

$$n_0 := 2mf_{max} + 1, n_t := 2mf_{max}k_{max} + n(t = 1, \ldots, d),$$

$$N_0 := n_0 + u_0 + w_0 + z_0,$$

$$N_t := n_t + u_t + w_t + z_t(t = 1, \ldots, d),$$

for $t = 0, \ldots, d$, $$param_{\mathbb{V}_t} :=$$

$$(q, \mathbb{V}_t, \mathbb{G}_T, \mathbb{A}_t, e) := \mathcal{G}_{dpvs}(1^\lambda, N_t, param_{\mathbb{G}}),$$

$$X_t := (\chi_{t,i,j})_{i,j=1,\ldots,N_t} \xleftarrow{U} GL(N_t, \mathbb{F}_q),$$

$$X_t^* := (\vartheta_{t,i,j})_{i,j=1,\ldots,N_t} := \psi \cdot (X_t^T)^{-1}, \text{ hereafter, } \vec{\chi}_{t,i}$$

and $\vec{\vartheta}_{t,i}$ denote the i-th rows of $X_t$ and $X_t^*$ for $i = 1$, $$\ldots, N_t, \text{ respectively,}$$

$$b_{t,i} := (\vec{\chi}_{t,i})\mathbb{A}_t = \sum_{j=1}^{N_t} \chi_{t,i,j} a_{t,j} \text{ for } i = 1, \ldots, N_t,$$

$$\mathbb{B}_t := (b_{t,1}, \ldots, b_{t,N_t}),$$

$$b_{t,i}^* := (\vec{\vartheta}_{t,i})\mathbb{A}_t = \sum_{j=1}^{N_t} \vartheta_{t,i,j} a_{t,j} \text{ for } i = 1, \ldots, N_t,$$

$$\mathbb{B}_t^* := (b_{t,1}^*, \ldots, b_{t,N_t}^*),$$

$$g_T := e(g, g)\psi, param := \left(\{param_{\mathbb{V}_t}\}_{t=0,\ldots,d}, g_T\right),$$

return $(param, \mathbb{B}_t, \mathbb{B}_t^*)$.

(S102: Public Parameter Generation Step)

With the processing device, the master key generation part 110 generates subbases $\hat{B}_0$ and $\hat{B}_t$ of the bases $B_0$ and $B_t$, respectively, which are generated in (S101), as indicated in Formula 125.

$$\hat{\mathbb{B}}_0 := (b_{0,1}, b_{0,n_0+u_0+w_0+1}, \ldots, b_{0,n_0+u_0+w_0+z_0}),$$

$$\hat{\mathbb{B}}_t := (b_{t,1}, \ldots, b_{t,n_t}, b_{t,n_t+u_t+w_t+1}, \ldots, b_{t,n_t+u_t+w_t+z_t}) \text{ for } t=1,\ldots,d$$ [Formula 125]

The master key generation part 110 treats the generated subbases $\hat{B}_0$ and $\hat{B}^A_t$, the security parameter $\lambda$ inputted in (S101), and param generated in (S101), to form the public parameters pk.

(S103: Master Key Generation Step)

With the processing device, the master key generation part 110 generates subbases $\hat{B}^*_0$ and $\hat{B}^*_t$ of the bases $B^*_0$ and basis $B^*_6$ respectively, which are generated in (S101), as indicated in Formula 126.

$$\hat{\mathbb{B}}^*_0 := (b^*_{0,1}, \ldots, b^*_{0,n_0}, b^*_{0,n_0+u_0+1}, b^*_{0,n_0+u_0+w_0}, b^*_{0n_0+u_0+w_0+z_0}),$$

$$\hat{\mathbb{B}}^*_t := (b^*_{t,1}, \ldots, b^*_{t,n_t}, b^*_{t,n_t+u_t+1}, \ldots, b^*_{t,n_t+u_t+w_t}) \text{ for } t=1,\ldots,d$$ [Formula 126]

The master key generation part 110 treats the generated subbases $\hat{B}^*_0$ and $\hat{B}^*_t$, to form the master key sk.

(S104: Master Key Storing Step)

The master key storage part 120 stores the public parameters pk generated in (S102), in the storage device. The master key storage part 120 also stores the master key sk generated in (S103), in the storage device.

In brief, from (S101) through (S103), the key generation device 100 generates the public parameters pk and the master key sk by executing the Setup algorithm indicated in Formula 127. Then, in (S104), the key generation device 100 stores the generated public parameters pk and master key sk, in the storage device.

Note that the public parameters are publicized via, e.g., a network, so the encryption device 200 and decryption device 300 can acquire them.

Setup($1^\lambda$): [Formula 127]

$$(param, (\mathbb{B}_t, \mathbb{B}^*_t)_{t=0,\ldots,d}) \xleftarrow{R} \mathcal{G}_{ob}(1^\lambda)$$

$$\hat{\mathbb{B}}_0 := (b_{0,1}, b_{0,n_0+u_0+w_0+1}, \ldots, b_{0,n_0+u_0+w_0+z_0}),$$

$$\hat{\mathbb{B}}_t := (b_{t,1}, \ldots, b_{t,n_t}, b_{t,n_t+u_t+w_t+1}, \ldots, b_{t,n_t+u_t+w_t+z_t})$$

for $t=1,\ldots,d$, $$\hat{\mathbb{B}}^*_0 := (b^*_{0,1}, \ldots, b^*_{0,n_0}, b^*_{0,n_0+u_0+1},$$

$$\ldots, b^*_{0,n_0+u_0+w_0}, b^*_{0,n_0+u_0+w_0+z_0}),$$

$$\hat{\mathbb{B}}^*_t := (b^*_{t,1}, \ldots, b^*_{t,n_t}, b^*_{t,n_t+u_t+1}, \ldots, b^*_{t,n_t+u_t+w_t})$$

for $t=1,\ldots,d$, return $pk := (1^\lambda, \{\hat{\mathbb{B}}_t\}_{t=0,\ldots,d}, param)$, $sk := \{\hat{\mathbb{B}}^*_t\}_{t=0,\ldots,d}$.

The process of the KeyGen algorithm will be described with reference to FIG. 9.

(S201: Information Input Step)

With the input device, the information input part 130 takes as input the access structure $S:=(A, B, d(x), \rho)$ described above. Note that the attribute information of the user of the decryption key $sk_S$ is set in $\rho$. The target polynomial $d(x)$ included in the access structure S can be factorized into m of factors $d_\tau(x)^{f_\tau}$ where $\tau=1,\ldots,m$, as indicated in Formula 128.

$$d(x) = \prod_{\tau=1}^{m} d_\tau(x)^{f_\tau}$$ [Formula 128]

(S202: Secret Information $\pi$ Generation Step)

With the processing device, the secret information generation part 141 generates secret information $\pi_{\tau,\kappa,0}$ and secret information $\pi_{\tau,\kappa,1}$, as indicated in Formula 129.

$$\pi_\tau \xleftarrow{U} \mathbb{F}_q, (\tau = 1, \ldots, m-1), \pi_m := -\sum_{\tau=1}^{m-1} \pi_\tau,$$ [Formula 129]

$$\pi_{\tau,\kappa,0} \xleftarrow{U} \mathbb{F}_q,$$

$$\pi_{\tau,\kappa,1} := \pi_\tau - \pi_{\tau,\kappa,0}(\tau = 1, \ldots, m; \kappa = 0, \ldots, f_\tau)$$

(S203: Secret Information $\chi$ Generation Step)

With the processing device, the secret information generation part 141 generates secret information $\chi_{\tau,\kappa,0}$ and secret information $\chi_{\tau,\kappa,1}$ as indicated in Formula 130.

$$\chi_\tau \xleftarrow{U} \mathbb{F}_q, (\tau = 1, \ldots, m-1), \chi_m := 1 - \sum_{\tau=1}^{m-1} \chi_\tau,$$ [Formula 130]

$$\chi_{\tau,\kappa,0} \xleftarrow{U} \mathbb{F}_q,$$

$$\chi_{\tau,\kappa,1} := \chi_\tau - \chi_{\tau,\kappa,0}(\tau = 1, \ldots, m; \kappa = 0, \ldots, f_\tau)$$

(S204: Secret Information s Generation Step)

With the processing device, the secret information generation part 141 generates secret information $s_0^{(\tau,\kappa,0)}$ and secret information $s_0^{(\tau,\kappa,1)}$, and secret information $s_i^{(\tau,\kappa,0)}$ and secret information $s_i^{(\tau,\kappa,1)}$, as indicated in Formula 131.

for $\tau = 1, \ldots, m,$ [Formula 131]

$\kappa = 0, \ldots, f_\tau,$ $\iota = 0, 1,$ $\mu^{(\tau,\kappa,0)} := deg(d_\tau(x)^\kappa),$ $\mu^{(\tau,\kappa,1)} := deg(d_\tau(x) f_\tau^{-\kappa}),$ $(\kappa = 0, \ldots, f_\tau),$ $$a_{i,0}^{(\tau,\kappa)} + a_{i,1}^{(\tau,\kappa)} x + \ldots + a_{i,\mu^{(\tau,\kappa,0)}-1}^{(\tau,\kappa)} x^{\mu^{(\tau,\kappa,0)}-1} :=$$

$$a_i(x) \bmod d_\tau(x)^\kappa,$$

$$b_{i,0}^{(\tau,\kappa)} + b_{i,1}^{(\tau,\kappa)} x + \ldots + b_{i,\mu^{(\tau,\kappa,1)}-1}^{(\tau,\kappa)} x^{\mu^{(\tau,\kappa,1)}-1} :=$$

$$b_i(x) \bmod d_\tau(x) f_\tau^{-\kappa},$$

$$\delta_j^{(\tau,\kappa,\iota)} \xleftarrow{U} \mathbb{F}_q (j = 0, \ldots, \mu^{(\tau,\kappa,\iota)} - 1)$$

$$s_0^{(\tau,\kappa,0)} := \sum_{j=0}^{\mu^{(\tau,\kappa,0)}-1} \delta_j^{(\tau,\kappa,0)} \cdot a_{0,j}^{(\tau,\kappa)},$$

$$s_0^{(\tau,\kappa,1)} := \sum_{j=0}^{\mu^{(\tau,\kappa,1)}-1} \delta_j^{(\tau,\kappa,1)} \cdot b_{0,j}^{(\tau,\kappa)},$$

-continued for $i = 1, \ldots, L$, $$\xi_{i,\tau,\iota} \xleftarrow{U} \mathbb{F}_q (i = 1, \ldots, L; \tau = 1, \ldots, m-1; \iota = 0, 1),$$

$$\xi_{i,\tau,\iota} := -\sum_{\tau=1}^{m-1} \xi_{i,\tau,\iota} (i = 1, \ldots, L; \tau = 0, 1),$$

$$s_i^{(\tau,\kappa,0)} := \sum_{j=0}^{\mu^{(\tau,\kappa,0)}-1} \delta_j^{(\tau,\kappa,0)} \cdot a_{i,j}^{(\tau,\kappa)} + \xi_{i,\tau,0},$$

$$s_i^{(\tau,\kappa,1)} := \sum_{j=0}^{\mu^{(\tau,\kappa,1)}-1} \delta_j^{(\tau,\kappa,1)} \cdot b_{i,j}^{(\tau,\kappa)} + \xi_{i,\tau,1}$$

(S205: Key Element Generation Step)

With the processing device, concerning each integer $\tau$ of $\tau=1, \ldots, m$, each integer $\kappa$ of $\kappa=0, \ldots, f_\tau$, and each integer $\iota$ of $\iota=0, 1$, the key element generation part 142 generates an element $k^{*(\tau,\kappa,\iota)}_0$ of the decryption key $sk_s$, as indicated in Formula 132.

$$\vec{\eta}_0^{(\tau,\kappa,\iota)} \xleftarrow{U} \mathbb{F}_q^{w_0}, \quad \text{[Formula 132]}$$

$$k_0^{*(\tau,\kappa,\iota)} := \left( \overline{s_0^{(\tau,\kappa,\iota)} + \pi_{\tau,\kappa,\iota}, \vec{e}_0^{(\tau,\kappa,\iota)}}^{n_0}, \right.$$

$$\left. \overline{0, \ldots, 0}^{u_0}, \overline{\vec{\eta}_0^{(\tau,\kappa,\iota)}}^{w_0}, \overline{0, \ldots, 0}^{z_0}, \chi_{\tau,\kappa,\iota} \right) \mathbb{B}_0^*$$

As described above, for the bases $\mathbb{B}$ and $\mathbb{B}^*$ indicated in Formula 113, Formula 114 is established. Hence, Formula 132 means that: $s_0^{(\tau,\kappa,\iota)} + \pi_{\tau,\kappa,\iota}$ is set as the coefficient for a basis vector $b^*_{0,1}$ of a basis $\mathbb{B}^*_0$; $\vec{e}_0^{(\tau,\kappa,\iota)}$ is set as the coefficient for basis vectors $b^*_{0,1+1}, \ldots, b^*_{0,1+n0}$ of the basis $\mathbb{B}^*_0$; 0 is set as the coefficient for basis vectors $b^*_{0,n0+1}, \ldots, b^*_{0,n0+u0}$ of the basis $\mathbb{B}^*_0$; $\eta_{0,1}^{(\tau,\kappa,\iota)}, \ldots, \eta_{0,w0}^{(\tau,\kappa,\iota)}$ are each set as the coefficient for basis vectors $b^*_{0,n0+u0+1}, \ldots, b^*_{0,n0+u0+w0}$ of the basis $\mathbb{B}^*_0$; and 0 is set as the coefficient for basis vectors $b^*_{0,n0+u0+w0+1}, \ldots, b^*_{0,n0+u0+w0+z0}$ of the basis $\mathbb{B}^*_0$. Note that n0, u0, w0, and z0 respectively represent $n_0$, $u_0$, $w_0$, and $z_0$.

Also, $\vec{e}_0^{(\tau,\kappa,\iota)}$ is a $2mf_{max}$-dimensional vector in which 1 is set as the coefficient for one basis vector and 0 is set as the coefficient for another basis vector, and the basis vector for which 1 is set as the coefficient differs for each $(\tau,\kappa,\iota)$. Likewise, $\vec{e}_i^{(\tau,\kappa,\iota)}$ is a $2mf_{max}k_{max}$-dimensional vector in which 1 is set as the coefficient for one basis vector and 0 is set as the coefficient for another basis vector, and the basis vector for which 1 is set as the coefficient differs for each $(\tau,\kappa,\iota)$.

Also, $\vec{e}_1$ is an n-dimensional vector in which 1 is set as the coefficient for the basis vector $b^*_{t,1}$ and 0 is set as the coefficient for another basis vector.

With the processing device, concerning each integer $\tau$ of $\tau=1, \ldots, m$, each integer $\kappa$ of $\kappa=0, \ldots, f_\tau$, each integer $\iota$ of $\iota=0, 1$, and each integer $i$ of $i=1, \ldots, L$, the key element generation part 142 generates an element $k^{*(\tau,\kappa,\iota)}_i$ of the decryption key $sk_s$, as indicated in Formula 133.

$$\text{if } \rho(i) = (t, \vec{v}_i), \quad \theta_i \xleftarrow{U} \mathbb{F}_q, \vec{\eta}_i \xleftarrow{U} \mathbb{F}_q^{w_t}, \quad \text{[Formula 133]}$$

$$k_i^{*(\tau,\kappa,\iota)} :=$$

$$\left( \overline{s_i^{(\tau,\kappa,\iota)}\vec{e}_1 + \theta_i \vec{v}_i, \vec{e}_i^{(\tau,\kappa,\iota)}}^{n_t}, \overline{0, \ldots, 0}^{u_t}, \overline{\vec{\eta}_i}^{w_t}, \overline{0, \ldots, 0}^{z_t} \right) \mathbb{B}_t^*,$$

$$\text{if } \rho(i) = \neg (t, \vec{v}_i), \quad \vec{\eta}_i \xleftarrow{U} \mathbb{F}_q^{w_t},$$

$$k_i^{*(\tau,\kappa,\iota)} :=$$

$$\left( \overline{s_i^{(\tau,\kappa,\iota)}\vec{v}_i, \vec{e}_i^{(\tau,\kappa,\iota)}}^{n_t}, \overline{0, \ldots, 0}^{u_t}, \overline{\vec{\eta}_i}^{w_t}, \overline{0, \ldots, 0}^{z_t} \right) \mathbb{B}_t^*,$$

$$\text{if } \rho(i) = p_0, \quad \vec{\eta}_i \xleftarrow{U} \mathbb{F}_q^{w_0},$$

$$k_i^{*(\tau,\kappa,\iota)} := \left( \overline{s_i^{(\tau,\kappa,\iota)}, \vec{e}_0^{(\tau,\kappa,\iota)}}^{n_0}, \overline{0, \ldots, 0}^{u_0}, \overline{\vec{\eta}_i}^{w_0}, \overline{0, \ldots, 0}^{z_0} \right) \mathbb{B}_0^*$$

(S206: Key Distribution Step)

For example, with the communication device, the key distribution part 150 distributes the decryption key $sk_S$, constituted as elements by the access structure $S$ inputted in (S201) and $k^{*(\tau,\kappa,\iota)}_0, k^{*(\tau,\kappa,\iota)}_1, \ldots, k^{*(\tau,\kappa,\iota)}_L$, generated in (S205), to the decryption device 300 in secrecy via the network. As a matter of course, the decryption key $sk_S$ may be distributed to the decryption device 300 by another method.

In brief, from (S201) through (S205), the key generation device 100 generates the decryption key $sk_S$ by executing the KeyGen algorithm indicated in Formulas 134 to 135. Then, in (S206), the key generation device 100 distributes the generated decryption key $sk_S$ to the decryption device 300.

$$KeyGen\left(pk, sk, \mathbb{S} := \left(\mathcal{A}, \mathcal{B}, d(x) = \prod_{\tau=1}^{m} d_\tau(x)^{f_\tau}, \rho\right)\right): \quad \text{[Formula 134]}$$

$$\pi_\tau \xleftarrow{U} \mathbb{F}_q, (\tau = 1, \ldots, m-1), \pi_m := -\sum_{\tau=1}^{m-1} \pi_\tau,$$

$$\pi_{\tau,\kappa,0} \xleftarrow{U} \mathbb{F}_q,$$

$$\pi_{\tau,\kappa,1} := \pi_\tau - \pi_{\tau,\kappa,0} (\tau = 1, \ldots, m; \kappa = 0, \ldots, f_\tau),$$

$$\chi_\tau \xleftarrow{U} \mathbb{F}_q, (\tau = 1, \ldots, m-1), \chi_m := 1 - \sum_{\tau=1}^{m-1} \chi_\tau,$$

$$\chi_{\tau,\kappa,0} \xleftarrow{U} \mathbb{F}_q,$$

-continued $$\chi_{\tau,\kappa,1} := \chi_\tau - \chi_{\tau,\kappa,0}(\tau = 1, \ldots, m; \kappa = 0, \ldots, f_\tau),$$

for $\tau = 1, \ldots, m, \kappa = 0, \ldots, f_\tau, \iota = 0, 1,$ $$\mu^{(\tau,\kappa,0)} := deg(d_\tau(x)^\kappa),$$

$$\mu^{(\tau,\kappa,1)} := deg(d_\tau(x)^{f_\tau - \kappa}), (\kappa = 0, \ldots, f_\tau),$$

$$a_{i,0}^{(\tau,\kappa)} + a_{i,1}^{(\tau,\kappa)}x + \ldots + a_{i,\mu^{(\tau,\kappa,0)}-1}^{(\tau,\kappa)} x^{\mu^{(\tau,\kappa,0)}-1} := a_i(x) \bmod d_\tau(x)^\kappa,$$

$$b_{i,0}^{(\tau,\kappa)} + b_{i,1}^{(\tau,\kappa)}x + \ldots + b_{i,\mu^{(\tau,\kappa,1)}-1}^{(\tau,\kappa)} x^{\mu^{(\tau,\kappa,1)}-1} := b_i(x) \bmod d_\tau(x)^{f_\tau-\kappa},$$

$$\delta_j^{(\tau,\kappa,\iota)} \xleftarrow{U} \mathbb{F}_q, (j = 0, \ldots, \mu^{(\tau,\kappa,\iota)} - 1), \vec{\eta}_0^{(\tau,\kappa,\iota)} \xleftarrow{U} \mathbb{F}_q^{w_0},$$

$$s_0^{(\tau,\kappa,0)} := \sum_{j=0}^{\mu^{(\tau,\kappa,0)}-1} \delta_j^{(\tau,\kappa,0)} \cdot a_{0,j}^{(\tau,\kappa)},$$

$$s_0^{(\tau,\kappa,1)} := \sum_{j=0}^{\mu^{(\tau,\kappa,1)}-1} \delta_j^{(\tau,\kappa,1)} \cdot b_{0,j}^{(\tau,\kappa)},$$

$$k_0^{*(\tau,\kappa,\iota)} := \left( \overbrace{s_0^{(\tau,\kappa,\iota)} + \pi_{\tau,\kappa,\iota}\vec{e}_0^{(\tau,\kappa,\iota)}}^{n_0}, \overbrace{0, \ldots, 0}^{u_0}, \overbrace{\vec{\eta}_0^{(\tau,\kappa,\iota)}}^{w_0}, \overbrace{0, \ldots, 0, \chi_{\tau,\kappa,\iota}}^{z_0} \right) \mathbb{B}_0^*,$$
[Formula 135]

for $i = 1, \ldots, L,$ $$\xi_{i,\tau,\iota} \xleftarrow{U} \mathbb{F}_q (i = 1, \ldots, L; \tau = 1, \ldots, m-1; \iota = 0, 1),$$

$$\xi_{i,m,\iota} := -\sum_{\tau=1}^{m-1} \xi_{i,\tau,\iota} (i = 1, \ldots, L; \iota = 0, 1),$$

$$s_i^{(\tau,\kappa,0)} := \sum_{j=1}^{\mu^{(\tau,\kappa,0)}-1} \delta_j^{(\tau,\kappa,0)} \cdot a_{i,j}^{(\tau,\kappa)} + \xi_{i,\tau,0},$$

$$s_i^{(\tau,\kappa,1)} := \sum_{j=0}^{\mu^{(\tau,\kappa,1)}-1} \delta_j^{(\tau,\kappa,1)} \cdot b_{i,j}^{(\tau,\kappa)} + \xi_{i,\tau,1},$$

if $\rho(i) = (t, \vec{v}_i), \theta_i \xleftarrow{U} \mathbb{F}_q, \vec{\eta}_i \xleftarrow{U} \mathbb{F}_q^{w_t},$ $$k_i^{*(\tau,\kappa,\iota)} := \left( \overbrace{s_i^{(\tau,\kappa,\iota)}\vec{e}_1 + \theta_i\vec{v}_i, \vec{e}_i^{(\tau,\kappa,\iota)}}^{n_t}, \overbrace{0, \ldots, 0}^{u_t}, \overbrace{\vec{\eta}_i}^{w_t}, \overbrace{0, \ldots, 0}^{z_t} \right) \mathbb{B}_t^*,$$

if $\rho(i) = \neg(t, \vec{v}_i), \vec{\eta}_i \xleftarrow{U} \mathbb{F}_q^{w_t},$ $$k_i^{*(\tau,\kappa,\iota)} := \left( \overbrace{s_i^{(\tau,\kappa,\iota)}\vec{v}_i, \vec{e}_i^{(\tau,\kappa,\iota)}}^{n_t}, \overbrace{0, \ldots, 0}^{u_t}, \overbrace{\vec{\eta}_i}^{w_t}, \overbrace{0, \ldots, 0}^{z_t} \right) \mathbb{B}_t^*,$$

if $\rho(i) = p_0, \vec{\eta}_i \xleftarrow{U} \mathbb{F}_q^{w_0},$ $$k_i^{*(\tau,\kappa,\iota)} := \left( \overbrace{s_i^{(\tau,\kappa,\iota)}, \vec{e}_0^{(\tau,\kappa,\iota)}}^{n_0}, \overbrace{0, \ldots, 0}^{u_0}, \overbrace{\vec{\eta}_i}^{w_0}, \overbrace{0, \ldots, 0}^{z_0} \right) \mathbb{B}_0^*,$$

$$\text{return } sk_\mathbb{S} := \left( \mathbb{S}, \{k_0^{*(\tau,\kappa,\iota)}, k_1^{*(\tau,\kappa,\iota)}, \ldots, k_L^{*(\tau,\kappa,\iota)}\}_{\tau=1,\ldots,m;\kappa=0,\ldots,f_\tau;\iota=0,1} \right).$$

The function and operation of the encryption device 200 will be described.

The encryption device 200 is provided with a public parameter acquisition part 210, an information input part 220, an encrypted data generation part 230, and a data transmission part 240.

The process of the Enc algorithm will be described with reference to FIG. 10.

(S301: Public Parameter Acquisition Step)

For example, with the communication device, the public parameter acquisition part 210 acquires the public parameters pk generated by the key generation device 100, via the network (S302: Information Input Step)

With the input device, the information input part 220 takes as input the message msg to be transmitted to the decryption device 300. Also, with the input device, the information input part 220 takes as input the attribute set $\Gamma := \{(t, \vec{x}_t := (x_{t,1}, \ldots, x_{t,n_t} \in \mathbb{F}_q^{n_t})) | 1 \le t \le d\}$. Note that t need not be all of the integers t falling within the range of $1 \le t \le d$, but may be one or more of integers t falling within the range of $1 \le t \le d$. Also, for example, decryptable user attribute information is set in the attribute set $\Gamma$.

(S303: Cipher Element Generation Step)

With the processing device, the encrypted data generation part 230 generates an element $c_0$ of the ciphertext $ct_\Gamma$, as indicated in Formula 136.

$$\omega, \zeta \xleftarrow{U} \mathbb{F}_q, \quad \text{[Formula 136]}$$

$$\vec{\varphi}_0 \xleftarrow{U} \mathbb{F}_q^{z_0-1},$$

$$c_0 := \left( \overbrace{\omega, 0, \ldots}^{n_0}, \overbrace{0,0, \ldots}^{u_0}, \overbrace{0,0, \ldots}^{w_0}, \overbrace{0, \vec{\varphi}_0, \zeta}^{z_0} \right)_{\mathbb{B}_0}$$

With the processing device, concerning each integer t included in the attribute information Γ, the encrypted data generation part 230 generates an element $c_t$ of the ciphertext $ct_\Gamma$, as indicated in Formula 137.

$$\vec{\varphi}_t \xleftarrow{U} \mathbb{F}_q^{z_t} \text{ for } (t, \vec{x}_t) \in \Gamma, \quad \text{[Formula 137]}$$

$$c_t := \left( \overbrace{\omega \vec{x}_t, 0, \ldots}^{n_t}, \overbrace{00, \ldots}^{u_t}, \overbrace{0,0, \ldots}^{w_t}, \overbrace{0, \vec{\varphi}_t}^{z_t} \right)_{\mathbb{B}_t}.$$

With the processing device, the encrypted data generation part 230 generates an element $c_{d+1}$ of the ciphertext $ct_\Gamma$, as indicated in Formula 138.

$$c_{d+1} := g_T^\zeta msg \quad \text{[Formula 138]}$$

(S304: Data Transmission Step)

For example, with the communication device, the data transmission part 240 transmits the ciphertext $ct_\Gamma$, constituted as elements by the attribute set Γ inputted in (S302) and $c_0$, $c_t$, and $c_{d+1}$ generated in (S303), to the decryption device 300 via the network. As a matter of course, the ciphertext $ct_\Gamma$ may be transmitted to the decryption device 300 by another method.

In brief, from (S301) through (S303), the encryption device 200 generates the ciphertext $ct_\Gamma$ by executing the Enc algorithm indicated in Formula 139. Then, in (S304), the encryption device 200 transmits the generated ciphertext $ct_\Gamma$ to the decryption device 300.

$$Enc(pk, msg, \Gamma := \{(t, \vec{x}_t) \mid 1 \le t \le d\}): \quad \text{[Formula 139]}$$

$$\omega, \zeta \xleftarrow{U} \mathbb{F}_q,$$

$$\vec{\varphi}_0 \xleftarrow{U} \mathbb{F}_q^{z_0-1},$$

$$\vec{\varphi}_t \xleftarrow{U} \mathbb{F}_q^{z_t} \text{ for } (t, \vec{x}_t) \in \Gamma,$$

$$c_0 := \left( \overbrace{\omega, 0, \ldots}^{n_0}, \overbrace{0,0, \ldots}^{u_0}, \overbrace{0,0, \ldots}^{w_0}, \overbrace{0, \vec{\varphi}_0, \zeta}^{z_0} \right)_{\mathbb{B}_0},$$

$$c_t := \left( \overbrace{\omega \vec{x}_t, 0, \ldots}^{n_t}, \overbrace{00, \ldots}^{u_t}, \overbrace{0,0, \ldots}^{w_t}, \overbrace{0, \vec{\varphi}_t}^{z_t} \right)_{\mathbb{B}_t},$$

$$\text{for } (t, \vec{x}_t) \in \Gamma,$$

$$c_{d+1} := g_T^\zeta msg,$$

$$\text{return } ct_\Gamma := (\Gamma, c_0, \{c_t\}_{(t,\vec{x}_t) \in \Gamma}, c_{d+1}).$$

The function and operation of the decryption device 300 will be described.

The decryption device 300 is provided with an information acquisition part 310, a span program calculation part 320, a complementary coefficient calculation part 330, and a decryption part 340. The information acquisition part 310 is provided with a decryption key acquisition part 311 and a ciphertext acquisition part 312. The complementary coefficient calculation part 330 is provided with a polynomial selection part 331 and a coefficient calculation part 332. The decryption part 340 is provided with a pairing operation part 341 and a message calculation part 342.

The process of the Dec algorithm will be described with reference to FIG. 11.

(S401: Decryption key Acquisition Step)

For example, with the communication device, the decryption key acquisition part 311 acquires the decryption key $sk_S := (S, k^{*(\tau,\kappa,\iota)}_0, k^{*(\tau,\kappa,\iota)}_1, \ldots, k^{*(\tau,\kappa,\iota)}_L)$ distributed by the key generation device 100, via the network. The decryption key acquisition part 311 also acquires the public parameters pk generated by the key generation device 100.

(S402: Ciphertext Acquisition Step)

For example, with the communication device, the ciphertext acquisition part 312 acquires the ciphertext $ct_\Gamma := (\Gamma, c_0, c_t, c_{d+1})$ transmitted by the encryption device 200, via the network.

(S403: Span Program Calculation Step)

With the processing device, the span program calculation part 320 checks whether or not the access structure S included in the decryption key $sk_S$ acquired in (S401) accepts Γ included in the ciphertext $ct_\Gamma$ acquired in (S402). The method of checking whether or not the access structure S accepts r is the same as that described in "2-1. Quadratic Span Program in Embodiment 1".

The span program calculation part 320 advances to the process of (S404) if the access structure S accepts Γ (accept in S403). If the access structure S rejects Γ (reject in S403), the span program calculation part 320 judges that the ciphertext $ct_\Gamma$ cannot be decrypted, and ends the process.

(S404: Polynomial Selection Step)

With the processing device, the polynomial selection part 331 of the complementary coefficient calculation part 330 calculates $I_{(\rho,\Gamma)} \subseteq \{1, \ldots, L\}$. The method of calculating $I_{(\rho,\Gamma)}$ is the same as that described in "2-2. Inner-Product of Attributes and Quadratic Span Program in Embodiment 1".

(S405: Coefficient Calculation Step)

With the processing device, the coefficient calculation part 332 of the complementary coefficient calculation part 330 calculates coefficients $(\alpha_1, \ldots, \alpha_L)$, coefficients $(\beta_1, \ldots, \beta_L)$, and degrees $(\kappa_1, \ldots, \kappa_m)$ with which Formula 140 is established. The coefficients $(\alpha_1, \ldots, \alpha_L)$, coefficients $(\beta_1, \ldots, \beta_L)$, and degrees $(\kappa_1, \ldots, \kappa_m)$ may be calculated by any method, for example, by round-robin.

$$\Pi_{\tau=1}^m d_\tau(x)^{\kappa_\tau} | (a_0(x) + \Sigma_{i=1}^L \alpha_i a_i(x)), \text{ and}$$

$$\Pi_{\tau=1}^m d_\tau(x)^{f_\tau - \kappa_\tau} | (b_0(x) + \Sigma_{i=1}^L \beta_i b_i(x)) \quad \text{[Formula 140]}$$

Note that $\alpha_i = 0 = \beta_i$ concerning all i not included in $I_{(\rho,\Gamma)}$.

(S406: Pairing Operation Step)

The pairing operation part 341 of the decryption part 340 generates session keys $K_{\tau,0}$ and $K_{\tau,1}$ by calculating Formula 141 with the processing device.

$$K_{\tau,0} := e(c_0 k^{*(\tau,\kappa_\tau,0)}_0). \quad \text{[Formula 141]}$$

$$\prod_{i \in I_{(\rho,\Gamma),0}} e(c_0, k^{*(\tau,\kappa_\tau,0)}_i) \alpha_i \cdot \prod_{i \in I_{(\rho,\Gamma),+}} e(c_t, k^{*(\tau,\kappa_\tau,0)}_i)$$

-continued $$\alpha_i \cdot \prod_{i \in \mathcal{I}_{(\rho,\Gamma),-}} e(c_t, k_i^{*(\tau,\kappa_\tau,0)})\alpha_i/(\vec{v}_i \cdot \vec{x}_i),$$

$$K_{\tau,1} := e(c_0 k_0^{*(\tau,\kappa_\tau,1)}) \cdot \prod_{i \in \mathcal{I}_{(\rho,\Gamma),0}} e(c_0, k_i^{*(\tau,\kappa_\tau,1)})$$

$$\beta_i \cdot \prod_{i \in \mathcal{I}_{(\rho,\Gamma),+}} e(c_t, k_i^{*(\tau,\kappa_\tau,1)})$$

$$\beta_i \cdot \prod_{i \in \mathcal{I}_{(\rho,\Gamma),-}} e(c_t, k_i^{*(\tau,\kappa_\tau,1)})\beta_i/(\vec{v}_i \cdot \vec{x}_i),$$

where $\mathcal{I}_{(\rho,\Gamma),0} := \{i \in \mathcal{I}_{(\rho,\Gamma)} \mid \rho(i) = p_0\}$, $\mathcal{I}_{(\rho,\Gamma),+} := \{i \in \mathcal{I}_{(\rho,\Gamma)} \mid \rho(i) = (t, \vec{v}_i)\}$ and $\mathcal{I}_{(\rho,\Gamma),-} := \{i \in \mathcal{I}_{(\rho,\Gamma)} \mid \rho(i) = \neg (t, \vec{v}_i)\}$ (S407: Message Calculation Step)

The message calculation part 342 of the decryption part 340 generates a message msg' (=msg) by calculating Formula 142 with the processing device.

$$msg' := c_{d+1} / \left( \prod_{\tau=1}^{m} K_{\tau,0} K_{\tau,1} \right) \quad \text{[Formula 142]}$$

Note that by calculating Formula 141, $g_T^\zeta$ can be obtained, as indicated in Formula 143. Hence, by calculating Formula 142, the message msg' (=msg) m can be obtained.

$$K_{\tau,0} := e(c_0 k_0^{*(\tau,\kappa_\tau,0)}) \cdot \prod_{i \in \mathcal{I}_{(\rho,\Gamma),0}} e(c_0, k_i^{*(\tau,\kappa_\tau,0)})\alpha_i \cdot \quad \text{[Formula 143]}$$

$$\prod_{i \in \mathcal{I}_{(\rho,\Gamma),+}} e(c_t, k_i^{*(\tau,\kappa_\tau,0)})\alpha_i \cdot$$

$$\prod_{i \in \mathcal{I}_{(\rho,\Gamma),-}} e(c_t, k_i^{*(\tau,\kappa_\tau,0)})\alpha_i/(\vec{v}_i \cdot \vec{x}_i),$$

$$= g_T^{\omega\left(\sum_{j=0}^{\mu^{(\tau,\kappa_\tau,0)}-1} \delta_j^{(\tau,\kappa_\tau,0)} a_{0,j}^{(\tau,\kappa_\tau)} + \pi_{\tau,\kappa_\tau,0}\right) + \zeta\chi_{\tau,\kappa_\tau,0}} \cdot$$

$$g_T^{\omega\left(\sum_{i=1}^{L} \alpha_i \sum_{j=0}^{\mu^{(\tau,\kappa_\tau,0)}-1} \delta_j^{(\tau,\kappa_\tau,0)} a_{i,j}^{(\tau,\kappa_\tau)} + \xi_{i,\tau,0}\right)}$$

$$= g_T^{\omega\left(\sum_{j=0}^{\mu^{(\tau,\kappa_\tau,0)}-1} \delta_j^{(\tau,\kappa_\tau,0)} a_{0,j}^{(\tau,\kappa_\tau)} + \pi_{\tau,\kappa_\tau,0}\right) + \zeta\chi_{\tau,\kappa_\tau,0}}$$

$$= g_T^{\omega\left(\sum_{j=0}^{\mu^{(\tau,\kappa_\tau,0)}-1} \delta_j^{(\tau,\kappa_\tau,0)} \sum_{i=1}^{L} \alpha_i a_{i,j}^{(\tau,\kappa_\tau)} + \alpha_i\xi_{i,\tau,0}\right)}$$

$$= g_T^{\omega\left(\sum_{j=0}^{\mu^{(\tau,\kappa_\tau,0)}-1} \delta_j^{(\tau,\kappa_\tau,0)}\left\{a_{0,j}^{(\tau,\kappa_\tau)} + \sum_{i=1}^{L} \alpha_i a_{i,j}^{(\tau,\kappa_\tau)}\right\}\right)}$$

$$= g_T^{\omega\pi_{\tau,\kappa_\tau,0} + \zeta\chi_{\tau,\kappa_\tau,0} + \omega\sum_{i=1}^{L} \alpha_i\xi_{i,\tau,0}}$$

$$= g_T^{\omega\pi_{\tau,\kappa_\tau,0} + \zeta\chi_{\tau,\kappa_\tau,0} + \omega\sum_{i=1}^{L} \alpha_i\xi_{i,\tau,0}}$$

$$K_{\tau,1} = g_T^{\omega\pi_{\tau,\kappa_\tau,1} + \zeta\chi_{\tau,\kappa_\tau,1} + \omega\sum_{i=1}^{L} \beta_i\xi_{i,\tau,1}}$$

$$\prod_{\tau=1}^{m} K_{\tau,0} K_{\tau,1} = g_T^{\sum_{\tau=1}^{m}(\omega(\pi_{\tau,\kappa_\tau,0} + \pi_{\tau,\kappa_\tau,1}) + \zeta(\chi_{\tau,\kappa_\tau,0} + \chi_{\tau,\kappa_\tau,1}) + \omega\sum_{i=1}^{L}(\alpha_i\xi_{i,\tau,0} + \beta_i\xi_{i,\tau,1}))}$$

$$= g_T^{\omega\left(\sum_{\tau=1}^{m} \pi_\tau + \zeta\sum_{\tau=1}^{m} \chi_\tau + \omega\sum_{i=1}^{L} \alpha_i\left(\sum_{\tau=1}^{m} \xi_{i,\tau,0}\right) + \omega\sum_{i=1}^{L} \beta_i\left(\sum_{\tau=1}^{m} \xi_{i,\tau,1}\right)\right)}$$

$$= g_T^\zeta$$

In brief, from (S401) through (S407), the decryption device 300 generates the message msg' (=msg) by executing the Dec algorithm indicated in Formula 144.

$$Dec\left(pk, sk_{\mathbb{S}} := \left(\mathbb{S}, \{k_0^{*(\tau,\kappa,\iota)}, k_1^{*(\tau,\kappa,\iota)}, \ldots, k_L^{*(\tau,\kappa,\iota)}\}_{\tau=1,\ldots,m;\kappa=0,\ldots,f_\tau;\iota=0,1}\right), \quad \text{[Formula 144]}\right.$$

$$ct_\Gamma := \left(\Gamma, c_0, \{c_t\}_{(t,\vec{x}_t) \in \Gamma}, c_{d+1}\right)):$$

If $\mathbb{S} := (\mathcal{A}, \mathcal{B}, d(x), \rho)$ accepts $\Gamma := \{(t, \vec{x}_t)\}$, then compute $\mathcal{I}_{(\rho,\Gamma)} \subseteq \{1, \ldots, L\}, (\alpha_1, \ldots, \alpha_L),$ $(\beta_1, \ldots, \beta_L)$ with $\alpha_i = 0 = \beta_i$ for all $i \notin \mathcal{I}_{(\rho,\Gamma)}$, and $(\kappa_1, \ldots, \kappa_m)$ such that $$\prod_{\tau=1}^{m} d_\tau(x)^{\kappa_\tau} \mid \left(a_0(x) + \sum_{i=1}^{L} \alpha_i a_i(x)\right),$$

and $\prod_{\tau=1}^{m} d_\tau(x)^{f_\tau - \kappa_\tau} \mid \left(b_0(x) + \sum_{i=1}^{L} \beta_i b_i(x)\right),$ $$K_{\tau,0} := e(c_0, k_0^{*(\tau,\kappa_\tau,0)}) \cdot \prod_{i \in \mathcal{I}_{(\rho,\Gamma),0}} e(c_0, k_i^{*(\tau,\kappa_\tau,0)})$$

$$\alpha_i \cdot \prod_{i \in \mathcal{I}_{(\rho,\Gamma),+}} e(c_t, k_i^{*(\tau,\kappa_\tau,0)})\alpha_i \cdot \prod_{i \in \mathcal{I}_{(\rho,\Gamma),-}} e(c_t, k_i^{*(\tau,\kappa_\tau,0)})\alpha_i/(\vec{v}_i \cdot \vec{x}_i),$$

$$K_{\tau,1} := e(c_0, k_0^{*(\tau,\kappa_\tau,1)}) \cdot \prod_{i \in \mathcal{I}_{(\rho,\Gamma),0}} e(c_0, k_i^{*(\tau,\kappa_\tau,1)})$$

-continued $$\beta_i \cdot \prod_{i \in I_{(\rho,\Gamma),+}} e(c_t, k_i^{*(\tau,\kappa_\tau,1)}) \beta_i \cdot \prod_{i \in I_{(\rho,\Gamma),-}} e(c_t, k_i^{*(\tau,\kappa_\tau,1)}) \beta_i / (\vec{v}_i \cdot \vec{x}_i),$$

where $I_{(\rho,\Gamma),0} := \{i \in I_{(\rho,\Gamma)} \mid \rho(i) = p_0\}$, $I_{(\rho,\Gamma),+} := \{i \in I_{(\rho,\Gamma)} \mid \rho(i) = (t, \vec{v}_i)\}$ and $I_{(\rho,\Gamma),-} := \{i \in I_{(\rho,\Gamma)} \mid \rho(i) = \neg (t, \vec{v}_i)\}$.

return $msg' := c_{d+1} / \left( \prod_{\tau=1}^{m} K_{\tau,0} K_{\tau,1} \right)$.

As described above, the cryptographic system 10 according to Embodiment 2 implements the functional encryption scheme that utilizes the quadratic span program.

By utilizing the quadratic span program, a wider range can be expressed as the relation R.

In particular, in the cryptographic system 10 according to Embodiment 2, for each polynomial $d_\tau(x)^{f_\tau}$ obtained by factorizing the target polynomial d(x), an element which is a remainder of dividing a polynomial $a_i(x)$ by a polynomial $d_\tau(x)^{\kappa}$ and an element which is a remainder of dividing a polynomial $b_i(x)$ by a polynomial $d_\tau(x)^{f_\tau-\kappa}$ are treated as key elements $k^{*(\tau,\kappa,\iota)}_0, k^{*(\tau,\kappa,\iota)}_1, \ldots, k^{*(\tau,\kappa,\iota)}_L$. Also, secret information n and secret information $\chi$ are set by sharing in each key element $k^{*(\tau,\kappa,\iota)}_0$. Using the coefficients α and β, pairing operation of the key elements and the cipher elements is carried out to render the remainder set in each key element to 0, the secret information it to 0, and the secret information $\chi$ to 1, thereby extracting the session keys $K_{\tau,0}$ and $K_{\tau,1}$ from the ciphertext. This implements the functional encryption scheme that utilizes the quadratic span program.

The KP-FE scheme has been described above. If the KeyGen algorithm, Enc algorithm, and Dec algorithm are modified as indicated in Formulas 145 to 148, the CP-FE scheme may be realized. Note that the Setup algorithm is the same between the KP-FE scheme and the CP-FE scheme.

[Formula 145]

$KeyGen(pk, sk, \Gamma := \{(t, \vec{x}_t) \mid 1 \leq t \leq d\})$:

$\omega \xleftarrow{U} \mathbb{F}_q$, $\vec{\varphi}_0 \xleftarrow{U} \mathbb{F}_q^{w_0}$, $\vec{\varphi}_t \xleftarrow{U} \mathbb{F}_q^{w_t}$ for $(t, \vec{x}_t) \in \Gamma$, $k_0^* := (\overbrace{\omega, 0, \ldots, 0}^{n_0}, \overbrace{0, \ldots, 0}^{u_0}, \overbrace{\vec{\varphi}_0, 0, \ldots, 0}^{w_0}, \overbrace{1}^{z_0}) \mathbb{B}_0^*,$ $k_t^* := (\overbrace{\omega \vec{x}_t, 0, \ldots, 0}^{n_t}, \overbrace{0, \ldots, 0}^{u_t}, \overbrace{\vec{\varphi}_t, 0, \ldots, 0}^{w_t}, \overbrace{0}^{z_t}) \mathbb{B}_t^*,$ for $(t, \vec{x}_t) \in \Gamma$, return $sk_\Gamma := (\Gamma, k_0^*, \{k_t^*\}_{(t,\vec{x}_t) \in \Gamma})$.

[Formula 146]

$Enc\left(pk, msg, \mathbb{S} := \left(\mathcal{A}, \mathcal{B}, d(x) = \prod_{\tau=1}^{m} d_\tau(x)^{f_\tau}, \rho\right)\right)$:

$\pi_\tau \xleftarrow{U} \mathbb{F}_q, (\tau = 1, \ldots, m-1), \pi_m := -\sum_{\tau=1}^{m-1} \pi_\tau,$ $\pi_{\tau,\kappa,0} \xleftarrow{U} \mathbb{F}_q,$ $\pi_{\tau,\kappa,1} := \pi_\tau - \pi_{\tau,\kappa,0} (\tau = 1, \ldots, m; \kappa = 0, \ldots, f_\tau),$ $\chi_\tau \xleftarrow{U} \mathbb{F}_q, (\tau = 1, \ldots, m-1), \chi_m := 1 - \sum_{\tau=1}^{m-1} \chi_\tau,$ $\chi_{\tau,\kappa,0} \xleftarrow{U} \mathbb{F}_q,$ $\chi_{\tau,\kappa,1} := \chi_\tau - \chi_{\tau,\kappa,0} (\tau = 1, \ldots, m; \kappa = 0, \ldots, f_\tau),$ for $\tau = 1, \ldots, m, \kappa = 0, \ldots, f_\tau, \iota = 0, 1,$ $\mu^{(\tau,\kappa,0)} := deg(d_\tau(x)^{\kappa}),$ $\mu^{(\tau,\kappa,1)} := deg(d_\tau(x)^{f_\tau-\kappa}), (\kappa = 0, \ldots, f_\tau),$ -continued $a_{i,0}^{(\tau,\kappa)} + a_{i,1}^{(\tau,\kappa)} x + \ldots + a_{i,\mu^{(\tau,\kappa,0)}-1}^{(\tau,\kappa)} x^{\mu^{(\tau,\kappa,0)}-1} := a_i(x) \bmod d_\tau(x)^\kappa$, $b_{i,0}^{(\tau,\kappa)} + b_{i,1}^{(\tau,\kappa)} x + \ldots + b_{i,\mu^{(\tau,\kappa,1)}-1}^{(\tau,\kappa)} x^{\mu^{(\tau,\kappa,1)}-1} := b_i(x) \bmod d_\tau(x)^{f_\tau - \kappa}$, $\delta_j^{(\tau,\kappa,\iota)} \xleftarrow{U} \mathbb{F}_q, (j = 0, \ldots, \mu^{(\tau,\kappa,\iota)} - 1)$, $\vec{\eta}_0^{(\tau,\kappa,\iota)} \xleftarrow{U} \mathbb{F}_q^{z_0 - 1}$, $s_0^{(\tau,\kappa,0)} := \sum_{j=0}^{\mu^{(\tau,\kappa,0)}-1} \delta_j^{(\tau,\kappa,0)} \cdot a_{0,j}^{(\tau,\kappa)}$, $s_0^{(\tau,\kappa,1)} := \sum_{j=0}^{\mu^{(\tau,\kappa,1)}-1} \delta_j^{(\tau,\kappa,1)} \cdot b_{0,j}^{(\tau,\kappa)}$,

[Formula 147]

$c_0^{(\tau,\kappa,\iota)} := \left( \overbrace{s_0^{(\tau,\kappa,\iota)} + \pi_{\tau,\kappa,\iota} \vec{e}_0^{(\tau,\kappa,\iota)}}^{n_0}, \overbrace{0, \ldots, 0}^{u_0}, \overbrace{0, 0, \ldots, 0}^{w_0}, \overbrace{\vec{\eta}_0^{(\tau,\kappa,\iota)}, \delta\chi_{\tau,\kappa,\iota}}^{z_0} \right) \mathbb{B}_0$, for $i = 1, \ldots, L$, $\xi_{i,\tau,\iota} \xleftarrow{U} \mathbb{F}_q (i = 1, \ldots, L; \tau = 1, \ldots, m-1; \iota = 0, 1)$, $\xi_{i,m,\iota} := -\sum_{\tau=1}^{m-1} \xi_{i,\tau,\iota} (i = 1, \ldots, L; \iota = 0, 1)$, $s_i^{(\tau,\kappa,0)} := \sum_{j=0}^{\mu^{(\tau,\kappa,0)}-1} \delta_j^{(\tau,\kappa,0)} \cdot a_{i,j}^{(\tau,\kappa)} + \xi_{i,\tau,0}$, $s_i^{(\tau,\kappa,1)} := \sum_{j=0}^{\mu^{(\tau,\kappa,1)}-1} \delta_j^{(\tau,\kappa,1)} \cdot b_{i,j}^{(\tau,\kappa)} + \xi_{i,\tau,1}$, if $\rho(i) = (t, \vec{v}_i)$, $\theta_i \xleftarrow{U} \mathbb{F}_q$, $\vec{\eta}_i \xleftarrow{U} \mathbb{F}_q^{z_t}$, $c_i^{(\tau,\kappa,\iota)} := \left( \overbrace{s_i^{(\tau,\kappa,\iota)} \vec{e}_1 + \theta_i \vec{v}_i, \vec{e}_i^{(\tau,\kappa,\iota)}}^{n_t}, \overbrace{0, \ldots, 0}^{u_t}, \overbrace{0, 0, \ldots, 0}^{w_t}, \overbrace{\vec{\eta}_i}^{z_t} \right) \mathbb{B}_t$, if $\rho(i) = \neg (t, \vec{v}_i)$, $\vec{\eta}_i \xleftarrow{U} \mathbb{F}_q^{z_t}$, $c_i^{(\tau,\kappa,\iota)} := \left( \overbrace{s_i^{(\tau,\kappa,\iota)} \vec{v}_i, \vec{e}_i^{(\tau,\kappa,\iota)}}^{n_t}, \overbrace{0, \ldots, 0}^{u_t}, \overbrace{0, 0, \ldots, 0}^{w_t}, \overbrace{\vec{\eta}_i}^{z_t} \right) \mathbb{B}_t$, if $\rho(i) = p_0$, $\vec{\eta}_i \xleftarrow{U} \mathbb{F}_q^{z_0}$, $c_i^{(\tau,\kappa,\iota)} := \left( \overbrace{s_i^{(\tau,\kappa,\iota)}, \vec{e}_0^{(\tau,\kappa,\iota)}}^{n_0}, \overbrace{0, \ldots, 0}^{u_0}, \overbrace{0, 0, \ldots, 0}^{w_0}, \overbrace{\vec{\eta}_i}^{z_0} \right) \mathbb{B}_0$, $c_{d+1} := g_T^\zeta msg$, return $ct_\mathbb{S} := \left( \mathbb{S}, \{c_0^{(\tau,\kappa,\iota)}, c_1^{(\tau,\kappa,\iota)}, \ldots, c_L^{(\tau,\kappa,\iota)}\}_{\tau=1,\ldots,m; \kappa=0,\ldots,f_\tau; \iota=0,1}, c_{d+1} \right)$.

$Dec\left(pk, sk_\Gamma := \left( \Gamma, k_0^*, \{k_t^*\}_{(t,\vec{x}_t) \in \Gamma} \right), \right.$ [Formula 148]
$\left. ct_\mathbb{S} := \left( \mathbb{S}, \{c_0^{(\tau,\kappa,\iota)}, c_1^{(\tau,\kappa,\iota)}, \ldots, c_L^{(\tau,\kappa,\iota)}\}_{\tau=1,\ldots,m; \kappa=0,\ldots,f_\tau; \iota=0,1}, c_{d+1} \right) \right)$:

If $\mathbb{S} := (\mathcal{A}, \mathcal{B}, d(x), \rho)$ accepts $\Gamma := \{(t, \vec{x}_t)\}$,
then compute $\mathcal{I}_{(\rho,\Gamma)} \subseteq \{1, \ldots, L\}$, $(\alpha_1, \ldots, \alpha_L)$,
$(\beta_1, \ldots, \beta_L)$ with $\alpha_i = 0 = \beta_i$ for all $i \notin \mathcal{I}_{(\rho,\Gamma)}$, and $(\kappa_1, \ldots, \kappa_m)$ such that $\prod_{\tau=1}^m d_\tau(x)^{\kappa_\tau} \left| \left( a_0(x) + \sum_{i=1}^L \alpha_i a_i(x) \right) \right.$, and $\prod_{\tau=1}^m d_\tau(x)^{f_\tau - \kappa_\tau} \left| \left( b_0(x) + \sum_{i=1}^L \beta_i b_i(x) \right) \right.$, -continued $$K_{\tau,0} := e(k_0 c_0^{*(\tau,\kappa_\tau,0)}) \cdot \prod_{i \in I_{(\rho,\Gamma),0}} e(k_0, c_i^{*(\tau,\kappa_\tau,0)})$$

$$\alpha_i \cdot \prod_{i \in I_{(\rho,\Gamma),+}} e(k_t, c_i^{*(\tau,\kappa_\tau,0)})\alpha_i \cdot \prod_{i \in I_{(\rho,\Gamma),-}} e(k_t, c_i^{*(\tau,\kappa_\tau,0)})\alpha_i / (\vec{v}_i \cdot \vec{x}_t),$$

$$K_{\tau,1} := e(k_0 c_0^{*(\tau,\kappa_\tau,1)}) \cdot \prod_{i \in I_{(\rho,\Gamma),0}} e(k_0, c_i^{*(\tau,\kappa_\tau,1)})$$

$$\beta_i \cdot \prod_{i \in I_{(\rho,\Gamma),+}} e(k_t, c_i^{*(\tau,\kappa_\tau,1)})\beta_i \cdot \prod_{i \in I_{(\rho,\Gamma),-}} e(k_t, c_i^{*(\tau,\kappa_\tau,1)})\beta_i / (\vec{v}_i \cdot \vec{x}_t),$$

where $I_{(\rho,\Gamma),0} := \{i \in I_{(\rho,\Gamma)} \mid \rho(i) = p_0\}$,
$I_{(\rho,\Gamma),+} := \{i \in I_{(\rho,\Gamma)} \mid \rho(i) = (t, \vec{v}_i)\}$ and
$I_{(\rho,\Gamma),-} := \{i \in I_{(\rho,\Gamma)} \mid \rho(i) = \neg(t, \vec{v}_i)\}$.

return $msg' := c_{d+1} / \left( \prod_{\tau=1}^{m} K_{\tau,0} K_{\tau,1} \right)$.

The functional encryption scheme has been described above. If the Setup algorithm, KeyGen algorithm, Enc algorithm, and Dec algorithm are modified as indicated in Formulas 149 to 153, an attribute-based encryption scheme may be realized.

With the attribute-based encryption scheme, in the Setup algorithm, $n_t$ is $2mf_{max}k_{max}+2$.

[Formula 149]

$$\text{Setup}(1^\lambda):$$
$$(param, (\mathbb{B}_t, \mathbb{B}_t^*)_{t=0,\ldots,d}) \xleftarrow{R} \mathcal{G}_{ob}(1^\lambda)$$
$$\hat{\mathbb{B}}_0 := (b_{0,1}, b_{0,n_0+u_0+w_0+1}, \ldots, b_{0,n_0+u_0+w_0+z_0}),$$
$$\hat{\mathbb{B}}_t := (b_{t,1}, b_{t,2}, b_{t,n_t+u_t+w_t+1}, \ldots, b_{t,n_t+u_t+w_t+z_t}),$$
$$\text{for } t = 1, \ldots, d,$$
$$\hat{\mathbb{B}}_0^* := (b_{0,1}^*, \ldots, b_{0,n_0}^*, b_{0,n_0+u_0+1}^*, \ldots, b_{0,n_0+u_0+w_0}^*, b_{0,n_0+u_0+w_0+z_0}^*),$$
$$\hat{\mathbb{B}}_t^* := (b_{t,1}^*, \ldots, b_{t,n_t}^*, b_{t,n_t+u_t+1}^*, \ldots, b_{t,n_t+u_t+w_t}^*)$$
$$\text{for } t = 1, \ldots, d,$$
$$\text{return } pk := (1^\lambda, \{\hat{\mathbb{B}}_t\}_{t=0,\ldots,d}, param),$$
$$sk := \{\hat{\mathbb{B}}_t^*\}_{t=0,\ldots,d}.$$

[Formula 150]

$$\text{KeyGen}\left(pk, sk, \mathbb{S} := \left(\mathcal{A}, \mathcal{B}, d(x) = \prod_{\tau=1}^{m} d_\tau(x)^{f_\tau}, \rho\right)\right):$$

$$\pi_\tau \xleftarrow{U} \mathbb{F}_q, (\tau = 1, \ldots, m-1), \pi_m := -\sum_{\tau=1}^{m-1} \pi_\tau,$$

$$\pi_{\tau,\kappa,0} \xleftarrow{U} \mathbb{F}_q,$$

$$\pi_{\tau,\kappa,1} := \pi_\tau - \pi_{\tau,\kappa,0} (\tau = 1, \ldots, m; \kappa = 0, \ldots, f_\tau),$$

$$\chi_\tau \xleftarrow{U} \mathbb{F}_q, (\tau = 1, \ldots, m-1), \chi_m := 1 - \sum_{\tau=1}^{m-1} \chi_\tau,$$

$$\chi_{\tau,\kappa,0} \xleftarrow{U} \mathbb{F}_q,$$

$$\chi_{\tau,\kappa,1} := \chi_\tau - \chi_{\tau,\kappa,0} (\tau = 1, \ldots, m; \kappa = 0, \ldots, f_\tau),$$
$$\text{for } \tau = 1, \ldots, m, \kappa = 0, \ldots, f_\tau, \iota = 0, 1,$$
$$\mu^{(\tau,\kappa,0)} := deg(d_\tau(x)^\kappa),$$
$$\mu^{(\tau,\kappa,1)} := deg(d_\tau(x)^{f_\tau-\kappa}), (\kappa = 0, \ldots, f_\tau),$$

$$a_{i,0}^{(\tau,\kappa)} + a_{i,1}^{(\tau,\kappa)} x + \ldots + a_{i,\mu^{(\tau,\kappa,0)}-1}^{(\tau,\kappa)} x^{\mu^{(\tau,\kappa,0)}-1} := a_i(x) \bmod d_\tau(x)^\kappa,$$

$$b_{i,0}^{(\tau,\kappa)} + b_{i,1}^{(\tau,\kappa)} x + \ldots + b_{i,\mu^{(\tau,\kappa,1)}-1}^{(\tau,\kappa)} x^{\mu^{(\tau,\kappa,1)}-1} := b_i(x) \bmod d_\tau(x)^{f_\tau-\kappa},$$

-continued $\delta_j^{(\tau,\kappa,\iota)} \xleftarrow{U} \mathbb{F}_q, (j = 0, \ldots, \mu^{(\tau,\kappa,\iota)} - 1),$ $\vec{\eta}_0^{(\tau,\kappa,\iota)} \xleftarrow{U} \mathbb{F}_q^{w_0},$ $s_0^{(\tau,\kappa,0)} := \sum_{j=0}^{\mu^{(\tau,\kappa,0)}-1} \delta_j^{(\tau,\kappa,0)} \cdot a_{0,j}^{(\tau,\kappa)},$ $s_0^{(\tau,\kappa,1)} := \sum_{j=0}^{\mu^{(\tau,\kappa,1)}-1} \delta_j^{(\tau,\kappa,1)} \cdot b_{0,j}^{(\tau,\kappa)},$

[Formula 151]

$k_0^{*(\tau,\kappa,\iota)} := \left( \overbrace{s_0^{(\tau,\kappa,\iota)} + \pi_{\tau,\kappa,\iota}, \vec{e}_0^{(\tau,\kappa,\iota)}}^{n_0}, \overbrace{0, \ldots, 0}^{u_0}, \overbrace{\vec{\eta}_0^{(\tau,\kappa,\iota)}}^{w_0}, \overbrace{0, \ldots, 0}^{z_0}, \chi_{\tau,\kappa,\iota} \right) \mathbb{B}_0^*,$ for $i = 1, \ldots, L,$ $\xi_{i,\tau,\iota} \xleftarrow{U} \mathbb{F}_q (i = 1, \ldots, L; \tau = 1, \ldots, m-1; \iota = 0, 1),$ $\xi_{i,m,\iota} := -\sum_{\tau=1}^{m-1} \xi_{i,\tau,\iota} (i = 1, \ldots, L; \iota = 0, 1),$ $s_i^{(\tau,\kappa,0)} := \sum_{j=0}^{\mu^{(\tau,\kappa,0)}-1} \delta_j^{(\tau,\kappa,0)} \cdot a_{i,j}^{(\tau,\kappa)} + \xi_{i,\tau,0},$ $s_i^{(\tau,\kappa,1)} := \sum_{j=0}^{\mu^{(\tau,\kappa,1)}-1} \delta_j^{(\tau,\kappa,1)} \cdot b_{i,j}^{(\tau,\kappa)} + \xi_{i,\tau,1},$ if $\rho(i) = (t, v_i), \theta_i \xleftarrow{U} \mathbb{F}_q, \vec{\eta}_i \xleftarrow{U} \mathbb{F}_q^{w_t},$ $k_i^{*(\tau,\kappa,\iota)} := \left( \overbrace{s_i^{(\tau,\kappa,\iota)} + \theta_i v_i, -\theta_i, \vec{e}_i^{(\tau,\kappa,\iota)}}^{n_t}, \overbrace{0, \ldots, 0}^{u_t}, \overbrace{\vec{\eta}_i, 0, \ldots, 0}^{w_t}, \overbrace{0}^{z_t} \right) \mathbb{B}_t^*,$ if $\rho(i) = \neg (t, v_i), \vec{\eta}_i \xleftarrow{U} \mathbb{F}_q^{w_t},$ $k_i^{*(\tau,\kappa,\iota)} := \left( \overbrace{s_i^{(\tau,\kappa,\iota)} v_i, -s_i^{(\tau,\kappa,\iota)} \vec{e}_i^{(\tau,\kappa,\iota)}}^{n_t}, \overbrace{0, \ldots, 0}^{u_t}, \overbrace{\vec{\eta}_i, 0, \ldots, 0}^{w_t}, \overbrace{0}^{z_t} \right) \mathbb{B}_t^*,$ if $\rho(i) = p_0, \vec{\eta}_i \xleftarrow{U} \mathbb{F}_q^{w_0},$ $k_i^{*(\tau,\kappa,\iota)} := \left( \overbrace{s_i^{(\tau,\kappa,\iota)}, \vec{e}_0^{(\tau,\kappa,\iota)}}^{n_0}, \overbrace{0, \ldots, 0}^{u_0}, \overbrace{\vec{\eta}_i, 0, \ldots, 0}^{w_0}, \overbrace{0}^{z_0} \right) \mathbb{B}_0^*,$ return $sk_\mathbb{S} := \left( \begin{array}{c} \mathbb{S}, \\ \{k_0^{*(\tau,\kappa,\iota)}, k_1^{*(\tau,\kappa,\iota)}, \ldots, k_L^{*(\tau,\kappa,\iota)}\}_{\tau=1,\ldots,m;\kappa=0,\ldots,f_\tau;\iota=0,1} \end{array} \right).$ $Enc(pk, msg, \Gamma := \{(t, x_t) | 1 \leq t \leq d\}):$ [Formula 152]

$\omega, \zeta \xleftarrow{U} \mathbb{F}_q,$ $\vec{\varphi}_0 \xleftarrow{U} \mathbb{F}_q^{z_0-1},$ $\vec{\varphi}_t \xleftarrow{U} \mathbb{F}_q^{z_t}$ for $(t, x_t) \in \Gamma,$ $c_0 := \left( \overbrace{\omega, 0, \ldots, 0}^{n_0}, \overbrace{0, 0, \ldots, 0}^{u_0}, \overbrace{0, 0, \ldots, 0}^{w_0}, \overbrace{\vec{\varphi}_0, \zeta}^{z_0} \right) \mathbb{B}_0,$ $c_t := \left( \overbrace{\omega(1, x_t), 0, \ldots, 0}^{n_t}, \overbrace{0, 0, \ldots, 0}^{u_t}, \overbrace{0, 0, \ldots, 0}^{w_t}, \overbrace{\vec{\varphi}_t}^{z_t} \right) \mathbb{B}_t,$ for $(t, x_t) \in \Gamma,$ $c_{d+1} := g_T^\zeta msg, ct_\Gamma := (\Gamma, c_0, \{c_t\}_{(t,x_t) \in \Gamma}, c_{d+1}),$ return $ct_\Gamma.$ $Dec\left( pk, sk_\mathbb{S} := \left( \begin{array}{c} \mathbb{S}, \\ \{k_0^{*(\tau,\kappa,\iota)}, k_1^{*(\tau,\kappa,\iota)}, \ldots, k_L^{*(\tau,\kappa,\iota)}\}_{\tau=1,\ldots,m;\kappa=0,\ldots,f_\tau;\iota=0,1} \end{array} \right), \right.$ [Formula 153]

$\left. ct_\Gamma := (\Gamma, c_0, \{c_t\}_{(t,x_t) \in \Gamma}, c_{d+1}) \right):$ -continued If $\mathbb{S} := (\mathcal{A}, \mathcal{B}, d(x), \rho)$ accepts $\Gamma := \{(t, x_t)\}$,
then compute $\mathcal{I}_{(\rho,\Gamma)} \subseteq \{1, \ldots, L\}$, $(\alpha_1, \ldots, \alpha_L)$,
$(\beta_1, \ldots, \beta_L)$ with $\alpha_i = 0 = \beta_i$ for all $i \notin \mathcal{I}_{(\rho,\Gamma)}$,
and $(\kappa_1, \ldots, \kappa_m)$ such that $$\prod_{\tau=1}^{m} d_\tau(x)^{\kappa_\tau} \Big| \Big( a_0(x) + \sum_{i=1}^{L} \alpha_i a_i(x) \Big),$$

and $\prod_{\tau=1}^{m} d_\tau(x)^{f_\tau - \kappa_\tau} \Big| \Big( b_0(x) + \sum_{i=1}^{L} \beta_i b_i(x) \Big)$, $$K_{\tau,0} := e\big(c_0 k_0^{*(\tau,\kappa_\tau,0)}\big) \cdot \prod_{i \in \mathcal{I}_{(\rho,\Gamma),0}} e\big(c_0, k_i^{*(\tau,\kappa_\tau,0)}\big)$$

$$\alpha_i \cdot \prod_{i \in \mathcal{I}_{(\rho,\Gamma),+}} e\big(c_t, k_i^{*(\tau,\kappa_\tau,0)}\big)\alpha_i \cdot \prod_{i \in \mathcal{I}_{(\rho,\Gamma),-}} e\big(c_t, k_i^{*(\tau,\kappa_\tau,0)}\big)\alpha_i / (v_i \cdot x_t),$$

$$K_{\tau,1} := e\big(c_0 k_0^{*(\tau,\kappa_\tau,1)}\big) \cdot \prod_{i \in \mathcal{I}_{(\rho,\Gamma),0}} e\big(c_0, k_i^{*(\tau,\kappa_\tau,1)}\big)$$

$$\beta_i \cdot \prod_{i \in \mathcal{I}_{(\rho,\Gamma),+}} e\big(c_t, k_i^{*(\tau,\kappa_\tau,1)}\big)\beta_i \cdot \prod_{i \in \mathcal{I}_{(\rho,\Gamma),-}} e\big(c_t, k_i^{*(\tau,\kappa_\tau,1)}\big)\beta_i / (v_i \cdot x_t),$$

where $\mathcal{I}_{(\rho,\Gamma),0} := \{i \in \mathcal{I}_{(\rho,\Gamma)} \mid \rho(i) = p_0\}$,
$\mathcal{I}_{(\rho,\Gamma),+} := \{i \in \mathcal{I}_{(\rho,\Gamma)} \mid \rho(i) = (t, v_i)\}$ and
$\mathcal{I}_{(\rho,\Gamma),-} := \{i \in \mathcal{I}_{(\rho,\Gamma)} \mid \rho(i) = \neg (t, v_i)\}$.

return $msg' := c_{d+1} \Big/ \Big( \prod_{\tau=1}^{m} K_{\tau,0} K_{\tau,1} \Big)$.

Likewise, the CP-FE scheme indicated in Formulas 145 to 148 can be altered to the attribute-based encryption scheme.

In the above explanation, $n_0 + u_0 + w_0 + z_0$ is set in $N_0$ and $n_t + u_t + w_t + z_t$ is set in $N_t$. It for example, $u_0 = n_0$, $w_0 = n_0$, and $z_0 = 2$, then $n_0 + n_0 + n_0 + 2 = 3n_0 + 2$ may be set in $N_0$. If $u_t = n_t$, $w_t = n_t$, and $z_t = 1$, then $n_t + n_t + n_t + 1 = 3n_t + 1$ may be set in $N_t$.

Embodiment 3.

Embodiment 3 will exemplify a functional encryption scheme in which, as compared to the functional encryption scheme described in Embodiment 2, the number of bases increases but the dimension number of each basis decreases.

Explanation will be given in Embodiment 3 mainly on portions that are different from the cryptographic system 10 according to Embodiment 2.

The configurations of a key generation device 100, an encryption device 200, and a decryption device 300 according to Embodiment 3 are respectively the same as the configurations of the key generation device 100, the encryption device 200, and the decryption device 300 according to Embodiment 2 shown in FIGS. 5 and 7.

The process of a Dec algorithm according to Embodiment 3 is the same as the process of the Dec algorithm according to Embodiment 2. Hence, the processes of a Setup algorithm, KeyGen algorithm, and Enc algorithm according to Embodiment 3 will be described.

The process flows of the Setup algorithm, KeyGen algorithm, and Enc algorithm according to Embodiment 3 are the same as the process flows of the Setup algorithm, KeyGen algorithm, and Enc algorithm according to Embodiment 2 shown in FIGS. 8 to 10.

The process of the Setup algorithm will be described with reference to FIG. 8.

(S101: Orthogonal Basis Generation Step)

The processes of (1) to (3) are the same as those in Embodiment 2.

(4) A master key generation part 110 sets $n_0 + u_0 + w_0 + z_0$ in $N_0$, and sets $n_t + u_t + w_t + z_t$ in $N_t$ concerning each integer t of $t = 1, \ldots, d$ (d is an integer of 1 or more). Note that $n_0$ is 1 and $n_t$ is n where: n is an integer of 1 or more and $u_0$, $w_0$, $z_0$, $u_t$, $w_t$, and $z_t$ are each an integer of 0 or more.

Subsequently, the master key generation part 110 executes processes (5) to (9) concerning integers $\tau$, $\kappa$, $\iota$, and t of $\tau = 1, \ldots, m$, $\kappa = 0, \ldots, f_\tau$, $\iota = 0, 1$, and $t = 0, \ldots, d$.

The process of (5) is the same as that in Embodiment 2.

(6) The master key generation part 110 generates linear transformation $X_t^{(\tau,\kappa,\iota)} := (\chi_{t,i,j}^{(\tau,\kappa,\iota)})_{i,j}$ randomly, in the same manner as in Embodiment 2.

(7) The master key generation part 110 generates $X^*_t{}^{(\tau,\kappa,\iota)} := (v_{t,i,j}^{(\tau,\kappa,\iota)})_{i,j} := \psi(X_t^{(\tau,\kappa,\iota)T})^{-1}$, in the same manner as in Embodiment 2.

(8) Based on the linear transformation $X_t^{(\tau,\kappa,\iota)}$ generated in (6), the master key generation part 110 generates a basis $B_t^{(\tau,\kappa,\iota)}$ from a canonical basis $A_t$ generated in (5), in the same manner as in Embodiment 2.

(9) Based on the linear transformation $X^*_t{}^{(\tau,\kappa,\iota)}$ generated in (7), the master key generation part 110 generates a basis $B^*_t{}^{(\tau,\kappa,\iota)}$ from the canonical basis $A_t$ generated in (5), in the same manner as in Embodiment 2.

The process of (10) is the same as that in Embodiment 2.

(S102: Public Parameter Generation Step)

With the processing device, the master key generation part 110 generates subbases $\hat{B}_0^{(\tau,\kappa,\iota)}$ and $\hat{B}_t^{(\tau,\kappa,\iota)}$ of the bases $B_0^{(\tau,\kappa,\iota)}$ and $B_t^{(\tau,\kappa,\iota)}$, respectively, which are generated in (S101), as indicated in Formula 154.

$\hat{\mathbb{B}}_0^{(\tau,\kappa,\iota)} := b_{0,1}^{(\tau,\kappa,\iota)}, b_{0,n_0+u_0+w_0+1}^{(\tau,\kappa,\iota)}, \ldots, b_{0,n_0+u_0+w_0+z_0}^{(\tau,\kappa,\iota)}$, $$\hat{\mathbb{B}}_t^{(\tau,\kappa,\iota)} := (b_{t,1}^{(\tau,\kappa,\iota)}, \ldots, b_{t,n_t}^{(\tau,\kappa,\iota)}, b_{t,n_t+u_t+w_t+1}^{(\tau,\kappa,\iota)}, \ldots, b_{t,n_t+u_t+w_t+z_t}^{(\tau,\kappa,\iota)})$$ [Formula 154]

for t=1, ..., d

The master key generation part 110 treats the generated subbases $\hat{B}_0^{(\tau,\kappa,\iota)}$ and $\hat{B}_t^{(\tau,\kappa,\iota)}$, the security parameter λ inputted in (S101), and param generated in (S101), to form public parameters pk.

(S103: Master Key Generation Step)

With the processing device, the master key generation part 110 generates subbases $\hat{B}^{*(\tau,\kappa,\iota)}_0$ and $\hat{B}^{*(\tau,\kappa,\iota)}_t$ of the bases $B^{*(\tau,\kappa,\iota)}_0$ and $B^{*(\tau,\kappa,\iota)}_t$, respectively, which are generated in (S101), as indicated in Formula 155.

$$\hat{\mathbb{B}}^{*(\tau,\kappa,\iota)}_0 := (b^{*(\tau,\kappa,\iota)}_{0,1}, \ldots, b^{*(\tau,\kappa,\iota)}_{0,n_0}, b^{*(\tau,\kappa,\iota)}_{0,n_0+u_0+1}, \ldots, b^{*(\tau,\kappa,\iota)}_{0,n_0+u_0+w_0}, b^{*(\tau,\kappa,\iota)}_{0,n_0+u_0+w_0+z_0}),$$

$$\hat{\mathbb{B}}^{*(\tau,\kappa,\iota)}_t := (b^{*(\tau,\kappa,\iota)}_{t,1}, \ldots, b^{*(\tau,\kappa,\iota)}_{t,n_t}, b^{*(\tau,\kappa,\iota)}_{t,n_t+u_t+1}, \ldots, b^{*(\tau,\kappa,\iota)}_{t,n_t+u_t+w_t})$$ [Formula 155]

for t=1, ..., d

The master key generation part 110 treats the generated subbases $\hat{B}^{*(\tau,\kappa,\iota)}_0$ and $\hat{B}^{*(\tau,\kappa,\iota)}_t$, to form the master key sk.

The process of (S104) is the same as that in Embodiment 2.

In brief, from (S101) through (S103), the key generation device 100 generates the public parameters pk and the master key sk by executing the Setup algorithm indicated in Formula 156. Then, in (S104), the key generation device 100 stores the generated public parameters pk and master key sk, in the storage device.

Setup($1^\lambda$): [Formula 156]

(param, $$(\mathbb{B}_t^{(\tau,\kappa,\iota)}, \mathbb{B}_t^{*(\tau,\kappa,\iota)})_{t=0,\ldots,d;\tau=1,\ldots,m;\kappa=0,\ldots,f_\tau;\iota=0,1} \xleftarrow{R}$$

-continued $$\mathcal{G}_{ob}(1^\lambda),$$

for τ = 1, ..., m κ = 0, ..., $f_\tau$, ι = 0, 1, $$\hat{\mathbb{B}}_0^{(\tau,\kappa,\iota)} := (b_{0,1}^{(\tau,\kappa,\iota)}, b_{0,n_0+u_0+w_0+1}^{(\tau,\kappa,\iota)}, \ldots, b_{0,n_0+u_0+w_0+z_0}^{(\tau,\kappa,\iota)}),$$

$$\hat{\mathbb{B}}_t^{(\tau,\kappa,\iota)} :=$$

$$(b_{t,1}^{(\tau,\kappa,\iota)}, \ldots, b_{t,n_t}^{(\tau,\kappa,\iota)}, b_{t,n_t+u_t+w_t+1}^{(\tau,\kappa,\iota)}, \ldots, b_{t,n_t+u_t+w_t+z_t}^{(\tau,\kappa,\iota)})$$

for t = 1, ..., d, $$\hat{\mathbb{B}}_0^{*(\tau,\kappa,\iota)} := (b_{0,1}^{*(\tau,\kappa,\iota)}, \ldots, b_{0,n_0}^{*(\tau,\kappa,\iota)},$$

$$b_{0,n_0+u_0+1}^{*(\tau,\kappa,\iota)}, \ldots, b_{0,n_0+u_0+w_0}^{*(\tau,\kappa,\iota)}, b_{0,n_0+u_0+w_0+z_0}^{*(\tau,\kappa,\iota)}),$$

$$\hat{\mathbb{B}}_t^{*(\tau,\kappa,\iota)} := (b_{t,1}^{*(\tau,\kappa,\iota)}, \ldots, b_{t,n_t}^{*(\tau,\kappa,\iota)},$$

$$b_{t,n_t+u_t+1}^{*(\tau,\kappa,\iota)}, \ldots, b_{t,n_t+u_t+w_t}^{*(\tau,\kappa,\iota)})$$

for t = 1, ..., d, return pk := $(1^\lambda, \{\hat{\mathbb{B}}_t\}_{t=0,\ldots,d}, param)$, sk := $\{\hat{\mathbb{B}}_t^*\}_{t=0,\ldots,d}$.

The process of the KeyGen algorithm will be described with reference to FIG. 9.

The processes of (S201) through (S204) and of (S206) are the same as those in Embodiment 2.

(S205: Key Element Generation Step)

With the processing device, concerning each integer τ of τ=1 ..., m, each integer κ of κ=0, ..., $f_\tau$, and each integer ι of ι=0, 1, a key element generation part 142 generates an element $k^{*(\tau,\kappa,\iota)}_0$ of a decryption key $sk_s$, as indicated in Formula 157.

$$\vec{\eta}_0^{(\tau,\kappa,\iota)} \xleftarrow{U} \mathbb{F}_q^{w_0},$$ [Formula 157]

$$k_0^{*(\tau,\kappa,\iota)} := \left( \overbrace{s_0^{(\tau,\kappa,\iota)} + \pi_{\tau,\kappa,\iota}}^{n_0}, \overbrace{0, \ldots, 0}^{u_0}, \overbrace{\vec{\eta}_0^{(\tau,\kappa,\iota)}}^{w_0}, \overbrace{0, \ldots, 0, \chi_{\tau,\kappa,\iota}}^{z_0} \right) \mathbb{B}_0^{*(\tau,\kappa,\iota)}$$

With the processing device, concerning each integer τ of τ=1 ..., m, each integer κ of κ=0, ..., $f_\tau$, each integer ι of ι=0, 1, and each integer i of i=1, ..., L, the key element generation part 142 generates an element $k^{*(\tau,\kappa,\iota)}_i$ of the decryption key $sk_s$, as indicated in Formula 158.

if $\rho(i) = (t, \vec{v}_i)$, $\theta_i \xleftarrow{U} \mathbb{F}_q$, $\vec{\eta}_i \xleftarrow{U} \mathbb{F}_q^{w_t}$, [Formula 158]

$$k_i^{*(\tau,\kappa,\iota)} := \left( \overbrace{s_i^{(\tau,\kappa,\iota)} \vec{e}_1 + \theta_i \vec{v}_i}^{n_t}, \overbrace{0, \ldots, 0}^{u_t}, \overbrace{\vec{\eta}_i}^{w_t}, \overbrace{0, \ldots, 0}^{z_t} \right) \mathbb{B}_t^{*(\tau,\kappa,\iota)},$$

if $\rho(i) = \neg (t, \vec{v}_i)$, $\vec{\eta}_i \xleftarrow{U} \mathbb{F}_q^{w_t}$, $$k_i^{*(\tau,\kappa,\iota)} := \left( \overbrace{s_i^{(\tau,\kappa,\iota)} \vec{v}_i}^{n_t}, \overbrace{0, \ldots, 0}^{u_t}, \overbrace{\vec{\eta}_i}^{w_t}, \overbrace{0, \ldots, 0}^{z_t} \right) \mathbb{B}_t^{*(\tau,\kappa,\iota)},$$

if $\rho(i) = p_0$, $\vec{\eta}_i \xleftarrow{U} \mathbb{F}_q^{w_0}$, $$k_i^{*(\tau,\kappa,\iota)} := \left( \overbrace{s_i^{(\tau,\kappa,\iota)}}^{n_0}, \overbrace{0, \ldots, 0}^{u_0}, \overbrace{\vec{\eta}_i}^{w_0}, \overbrace{0, \ldots, 0}^{z_0} \right) \mathbb{B}_0^{*(\tau,\kappa,\iota)}$$

In brief, from (S201) through (S205), the key generation device 100 generates the decryption key $sk_\mathbb{S}$ by executing the KeyGen algorithm indicated in Formulas 159 to 160. Then, in (S206), the key generation device 100 distributes the generated decryption key $sk_\mathbb{S}$ to the decryption device 300.

[Formula 159]
$$KeyGen\left(pk, sk, \mathbb{S} := \left(\mathcal{A}, \mathcal{B}, d(x) = \prod_{\tau=1}^{m} d_\tau(x)^{f_\tau}, \rho\right)\right):$$

$$\pi_\tau \xleftarrow{U} \mathbb{F}_q, (\tau = 1, \ldots, m-1), \pi_m := -\sum_{\tau=1}^{m-1} \pi_\tau,$$

$$\pi_{\tau,\kappa,0} \xleftarrow{U} \mathbb{F}_q,$$

$$\pi_{\tau,\kappa,1} := \pi_\tau - \pi_{\tau,\kappa,0}(\tau = 1, \ldots, m; \kappa = 0, \ldots, f_\tau),$$

$$\chi_\tau \xleftarrow{U} \mathbb{F}_q, (\tau = 1, \ldots, m-1), \chi_m := 1 - \sum_{\tau=1}^{m-1} \chi_\tau,$$

$$\chi_{\tau,\kappa,0} \xleftarrow{U} \mathbb{F}_q,$$

$$\chi_{\tau,\kappa,1} := \chi_\tau - \chi_{\tau,\kappa,0}(\tau = 1, \ldots, m; \kappa = 0, \ldots, f_\tau),$$

for $\tau = 1, \ldots, m, \kappa = 0, \ldots, f_\tau, \iota = 0, 1,$ $\mu^{(\tau,\kappa,0)} := deg(d_\tau(x)^\kappa), \mu^{(\tau,\kappa,1)} := deg(d_\tau(x)^{f_\tau - \kappa}),$ $(\kappa = 0, \ldots, f_\tau),$ $$a_{i,0}^{(\tau,\kappa)} + a_{i,1}^{(\tau,\kappa)} x + \ldots + a_{i,\mu^{(\tau,\kappa,0)}-1}^{(\tau,\kappa)} x^{\mu^{(\tau,\kappa,0)}-1} :=$$

$$a_i(x) \bmod d_\tau(x)^\kappa,$$

$$b_{i,0}^{(\tau,k)} + b_{i,1}^{(\tau,\kappa)} x + \ldots + b_{i,\mu^{(\tau,\kappa,1)}-1}^{(\tau,\kappa)} x^{\mu^{(\tau,\kappa,1)}-1} :=$$

$$b_i(x) \bmod d_\tau(x)^{f_\tau-\kappa},$$

$$\delta_j^{(\tau,\kappa,\iota)} \xleftarrow{U} \mathbb{F}_q, (j = 0, \ldots, \mu^{(\tau,\kappa,\iota)} - 1),$$

$$\vec{\eta}_0^{(\tau,\kappa,\iota)} \xleftarrow{U} \mathbb{F}_q^{w_0},$$

$$s_0^{(\tau,\kappa,0)} := \sum_{j=0}^{\mu^{(\tau,\kappa,0)}-1} \delta_j^{(\tau,\kappa,0)} \cdot a_{0,j}^{(\tau,\kappa)},$$

$$s_0^{(\tau,\kappa,1)} := \sum_{j=0}^{\mu^{(\tau,\kappa,1)}-1} \delta_j^{(\tau,\kappa,1)} \cdot b_{0,j}^{(\tau,\kappa)},$$

[Formula 160]
$$k_0^{*(\tau,\kappa,\iota)} :=$$

$$\left(\overbrace{s_0^{(\tau,\kappa,\iota)} + \pi_{\tau,\kappa,\iota}, 0, \ldots, 0}^{n_0}, \overbrace{0, \ldots, 0}^{u_0}, \overbrace{\vec{\eta}_0^{(\tau,\kappa,\iota)}}^{w_0}, \overbrace{0, \ldots, 0}^{z_0}, \chi_{\tau,\kappa,\iota}\right) \mathbb{B}_0^{*(\tau,\kappa,\iota)},$$

for $i = 1, \ldots, L,$ $$\xi_{i,\tau,\iota} \xleftarrow{U} \mathbb{F}_q (i = 1, \ldots, L; \tau = 1, \ldots, m-1; \iota = 0, 1),$$

$$\xi_{i,\tau,\iota} := -\sum_{\tau=1}^{m-1} \xi_{i,\tau,\iota}(i = 1, \ldots, L; \iota = 0, 1),$$

$$s_i^{(\tau,\kappa,0)} := \sum_{j=0}^{\mu^{(\tau,\kappa,0)}-1} \delta_j^{(\tau,\kappa,0)} \cdot a_{i,j}^{(\tau,\kappa)} + \xi_{i,\tau,0},$$

$$s_i^{(\tau,\kappa,1)} := \sum_{j=0}^{\mu^{(\tau,\kappa,1)}-1} \delta_j^{(\tau,\kappa,1)} \cdot b_{i,j}^{(\tau,\kappa)} + \xi_{i,\tau,1},$$

if $\rho(i) = (t, \vec{v}_i), \theta_i \xleftarrow{U} \mathbb{F}_q, \vec{\eta}_i \xleftarrow{U} \mathbb{F}_q^{w_t},$ -continued $$k_i^{*(\tau,\kappa,\iota)} := \left(\overbrace{s_i^{(\tau,\kappa,\iota)} \vec{e}_1 + \theta_i \vec{v}_i, 0, \ldots, 0}^{n_t}, \overbrace{0, \ldots, 0}^{u_t}, \overbrace{\vec{\eta}_i, 0, \ldots, 0}^{w_t}, \overbrace{0, \ldots, 0}^{z_t}\right) \mathbb{B}_t^{*(\tau,\kappa,\iota)},$$

if $\rho(i) = \neg(t, \vec{v}_i), \vec{\eta}_i \xleftarrow{U} \mathbb{F}_q^{w_t},$ $$k_i^{*(\tau,\kappa,\iota)} := \left(\overbrace{s_i^{(\tau,\kappa,\iota)} \vec{v}_i, 0, \ldots, 0}^{n_t}, \overbrace{0, \ldots, 0}^{u_t}, \overbrace{\vec{\eta}_i, 0, \ldots, 0}^{w_t}, \overbrace{0, \ldots, 0}^{z_t}\right) \mathbb{B}_t^{*(\tau,\kappa,\iota)},$$

if $\rho(i) = p_0, \vec{\eta}_i \xleftarrow{U} \mathbb{F}_q^{w_0},$ $$k_i^{*(\tau,\kappa,\iota)} := \left(\overbrace{s_i^{(\tau,\kappa,\iota)}, 0, \ldots, 0}^{n_0}, \overbrace{0, \ldots, 0}^{u_0}, \overbrace{\vec{\eta}_i, 0, \ldots, 0}^{w_0}, \overbrace{0, \ldots, 0}^{z_0}\right) \mathbb{B}_0^{*(\tau,\kappa,\iota)},$$

return $sk_\mathbb{S} :=$ $$\left(\mathbb{S}, \{k_0^{*(\tau,\kappa,\iota)}, k_1^{*(\tau,\kappa,\iota)}, \ldots, k_L^{*(\tau,\kappa,\iota)}\}_{\tau=1,\ldots,m;\kappa=0,\ldots,f_\tau;\iota=0,1}\right).$$

The process of the Enc algorithm will be described with reference to FIG. 10.

The processes of (S301) through (S302) and of (S304) are the same as those in Embodiment 2.

(S303: Cipher Element Generation Step)

With the processing device, an encrypted data generation part 230 generates an element $c_0^{(\tau,\kappa,\iota)}$ of a ciphertext $ct_\Gamma$, as indicated in Formula 161.

[Formula 161]
$$\omega, \zeta \xleftarrow{U} \mathbb{F}_q,$$

$$\vec{\varphi}_0 \xleftarrow{U} \mathbb{F}_q^{z_0-1},$$

$$c_0^{(\tau,\kappa,\iota)} := \left(\overbrace{\omega, 0, \ldots, 0}^{n_0}, \overbrace{0, \ldots, 0}^{u_0}, \overbrace{0, \ldots, 0}^{w_0}, \overbrace{\vec{\varphi}_0, \zeta}^{z_0}\right) \mathbb{B}_0^{(\tau,\kappa,\iota)}$$

With the processing device, concerning each integer t included in attribute information Γ, the encrypted data generation part 230 generates an element $c_t^{(\tau,\kappa,\iota)}$ of the ciphertext $ct_\Gamma$, as indicated in Formula 162.

[Formula 162]
$$\vec{\varphi}_t \xleftarrow{U} \mathbb{F}_q^{z_t} \text{ for } (t, \vec{x}_t) \in \Gamma,$$

$$c_t^{(\tau,\kappa,\iota)} := \left(\overbrace{\omega \vec{x}_t, 0, \ldots, 0}^{n_t}, \overbrace{0, \ldots, 0}^{u_t}, \overbrace{0, \ldots, 0}^{w_t}, \overbrace{\vec{\varphi}_t}^{z_t}\right) \mathbb{B}_t^{(\tau,\kappa,\iota)}$$

With the processing device, the encrypted data generation part 230 generates an element $c_{d+1}$ of the ciphertext $ct_\Gamma$, as indicated in Formula 163.

$$c_{d+1} := g_T^\zeta msg \qquad \text{[Formula 163]}$$

In brief, from (S301) through (S303), the encryption device 200 generates the ciphertext $ct_\Gamma$ by executing the Enc algorithm indicated in Formula 164. Then, in (S304), the encryption device 200 transmits the generated ciphertext $ct_\Gamma$ to the decryption device 300.

[Formula 164]
$$Enc(pk, msg, \Gamma := \{(t, \vec{x}_t) \mid 1 \le t \le d\}):$$

$$\omega, \zeta \xleftarrow{U} \mathbb{F}_q,$$

$$\vec{\varphi}_0 \xleftarrow{U} \mathbb{F}_q^{z_0-1},$$

$$\vec{\varphi}_t \xleftarrow{U} \mathbb{F}_q^{z_t} \text{ for } (t, \vec{x}_t) \in \Gamma,$$

$$c_0^{(t,\kappa,\iota)} := \left(\overbrace{\omega, 0, \ldots, 0}^{n_0}, \overbrace{0, \ldots, 0}^{u_0}, \overbrace{0, \ldots, 0}^{w_0}, \overbrace{\vec{\varphi}_0, \zeta}^{z_0}\right) \mathbb{B}_0^{(\tau,\kappa,\iota)},$$

$$c_t^{(t,\kappa,\iota)} := \left(\overbrace{\omega \vec{x}_t, 0, \ldots, 0}^{n_t}, \overbrace{0, \ldots, 0}^{u_t}, \overbrace{0, \ldots, 0}^{w_t}, \overbrace{\vec{\varphi}_t}^{z_t}\right) \mathbb{B}_t^{(\tau,\kappa,\iota)},$$

-continued for $(t, \vec{x}_t) \in \Gamma$, $$c_{d+1} := g_T^\zeta msg,$$

return $ct_\Gamma := (\Gamma, c_0, \{c_t\}_{(t,\vec{x}_t) \in \Gamma}, c_{d+1}).$ As described above, the encryption system 10 according to Embodiment 3 implements a functional encryption scheme in which, as compared to the functional encryption scheme described in Embodiment 2, the number of bases increases but the dimension number of each basis decreases.

The KP-FE scheme has been described above. If the KeyGen algorithm and Enc algorithm are modified as indicated in Formulas 165 to 167, the CP-FE scheme may be realized. Note that the Setup algorithm is the same between the KP-FE scheme and the CP-FE scheme. The Dec algorithm is the same as the Dec algorithm indicated in Formula 148.

[Formula 165]

$KeyGen(pk, sk, \Gamma := \{(t, \vec{x}_t) \mid 1 \le t \le d\}):$ $\omega \xleftarrow{U} \mathbb{F}_q,$ $\vec{\varphi}_0 \xleftarrow{U} \mathbb{F}_q^{w_0},$ $\vec{\varphi}_t \xleftarrow{U} \mathbb{F}_q^{w_t}$ for $(t, \vec{x}_t) \in \Gamma,$ $k_0^{*(\tau,\kappa,\iota)} := \left(\overbrace{\omega, 0, \ldots, 0}^{n_0}, \overbrace{\vec{\varphi}_0}^{u_0}, \overbrace{0, \ldots, 0}^{w_0}, \overbrace{1}^{z_0}\right)_{\mathbb{B}_0^{*(\tau,\kappa,\iota)}},$ $k_t^{*(\tau,\kappa,\iota)} := \left(\overbrace{\omega\vec{x}_t, 0, \ldots, 0}^{n_t}, \overbrace{\vec{\varphi}_t}^{u_t}, \overbrace{0, \ldots, 0}^{w_t}, \overbrace{0}^{z_t}\right)_{\mathbb{B}_t^{*(\tau,\kappa,\iota)}},$ for $(t, \vec{x}_t) \in \Gamma$, return $sk_\Gamma := (\Gamma, k_0^*, \{k_t^*\}_{(t,\vec{x}_t) \in \Gamma}).$

[Formula 166]

$Enc\left(pk, msg, \mathbb{S} := (\mathcal{A}, \mathcal{B}, d(x) = \prod_{\tau=1}^m d_\tau(x)^{f_\tau}, \rho)\right):$ $\pi_\tau \xleftarrow{U} \mathbb{F}_q, (\tau = 1, \ldots, m-1), \pi_m := -\sum_{\tau=1}^{m-1} \pi_\tau,$ $\pi_{\tau,\kappa,0} \xleftarrow{U} \mathbb{F}_q,$ $\pi_{\tau,\kappa,1} := \pi_\tau - \pi_{\tau,\kappa,0}(\tau = 1, \ldots, m; \kappa = 0, \ldots, f_\tau),$ $\chi_\tau \xleftarrow{U} \mathbb{F}_q, (\tau = 1, \ldots, m-1), \chi_m := 1 - \sum_{\tau=1}^{m-1} \chi_\tau,$ $\chi_{\tau,\kappa,0} \xleftarrow{U} \mathbb{F}_q,$ $\chi_{\tau,\kappa,1} := \chi_\tau - \chi_{\tau,\kappa,0}(\tau = 1, \ldots, m; \kappa = 0, \ldots, f_\tau),$ for $\tau = 1, \ldots, m, \kappa = 0, \ldots, f_\tau, \iota = 0, 1,$ $\mu^{(\tau,\kappa,0)} := deg(d_\tau(x)^\kappa), \mu^{(\tau,\kappa,1)} := deg(d_\tau(x)^{f_\tau - \kappa}),$ $(\kappa = 0, \ldots, f_\tau),$ $a_{i,0}^{(\tau,\kappa)} + a_{i,1}^{(\tau,\kappa)} x + \ldots + a_{i,\mu^{(\tau,\kappa,0)}-1}^{(\tau,\kappa)} x^{\mu^{(\tau,\kappa,0)}-1} :=$ $a_i(x) mod\, d_\tau(x)^\kappa,$ $b_{i,0}^{(\tau,k)} + b_{i,1}^{(\tau,k)} x + \ldots + b_{i,\mu^{(\tau,\kappa,1)}-1}^{(\tau,k)} x^{\mu^{(\tau,\kappa,1)}-1} :=$ $b_i(x) mod\, d_\tau(x)^{f_\tau - \kappa},$ $\delta_j^{(\tau,\kappa,\iota)} \xleftarrow{U} \mathbb{F}_q, (j = 0, \ldots, \mu^{(\tau,\kappa,\iota)} - 1),$ $\vec{\eta}_0^{(\tau,\kappa,\iota)} \xleftarrow{U} \mathbb{F}_q^{z_0 - 1},$ $s_0^{(\tau,\kappa,0)} := \sum_{j=0}^{\mu^{(\tau,\kappa,0)}-1} \delta_j^{(\tau,\kappa,0)} \cdot a_{0,j}^{(\tau,\kappa)},$ $s_0^{(\tau,\kappa,1)} := \sum_{j=0}^{\mu^{(\tau,\kappa,1)}-1} \delta_j^{(\tau,\kappa,1)} \cdot b_{0,j}^{(\tau,\kappa)},$

[Formula 167]

$c_0^{(\tau,\kappa,\iota)} :=$ $\left(\overbrace{s_0^{(\tau,\kappa,\iota)} + \pi_{\tau,\kappa,\iota}, 0, \ldots, 0}^{n_0}, \overbrace{0, 0, \ldots, 0}^{u_0}, \overbrace{0, \ldots, 0}^{w_0}, \overbrace{\vec{\eta}_0^{(\tau,\kappa,\iota)}}^{z_0}, \zeta\chi_{\tau,\kappa,\iota}\right)_{\mathbb{B}_0^{(\tau,\kappa,\iota)}},$ for $i = 1, \ldots, L,$ $\xi_{i,\tau,\iota} \xleftarrow{U} \mathbb{F}_q (i = 1, \ldots, L; \tau = 1, \ldots, m-1; \iota = 0, 1),$ $\xi_{i,\tau,\iota} := -\sum_{\tau=1}^{m-1} \xi_{i,\tau,\iota}(i = 1, \ldots, L; \iota = 0, 1),$ $s_i^{(\tau,\kappa,0)} := \sum_{j=0}^{\mu^{(\tau,\kappa,0)}-1} \delta_j^{(\tau,\kappa,0)} \cdot a_{i,j}^{(\tau,k)} + \xi_{i,\tau,0},$ $s_i^{(\tau,\kappa,1)} := \sum_{j=0}^{\mu^{(\tau,\kappa,1)}-1} \delta_j^{(\tau,\kappa,1)} \cdot b_{i,j}^{(\tau,k)} + \xi_{i,\tau,1},$ if $\rho(i) = (t, \vec{v}_i), \theta_i \xleftarrow{U} \mathbb{F}_q, \vec{\eta}_i \xleftarrow{U} \mathbb{F}_q^{z_t},$ $c_i^{(\tau,\kappa,\iota)} := \left(\overbrace{s_i^{(\tau,\kappa,\iota)} \vec{e}_1 + \theta_i \vec{v}_i, 0, \ldots, 0}^{n_t}, \overbrace{0, 0, \ldots, 0}^{u_t}, \overbrace{0, \ldots, 0}^{w_t}, \overbrace{\vec{\eta}_i}^{z_t}\right)_{\mathbb{B}_t^{(\tau,\kappa,\iota)}},$ if $\rho(i) = \neg (t, \vec{v}_i), \vec{\eta}_i \xleftarrow{U} \mathbb{F}_q^{z_t},$ $c_i^{(\tau,\kappa,\iota)} := \left(\overbrace{s_i^{(\tau,\kappa,\iota)} \vec{v}_i, 0, \ldots, 0}^{n_t}, \overbrace{0, 0, \ldots, 0}^{u_t}, \overbrace{0, \ldots, 0}^{w_t}, \overbrace{\vec{\eta}_i}^{z_t}\right)_{\mathbb{B}_t^{(\tau,\kappa,\iota)}},$ if $\rho(i) = p_0, \vec{\eta}_i \xleftarrow{U} \mathbb{F}_q^{z_0},$ $c_i^{(\tau,\kappa,\iota)} := \left(\overbrace{s_i^{(\tau,\kappa,\iota)}, 0, \ldots, 0}^{n_0}, \overbrace{0, 0, \ldots, 0}^{u_0}, \overbrace{0, \ldots, 0}^{w_0}, \overbrace{\vec{\eta}_i}^{z_0}\right)_{\mathbb{B}_0^{(\tau,\kappa,\iota)}},$ $c_{d+1} := g_T^\zeta msg,$ return $ct_\mathbb{S} :=$ $(\mathbb{S}, \{c_0^{(\tau,\kappa,\iota)}, c_1^{(\tau,\kappa,\iota)}, \ldots, c_L^{(\tau,\kappa,\iota)}\}_{\tau=1, \ldots, m; \kappa=0, \ldots, f_\tau; \iota=0,1},$ $c_{d+1}).$ The functional encryption scheme has been described above. If the Setup algorithm, KeyGen algorithm, and Enc algorithm are modified as indicated in Formulas 168 to 171, an attribute-based encryption scheme may be realized. With the attribute-based encryption scheme, in the Setup algorithm, $n_t$ is 2. The Dec algorithm is the same as the Dec algorithm indicated in Formula 153.

[Formula 168]

$Setup(1^\lambda):$ $(param,$ $(\mathbb{B}_t^{(\tau,\kappa,\iota)}, \mathbb{B}_t^{*(\tau,\kappa,\iota)})_{t=0,\ldots,d; \tau=1,\ldots,m; \kappa=0,\ldots, f_\tau; \iota=0,1}) \xleftarrow{R}$ $\mathcal{G}_{ob}(1^\lambda),$ for $\tau = 1, \ldots, m, \kappa = 0, \ldots, f_\tau, \iota = 0, 1,$ $\hat{\mathbb{B}}_0^{(\tau,\kappa,\iota)} := (b_{0,1}^{(\tau,\kappa,\iota)}, b_{0,n_0+u_0+w_0+1}^{(\tau,\kappa,\iota)}, \ldots, b_{0,n_0+u_0+w_0+z_0}^{(\tau,\kappa,\iota)}),$ $\hat{\mathbb{B}}_t^{(\tau,\kappa,\iota)} := (b_{t,1}^{(\tau,\kappa,\iota)}, b_{t,2}^{(\tau,\kappa,\iota)}, b_{t,n_t+u_t+w_t+1}^{(\tau,\kappa,\iota)}, \ldots, b_{t,n_t+u_t+w_t+z_t}^{(\tau,\kappa,\iota)})$ for $t = 1, \ldots, d,$ $\hat{\mathbb{B}}_0^{*(\tau,\kappa,\iota)} :=$ $(b_{0,1}^{*(\tau,\kappa,\iota)}, b_{0,1+u_0+1}^{*(\tau,\kappa,\iota)}, \ldots, b_{0,1+u_0+w_0}^{*(\tau,\kappa,\iota)}, b_{0,1+u_0+w_0+z_0}^{*(\tau,\kappa,\iota)}),$ $\hat{\mathbb{B}}_t^{*(\tau,\kappa,\iota)} := (b_{t,1}^{*(\tau,\kappa,\iota)}, b_{t,2}^{*(\tau,\kappa,\iota)}, b_{t,2+u_t+1}^{*(\tau,\kappa,\iota)}, \ldots, b_{t,2+u_t+w_t}^{*(\tau,\kappa,\iota)})$ for $t = 1, \ldots, d,$ return $pk := (1^\lambda, \{\hat{\mathbb{B}}_t\}_{t=0,\ldots,d}, param),$ $sk := \{\hat{\mathbb{B}}_t^*\}_{t=0,\ldots,d}.$ -continued $$KeyGen\left(pk, msg, \mathbb{S} := (\mathcal{A}, \mathcal{B}, d(x) = \prod_{\tau=1}^{m} d_\tau(x)^{f_\tau}, \rho)\right):$$ [Formula 169]

$$\pi_\tau \xleftarrow{U} \mathbb{F}_q, (\tau = 1, \ldots, m-1), \pi_m := -\sum_{\tau=1}^{m-1} \pi_\tau,$$

$$\pi_{\tau,\kappa,0} \xleftarrow{U} \mathbb{F}_q,$$

$$\pi_{\tau,\kappa,1} := \pi_\tau - \pi_{\tau,\kappa,0} (\tau = 1, \ldots, m; \kappa = 0, \ldots, f_\tau),$$

$$\chi_\tau \xleftarrow{U} \mathbb{F}_q, (\tau = 1, \ldots, m-1), \chi_m := 1 - \sum_{\tau=1}^{m-1} \chi_\tau,$$

$$\chi_{\tau,\kappa,0} \xleftarrow{U} \mathbb{F}_q,$$

$$\chi_{\tau,\kappa,1} := \chi_\tau - \chi_{\tau,\kappa,0} (\tau = 1, \ldots, m; \kappa = 0, \ldots, f_\tau),$$

for $\tau = 1, \ldots, m, \kappa = 0, \ldots, f_\tau, \iota = 0, 1,$ $$\mu^{(\tau,\kappa,0)} := \deg(d_\tau(x)^\kappa), \mu^{(\tau,\kappa,1)} := \deg(d_\tau(x)^{f_\tau - \kappa}),$$

$(\kappa = 0, \ldots, f_\tau),$ $$a_{i,0}^{(\tau,\kappa)} + a_{i,1}^{(\tau,\kappa)} x + \ldots + a_{i,\mu^{(\tau,\kappa,0)}-1}^{(\tau,\kappa)} x^{\mu^{(\tau,\kappa,0)}-1} :=$$

$$a_i(x) \mod d_\tau(x)^\kappa,$$

$$b_{i,0}^{(\tau,\kappa)} + b_{i,1}^{(\tau,\kappa)} x + \ldots + b_{i,\mu^{(\tau,\kappa,1)}-1}^{(\tau,\kappa)} x^{\mu^{(\tau,\kappa,1)}-1} :=$$

$$b_i(x) \mod d_\tau(x)^{f_\tau - \kappa},$$

$$\delta_j^{(\tau,\kappa,\iota)} \xleftarrow{U} \mathbb{F}_q, (j = 0, \ldots, \mu^{(\tau,\kappa,\iota)} - 1),$$

$$\vec{\eta}_0^{(\tau,\kappa,\iota)} \xleftarrow{U} \mathbb{F}_q^{w_0},$$

$$s_0^{(\tau,\kappa,0)} := \sum_{j=0}^{\mu^{(\tau,\kappa,0)}-1} \delta_j^{(\tau,\kappa,0)} \cdot a_{0,j}^{(\tau,\kappa)},$$

$$s_0^{(\tau,\kappa,1)} := \sum_{j=0}^{\mu^{(\tau,\kappa,1)}-1} \delta_j^{(\tau,\kappa,1)} \cdot b_{0,j}^{(\tau,\kappa)},$$

$$k_0^{*(\tau,\kappa,\iota)} :=$$ [Formula 170]

$$\left(\overbrace{s_0^{(\tau,\kappa,\iota)} + \pi_{\tau,\kappa,\iota}, 0, \ldots, 0}^{n_0}, \overbrace{\vec{\eta}_0^{(\tau,\kappa,\iota)}}^{u_0}, \overbrace{0, \ldots, 0}^{w_0}, \overbrace{\chi_{\tau,\kappa,\iota}}^{z_0}\right) \mathbb{B}_0^{*(\tau,\kappa,\iota)},$$

for $i = 1, \ldots, L,$ $$\xi_{i,\tau,\iota} \xleftarrow{U} \mathbb{F}_q (i = 1, \ldots, L; \tau = 1, \ldots, m-1; \iota = 0, 1),$$

$$\xi_{i,\tau,\iota} := -\sum_{\tau=1}^{m-1} \xi_{i,\tau,\iota} (i = 1, \ldots, L; \iota = 0, 1),$$

$$s_i^{(\tau,\kappa,0)} := \sum_{j=0}^{\mu^{(\tau,\kappa,0)}-1} \delta_j^{(\tau,\kappa,0)} \cdot a_{i,j}^{(\tau,\kappa)} + \xi_{i,\tau,0},$$

$$s_i^{(\tau,\kappa,1)} := \sum_{j=0}^{\mu^{(\tau,\kappa,1)}-1} \delta_j^{(\tau,\kappa,1)} \cdot b_{i,j}^{(\tau,\kappa)} + \xi_{i,\tau,1},$$

if $\rho(i) = (t, \vec{v}_i), \theta_i \xleftarrow{U} \mathbb{F}_q, \vec{\eta}_i \xleftarrow{U} \mathbb{F}_q^{w_t},$ $$k_i^{*(\tau,\kappa,\iota)} :=$$

$$\left(\overbrace{s_i^{(\tau,\kappa,\iota)} + \theta_i v_i, -\theta_i, 0, \ldots, 0}^{n_t}, \overbrace{\vec{\eta}_i, 0, \ldots, 0}^{u_t}, \overbrace{0, \ldots, 0}^{w_t}, \overbrace{0}^{z_t}\right) \mathbb{B}_t^{*(\tau,\kappa,\iota)},$$

if $\rho(i) = \neg(t, \vec{v}_i), \vec{\eta}_i \xleftarrow{U} \mathbb{F}_q^{w_t},$ $$k_i^{*(\tau,\kappa,\iota)} := \left(\overbrace{s_i^{(\tau,\kappa,\iota)} \vec{v}_i - s_i^{(\tau,\kappa,\iota)}, 0, \ldots, 0}^{n_t}, \overbrace{\vec{\eta}_i, 0, \ldots, 0}^{u_t}, \overbrace{0, \ldots, 0}^{w_t}, \overbrace{0}^{z_t}\right) \mathbb{B}_t^{*(\tau,\kappa,\iota)},$$

if $\rho(i) = p_0, \vec{\eta}_i \xleftarrow{U} \mathbb{F}_q^{w_0},$ $$k_i^{*(\tau,\kappa,\iota)} := \left(\overbrace{s_i^{(\tau,\kappa,\iota)}, 0, \ldots, 0}^{n_0}, \overbrace{0, \ldots, 0}^{u_0}, \overbrace{\vec{\eta}_i, 0, \ldots, 0}^{w_0}, \overbrace{0, \ldots, 0}^{z_0}\right) \mathbb{B}_0^{*(\tau,\kappa,\iota)},$$

return $sk_\mathbb{S} :=$ $$(\mathbb{S}, \{k_0^{*(\tau,\kappa,\iota)}, k_1^{*(\tau,\kappa,\iota)}, \ldots, k_L^{*(\tau,\kappa,\iota)}\}_{\tau=1,\ldots,m;\kappa=0,\ldots,f_\tau;\iota=0,1}).$$

$Enc(pk, msg, \Gamma := \{(t, x_t) \mid 1 \leq t \leq d\}):$ [Formula 171]

$$\omega, \zeta \xleftarrow{U} \mathbb{F}_q,$$

$$\vec{\varphi}_0 \xleftarrow{U} \mathbb{F}_q^{z_0 - 1},$$

$$\vec{\varphi}_t \xleftarrow{U} \mathbb{F}_q^{z_t} \text{ for } (t, x_t) \in \Gamma,$$

$$c_0^{(\tau,\kappa,\iota)} :=$$

$$\left(\overbrace{\omega, 0, \ldots, 0}^{n_0}, \overbrace{0, 0, \ldots, 0}^{u_0}, \overbrace{0, \ldots, 0}^{w_0}, \overbrace{\vec{\varphi}_0, \zeta}^{z_0}\right) \mathbb{B}_0^{(\tau,\kappa,\iota)},$$

$$c_t^{(\tau,\kappa,\iota)} :=$$

$$\left(\overbrace{\omega(1, x_t), 0, \ldots, 00}^{n_t}, \overbrace{0, \ldots, 0}^{u_t}, \overbrace{0, \ldots, 0}^{w_t}, \overbrace{\vec{\varphi}_t}^{z_t}\right) \mathbb{B}_t^{(\tau,\kappa,\iota)},$$

for $(t, x_t) \in \Gamma,$ $$c_{d+1} := g_T^\zeta msg,$$

return $ct_\Gamma := (\Gamma, c_0, \{c_t\}_{(t,x_t) \in \Gamma}, c_{d+1}).$

Likewise, the CP-FE scheme indicated in Formulas 165 to 167 can be altered to the attribute-based encryption scheme.

In the above explanation, $n_0+u_0+w_0+z_0$ is set in $N_0$ and $n_t+u_t+w_t+z_t$ is set in $N_t$. If, for example, $u_0=n_0$, $w_0=n_0$, and $z_0=2$, then $n_0+n_0+n_0+2=3n_0+2$ ($n_0=1$ and accordingly $N_0=5$) may be set in $N_0$. If $u_t=n_t$, $w_t=n_t$, and $z_t=1$, then $n_t+n_t+n_t+1=3n_t+1$ may be set in $N_t$.

Embodiment 4.

In Embodiments 2 and 3, for each polynomial $d_\tau(x)^{f_\tau}$ obtained by factorizing the target polynomial $d(x)$, an element which is a remainder of dividing a polynomial $a_i(x)$ by a polynomial $d_\tau(x)^\kappa$ and an element which is a remainder of dividing a polynomial $b_i(x)$ by a polynomial $d_\tau(x)^{f_\tau-\kappa}$ are treated as key elements.

In Embodiment 4, for each polynomial $d_\tau(x)^{f_\tau}$ obtained by factorizing the target polynomial $d(x)$, an element obtained by substituting a random value $\gamma$ into a polynomial $d_\tau(x)^\kappa$ and an element obtained by substituting the random value $\gamma$ into a polynomial $d_\tau(x)^{f_\tau-\kappa}$ are treated as key elements.

The configurations of a key generation device 100, an encryption device 200, and a decryption device 300 according to Embodiment 4 are respectively the same as the configurations of the key generation device 100, the encryption device 200, and the decryption device 300 according to Embodiment 2 shown in FIGS. 5 and 7.

The processes of a Setup algorithm and Enc algorithm according to Embodiment 4 are the same as the processes of the Setup algorithm and Enc algorithm according to Embodiment 2.

The process flow of the Dec algorithm according to Embodiment 4 is the same as the process flow of the Dec algorithm according to Embodiment 2 shown in FIG. 11.

Figure 12:
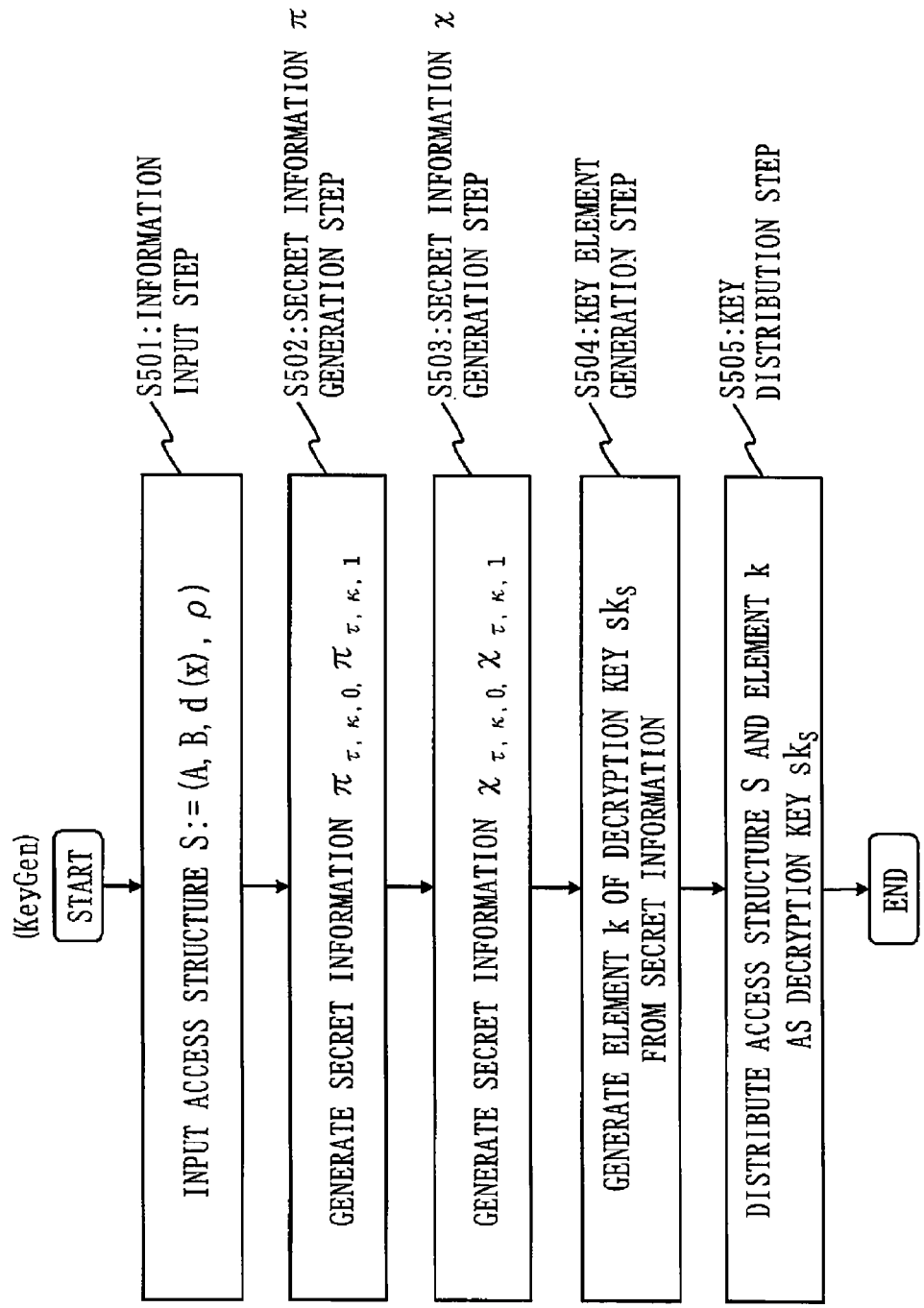
FIG. 12 is a flowchart showing the process of KeyGen algorithm according to Embodiment 4.

FIG. 12 is a flowchart showing the process of the KeyGen algorithm according to Embodiment 4.

The process of the KeyGen algorithm will be described with reference to FIG. 12.

The processes of (S501) through (S503) are the same as the processes of (S201) to (S203) shown in FIG. 9, and the process of (S505) is the same as the process of (S206) shown in FIG. 9.

(S504: Key Element Generation Step)

With the processing device, concerning each integer $\tau$ of $\tau=1\ldots, m$, each integer $\kappa$ of $\kappa=0$, f each integer $\iota$ of $\iota=0, 1$, and each integer $j$ of $j=1, \ldots, \mu+1$, a key element generation part 142 generates elements $k^*_{0,j}{}^{(\tau,\kappa,\iota)}$ and $k^*_{0,\mu+1}{}^{(\tau,\kappa,\iota)}$ of a decryption key $sk_s$, as indicated in Formula 172.

$$\gamma \xleftarrow{U} \mathbb{F}_q, \vec{\eta}_{0,0}, \ldots, \vec{\eta}_{0,\mu+1} \xleftarrow{U} \mathbb{F}_q^{w_0},$$ [Formula 172]

$$k_{0,j}^{*(\tau,\kappa,0)} :=$$

$$\left( \overbrace{\delta(\gamma^j \cdot d_\tau(\gamma)^\kappa, \vec{e}_{0,j}^{(\tau,\kappa,0)})}^{n_0}, \overbrace{0, \ldots, 0}^{u_0}, \overbrace{\vec{\eta}_{0,j}}^{w_0}, \overbrace{0, \ldots 0}^{z_0} \right) \mathbb{B}_0^*,$$

$$k_{0,j}^{*(\tau,\kappa,1)} :=$$

$$\left( \overbrace{\delta(\gamma^j \cdot d_\tau(\gamma)^{f_\tau - \kappa}, \vec{e}_{0,j}^{(\tau,\kappa,1)})}^{n_0}, \overbrace{0, \ldots, 0}^{u_0}, \overbrace{\vec{\eta}_{0,j}}^{w_0}, \overbrace{0, \ldots 0}^{z_0} \right) \mathbb{B}_0^*,$$

$$s_0 := -a_0(\gamma) \text{ if } \iota = 0, s_0 := -b_0(\gamma) \text{ if } \iota = 1,$$

$$k_{0,\mu+1}^{*(\tau,\kappa,\iota)} :=$$

$$\left( \overbrace{\delta(s_0 + \pi_{\tau,\kappa,\iota}, \vec{e}_{0,\mu+1}^{(\tau,\kappa,\iota)})}^{n_0}, \overbrace{0, \ldots, 0}^{u_0}, \overbrace{\vec{\eta}_{0,\mu+1}}^{w_0}, \overbrace{0, \ldots 0}^{z_0}, \chi_{\tau,\kappa,\iota} \right) \mathbb{B}_0^*$$

With the processing device, concerning each integer $\tau$ of $\tau=1\ldots, m$, each integer $\kappa$ of $\kappa=0, \ldots, f_\tau$, each integer $\iota$ of $\iota=0, 1$, and each integer $i$ of $i=1, \ldots, L$, the key element generation part 142 generates an element $k^{*(\tau,\kappa,\iota)}_i$ of the decryption key $sk$ as indicated in Formula 173.

$$\xi_{i,\tau,\iota} \xleftarrow{U} \mathbb{F}_q (i = 1, \ldots, L; \tau = 1, \ldots, m-1; \iota = 0, 1),$$ [Formula 173]

$$\xi_{i,m,\iota} := -\sum_{\tau=1}^{m-1} \xi_{i,\tau,\iota} (i = 1, \ldots, L; \iota = 0, 1),$$

$$s_i := -a_i(\gamma) + \xi_{i,\tau,0} \text{ if } \iota = 0,$$

$$s_i := -b_i(\gamma) + \xi_{i,\tau,1} \text{ if } \iota = 1,$$

$$\text{if } \rho(i) = (t, \vec{v}_i), \theta_i \xleftarrow{U} \mathbb{F}_q, \vec{\eta}_i \xleftarrow{U} \mathbb{F}_q^{w_t},$$

$$k_i^{*(\tau,\kappa,\iota)} :=$$

$$\left( \overbrace{\delta(s_i \vec{e}_1 + \theta_i \vec{v}_i), \vec{e}_i^{(\tau,\kappa,\iota)}}^{n_t}, \overbrace{0, \ldots, 0}^{u_t}, \overbrace{\vec{\eta}_i}^{w_t}, \overbrace{0, \ldots, 0}^{z_t} \right) \mathbb{B}_t^*,$$

$$\text{if } \rho(i) = \neg (t, \vec{v}_i), \vec{\eta}_i \xleftarrow{U} \mathbb{F}_q^{w_t},$$

$$k_i^{*(\tau,\kappa,\iota)} := \left( \overbrace{\delta s_i \vec{v}_i, \vec{e}_i^{(\tau,\kappa,\iota)}}^{n_t}, \overbrace{0, \ldots, 0}^{u_t}, \overbrace{\vec{\eta}_i}^{w_t}, \overbrace{0, \ldots, 0}^{z_t} \right) \mathbb{B}_t^*,$$

Note that $\vec{e}_{0,j}^{(\tau,\kappa,\iota)}$ ($j=1, \ldots, \mu+1$) is a $2mf_{max}$-dimensional vector in which 1 is set as the coefficient for one basis vector and 0 is set as the coefficient for another basis vector, and the basis vector for which 1 is set as the coefficient is different for each $(\tau,\kappa,\iota)$.

In brief, from (S501) through (S504), the key generation device 100 generates the decryption key $sk_s$ by executing the KeyGen algorithm indicated in Formulas 174 to 175. Then, in (S505), the key generation device 100 distributes the generated decryption key $sk_s$ to the decryption device 300.

$$KeyGen\left(pk, sk, \mathbb{S} := \left(\mathcal{A}, \mathcal{B}, d(x) = \prod_{\tau=1}^{m} d_\tau(x)^{f_\tau}, \rho\right)\right):$$ [Formula 174]

$$\pi_\tau \xleftarrow{U} \mathbb{F}_q, (\tau = 1, \ldots, m-1), \pi_m := -\sum_{\tau=1}^{m-1} \pi_\tau,$$

$$\pi_{\tau,\kappa,0} \xleftarrow{U} \mathbb{F}_q,$$

-continued $$\pi_{\tau,\kappa,1} := \pi_\tau - \pi_{\tau,\kappa,0} (\tau = 1, \ldots, m; \kappa = 0, \ldots, f_\tau),$$

$$\chi_\tau \xleftarrow{U} \mathbb{F}_q, (\tau = 1, \ldots, m-1), \chi_m := 1 - \sum_{\tau=1}^{m-1} \chi_\tau,$$

$$\chi_{\tau,\kappa,0} \xleftarrow{U} \mathbb{F}_q,$$

$$\chi_{\tau,\kappa,1} := \chi_\tau - \chi_{\tau,\kappa,0} (\tau = 1, \ldots, m; \kappa = 0, \ldots, f_\tau),$$

for $\tau = 1, \ldots, m, \kappa = 0, \ldots, f_\tau, \iota = 0, 1,$ $$\gamma \xleftarrow{U} \mathbb{F}_q, \vec{\eta}_{0,0}, \ldots, \vec{\eta}_{0,\mu+1} \xleftarrow{U} \mathbb{F}_q^{w_0},$$

for $j = 0, \ldots, \mu,$ $$k_{0,j}^{*(\tau,\kappa,0)} :=$$

$$\left( \overbrace{\delta(\gamma^j \cdot d_\tau(\gamma)^\kappa, \vec{e}_{0,j}^{(\tau,\kappa,0)})}^{n_0}, \overbrace{0, \ldots, 0}^{u_0}, \overbrace{\vec{\eta}_{0,j}}^{w_0}, \overbrace{0, \ldots, 0}^{z_0} \right) \mathbb{B}_0^*,$$

$$k_{0,j}^{*(\tau,\kappa,1)} :=$$

$$\left( \overbrace{\delta(\gamma^j \cdot d_\tau(\gamma)^{f_\tau - \kappa}, \vec{e}_{0,j}^{(\tau,\kappa,1)})}^{n_0}, \overbrace{0, \ldots, 0}^{u_0}, \overbrace{\vec{\eta}_{0,j}}^{w_0}, \overbrace{0, \ldots, 0}^{z_0} \right) \mathbb{B}_0^*,$$

$$s_0 := -a_0(\gamma) \text{ if } \iota = 0, s_0 := -b_0(\gamma) \text{ if } \iota = 1,$$

$$k_{0,\mu+1}^{*(\tau,\kappa,\iota)} :=$$

$$\left( \overbrace{\delta(x_0 + \pi_{\tau,\kappa,\iota}, \vec{e}_{0,\mu+1}^{(\tau,\kappa,\iota)})}^{n_0}, \overbrace{0, \ldots, 0}^{u_0}, \overbrace{\vec{\eta}_{0,\mu+1}}^{w_0}, \overbrace{0, \ldots, 0}^{z_0}, \chi_{\tau,\kappa,\iota} \right) \mathbb{B}_0^*,$$

for $i = 1, \ldots, L,$ [Formula 175]

$$\xi_{i,\tau,\iota} \xleftarrow{U} \mathbb{F}_q (i = 1, \ldots, L; \tau = 1, \ldots, m-1; \iota = 0, 1),$$

$$\xi_{i,m,\iota} := -\sum_{\tau=1}^{m-1} \xi_{i,\tau,\iota} (i = 1, \ldots, L; \iota = 0, 1),$$

$$s_i := -a_i(\gamma) + \xi_{i,\tau,0} \text{ if } \iota = 0,$$

$$s_i := -b_i(\gamma) + \xi_{i,\tau,1} \text{ if } \iota = 1,$$

$$\text{if } \rho(i) = (t, \vec{v}_i), \theta_i \xleftarrow{U} \mathbb{F}_q, \vec{\eta}_i \xleftarrow{U} \mathbb{F}_q^{w_t},$$

$$k_i^{*(\tau,\kappa,\iota)} :=$$

$$\left( \overbrace{\delta(s_i \vec{e}_1 + \theta_i \vec{v}_i), \vec{e}_i^{(\tau,\kappa,\iota)}}^{n_t}, \overbrace{0, \ldots, 0}^{u_t}, \overbrace{\vec{\eta}_i}^{w_t}, \overbrace{0, \ldots, 0}^{z_t} \right) \mathbb{B}_t^*,$$

$$\text{if } \rho(i) = \neg (t, \vec{v}_i), \vec{\eta}_i \xleftarrow{U} \mathbb{F}_q^{w_t},$$

$$k_i^{*(\tau,\kappa,\iota)} := \left( \overbrace{\delta s_i \vec{v}_i, \vec{e}_i^{(\tau,\kappa,\iota)}}^{n_t}, \overbrace{0, \ldots, 0}^{u_t}, \overbrace{\vec{\eta}_i}^{w_t}, \overbrace{0, \ldots, 0}^{z_t} \right) \mathbb{B}_t^*,$$

$$\text{return } sk_\mathbb{S} := (\mathbb{S}, \{k_{0,0}^{*(\tau,\kappa,\iota)}, \ldots, k_{0,\mu+1}^{*(\tau,\kappa,\iota)},$$

$$k_1^{*(\tau,\kappa,\iota)}, \ldots, k_L^{*(\tau,\kappa,\iota)}\}_{\tau=1,\ldots,m;\kappa=0,\ldots,f_\tau;\iota=0,1}).$$

The process of the Dec algorithm will be described with reference to FIG. 11.

The processes of (S401) through (S404) are the same as those in Embodiment 2.

(S405: Coefficient Calculation Step)

With the processing device, a coefficient calculation part 332 of a complementary coefficient calculation part 330 calculates coefficients $(\alpha_1, \ldots, \alpha_L)$, coefficients $(\beta_1, \ldots, \beta_L)$, and a degree x with which Formula 176 is established.

$$h_{\tau,\kappa,0}(x) \cdot d_\tau(x)^\kappa = a_0(x) + \Sigma_{i=1}^L \alpha_i a_i(x), \text{ and}$$

$$h_{\tau,\kappa,1}(x) \cdot d_\tau(x)^{f_\tau-\kappa} = b_0(x) + \Sigma_{i=1}^L \beta_i b_i(x)$$ [Formula 176]

Note that $\alpha_i = 0 = \beta_i$ concerning all i not included in $I_{(\rho,\Gamma)}$. Also, $h_{\tau,\kappa,\iota}(x) := h_{\tau,\kappa,\iota,0} + h_{\tau,\kappa,\iota,1}x + \ldots h_{\tau,\kappa,\iota,\mu}x^\mu$ concerning all integers $\tau$ of $\tau=1, \ldots, m$ and all integers $\iota$ of $\iota=0, 1$.

(S406: Pairing Operation Step)

A pairing operation part 341 of a decryption part 340 generates session keys $K_{\tau,0}$ and $K_{\tau,1}$ by calculating Formula 177 with the processing device.

$$K_{\tau,0} := e\left(c_0, \sum_{j=0}^{\mu} h_{\tau,\kappa,0,j} k_{0,j}^{*(\tau,\kappa,0)}\right) \cdot e(c_0, k_{0,\mu+1}^{*(\tau,\kappa,0)}) \cdot$$ [Formula 177]

$$\prod_{i \in I_{\delta,+}} e(c_t, k_i^{*(\tau,\kappa,0)})^{\alpha_i} \cdot \prod_{i \in I_{\delta,-}} e(c_t, k_i^{*(\tau,\kappa,0)})^{\alpha_i/(\vec{v}_i \cdot \vec{x}_t)},$$

$$K_{\tau,1} := e\left(c_0, \sum_{j=0}^{\mu} h_{\tau,\kappa,1,j} k_{0,j}^{*(\tau,\kappa,1)}\right) \cdot e(c_0, k_{0,\mu+1}^{*(\tau,\kappa,1)}) \cdot$$

$$\prod_{i \in I_{\delta,+}} e(c_t, k_i^{*(\tau,\kappa,1)})^{\beta_i} \cdot \prod_{i \in I_{\delta,-}} e(c_t, k_i^{*(\tau,\kappa,1)})^{\beta_i/(\vec{v}_i \cdot \vec{x}_t)},$$

-continued where $I_{\delta,+} := \{i \in I_\delta \mid \rho(i) = (t, \vec{v}_i)\}$ and $I_{\delta,-} := \{i \in I_\delta \mid \rho(i) = \neg (t, \vec{v}_i)\}$ (S407: Message Calculation Step)

A message calculation part 342 generates a message msg' (=msg) by calculating Formula 178 with the processing device.

$$msg' := c_{d+1} \Big/ \left(\prod_{\tau=1}^{m} K_{\tau,0} K_{\tau,1}\right)$$ [Formula 178]

Note that by calculating Formula 177, $g_T^\zeta$ can be obtained, as indicated in Formula 179. Hence, by calculating Formula 178, the message msg' (=msg) m can be obtained.

$$K_{\tau,0} := e\left(c_0, \sum_{j=0}^{\mu} h_{\tau,\kappa,0,j} k_{0,j}^{*(\tau,\kappa,0)}\right) \cdot e(c_0, k_{0,\mu+1}^{*(\tau,\kappa,0)}) \cdot$$ [Formula 179]

$$\prod_{i \in I_{\delta,+}} e(c_t, k_i^{*(\tau,\kappa,0)})^{\alpha_i} \cdot \prod_{i \in I_{\delta,-}} e(c_t, k_i^{*(\tau,\kappa,0)})^{\alpha_i/(\vec{v}_i \cdot \vec{x}_t)} =$$

$$g_T^{\delta\omega\left(\sum_{j=0}^{\mu} h_{\tau,\kappa,0,j}\gamma^j \cdot d_\tau(\gamma)^\kappa\right)} \cdot g_T^{\delta\omega(-a_0(\gamma) + \pi_{\tau,\kappa,0}) + \zeta\chi_{\tau,\kappa,0}} \cdot g_T^{\delta\omega\sum_{i=1}^{L}(-\alpha_i a_i(\gamma) + \alpha_i \xi_{i,\tau,0})} =$$

$$g_T^{\delta\omega h_{\tau,\kappa,0}(\gamma) \cdot d_\tau(\gamma)^\kappa} \cdot g_T^{-\delta\omega(a_0(\gamma) + \sum_{i=1}^{L} \alpha_i a_i(\gamma))} \cdot g_T^{\delta\omega\pi_{\tau,\kappa,0} + \zeta\chi_{\tau,\kappa,0} + \sum_{i=1}^{L}\alpha_i\xi_{i,\tau,0}} =$$

$$g_T^{\delta\omega\pi_{\tau,\kappa,0} + \zeta\chi_{\tau,\kappa,0} + \sum_{i=1}^{L}\alpha_i\xi_{i,\tau,0}}$$

$$K_{\tau,1} = g_T^{\delta\omega\pi_{\tau,\kappa,1} + \zeta\chi_{\tau,\kappa,1} + \sum_{i=1}^{L}\beta_i\xi_{i,\tau,1}}$$

$$\prod_{\tau=1}^{m} K_{\tau,0} K_{\tau,1} = g_T^{\sum_{\tau=1}^{m}(\delta\omega(\pi_{\tau,\kappa,0}+\pi_{\tau,\kappa,1}) + \zeta(\chi_{\tau,\kappa,0}+\chi_{\tau,\kappa,1}) + \sum_{i=1}^{L}(\alpha_i\xi_{i,\tau,0}+\beta_i\xi_{i,\tau,1}))} =$$

$$g_T^{\omega\sum_{\tau=1}^{m}\pi_\tau + \zeta\sum_{\tau=1}^{m}\chi_\tau + \omega\sum_{i=1}^{L}\alpha_i(\sum_{\tau=1}^{m}\xi_{i,\tau,0}) + \omega\sum_{i=1}^{L}\beta_i(\sum_{\tau=1}^{m}\xi_{i,\tau,1})} = g_T^\zeta$$

In brief, from (S401) through (S407), the decryption device 300 generates the message msg' (=msg) by executing the Dec algorithm indicated in Formula 180.

Dec(pk, [Formula 180]

$sk_\mathbb{S} := (\mathbb{S}, \{k_{0,0}^{*(\tau,\kappa,\iota)}, \ldots, k_{0,\mu+1}^{*(\tau,\kappa,\iota)}, k_1^{*(\tau,\kappa,\iota)}, \ldots, k_L^{*(\tau,\kappa,\iota)}\}_{\tau=1,\ldots,m;\kappa=0,\ldots,f_\tau;\iota=0,1}),$ $ct_\Gamma := (\Gamma, c_0, \{c_t\}_{(t,\vec{x}_t) \in \Gamma}, c_{d+1}):$ if $\mathbb{S} := (\mathcal{A}, \mathcal{B}, d(x), \rho)$ accepts $\Gamma := \{(t, \vec{x}_t)\}$, then compute $I_\delta \subseteq \{1, \ldots, L\}$, $(\alpha_1, \ldots, \alpha_L)$, $(\beta_1, \ldots, \beta_L)$ and $\kappa$ with $h_{\tau,\kappa,\iota}(x) := h_{\tau,\kappa,\iota,0} + h_{\tau,\kappa,\iota,1}x + \ldots + h_{\tau,\kappa,\iota,\mu}x^\mu$ for all $\tau = 1, \ldots, m$ and $\iota = 0, 1$ such that $h_{\tau,\kappa,0}(x) \cdot d_\tau(x)^\kappa = a_0(x) + \sum_{i=1}^{L}\alpha_i a_i(x),$ and $h_{\tau,\kappa,1}(x) \cdot d_\tau(x) f_\tau^{-\kappa} = b_0(x) + \sum_{i=1}^{L}\beta_i b_i(x),$ $$K_{\tau,0} := e\left(c_0, \sum_{j=0}^{\mu} h_{\tau,\kappa,0,j} k_{0,j}^{*(\tau,\kappa,0)}\right) \cdot e(c_0, k_{0,\mu+1}^{*(\tau,\kappa,0)}) \cdot$$

$$\prod_{i \in I_{\delta,+}} e(c_t, k_i^{*(\tau,\kappa,0)})^{\alpha_i} \cdot \prod_{i \in I_{\delta,-}} e(c_t, k_i^{*(\tau,\kappa,0)})^{\alpha_i/(\vec{v}_i \cdot \vec{x}_t)},$$

-continued $$K_{\tau,1} := e\left(c_0, \sum_{j=0}^{\mu} h_{\tau,\kappa,1,j} k_{0,j}^{*(\tau,\kappa,1)}\right) \cdot e(c_0, k_{0,\mu+1}^{*(\tau,\kappa,1)}) \cdot$$

$$\prod_{i \in I_{\delta,+}} e(c_i, k_i^{*(\tau,\kappa,1)})\beta_i \cdot \prod_{i \in I_{\delta,-}} e(c_i, k_i^{*(\tau,\kappa,1)})\beta_i / (\vec{v}_i \cdot \vec{x}_t),$$

where $I_{\delta,+} := \{i \in I_\delta \mid \rho(i) = (t, \vec{v}_i)\}$ and $I_{\delta,-} := \{i \in I_\delta \mid \rho(i) = \neg(t, \vec{v}_i)\}.$ $$\text{return } msg' := c_{d+1} \Big/ \left(\prod_{\tau=1}^{m} K_{\tau,0} K_{\tau,1}\right).$$

As described above, a cryptographic system 10 according to Embodiment 4 implements the functional encryption scheme by treating the element obtained by substituting the random value $\gamma$ into the polynomial $d_\tau(x)^\kappa$ and the element obtained by substituting the random value $\gamma$ into the polynomial $d_\tau(x)^{f_\tau-\kappa}$, as key elements.

The KP-FE scheme has been described above. If the KeyGen algorithm, Enc algorithm, and Dec algorithm are modified as indicated in Formulas 181 to 184, the CP-FE scheme may be realized. Note that the Setup algorithm is the same between the KP-FE scheme and the CP-FE scheme.

[Formula 181]

$$KeyGen(pk, sk, \Gamma := \{(t, \vec{x}_t) \mid 1 \leq t \leq d\}):$$

$\omega \xleftarrow{U} \mathbb{F}_q,$ $\vec{\varphi}_0 \xleftarrow{U} \mathbb{F}_q^{w_0},$ $\vec{\varphi}_t \xleftarrow{U} \mathbb{F}_q^{w_t}$ for $(t, \vec{x}_t) \in \Gamma,$ $$k_0^* := (\overbrace{\omega, 0, \ldots, 0}^{n_0}, \overbrace{0, 0, \ldots, 0}^{u_0}, \overbrace{\vec{\varphi}_0}^{w_0}, \overbrace{0, \ldots, 0, 1}^{z_0})\mathbb{B}_0^*,$$

$$k_t^* := (\overbrace{\omega \vec{x}_t, 0, \ldots, 0}^{n_t}, \overbrace{0, \ldots, 0}^{u_t}, \overbrace{\vec{\varphi}_t}^{w_t}, \overbrace{0, \ldots, 0}^{z_t})\mathbb{B}_t^*,$$

for $(t, \vec{x}_t) \in \Gamma,$ return $sk_\Gamma := (\Gamma, k_0^*, \{k_t^*\}_{(t,\vec{x}_t) \in \Gamma}).$

[Formula 182]

$$Enc\left(pk, msg, \mathbb{S} := (\mathcal{A}, \mathcal{B}, d(x) = \prod_{\tau=1}^{m} d_\tau(x)^{f_\tau}, \rho)\right):$$

$\pi_\tau \xleftarrow{U} \mathbb{F}_q, (\tau = 1, \ldots, m-1), \pi_m := -\sum_{\tau=1}^{m-1} \pi_\tau,$ $\pi_{\tau,\kappa,0} \xleftarrow{U} \mathbb{F}_q,$ $\pi_{\tau,\kappa,1} := \pi_\tau - \pi_{\tau,\kappa,0}(\tau = 1, \ldots, m; \kappa = 0, \ldots, f_\tau),$ $\chi_\tau \xleftarrow{U} \mathbb{F}_q, (\tau = 1, \ldots, m-1), \chi_m := 1 - \sum_{\tau=1}^{m-1} \chi_\tau,$ $\chi_{\tau,\kappa,0} \xleftarrow{U} \mathbb{F}_q,$ $\chi_{\tau,\kappa,1} := \chi_\tau - \chi_{\tau,\kappa,0}(\tau = 1, \ldots, m; \kappa = 0, \ldots, f_\tau, \iota = 0, 1,$ for $\tau = 1, \ldots, m, \kappa = 0, \ldots, f_\tau, \iota = 0, 1,$ $\gamma \xleftarrow{U} \mathbb{F}_q, \vec{\eta}_{0,0}, \ldots, \vec{\eta}_{0,\mu} \xleftarrow{U} \mathbb{F}_q^{z_0}, \vec{\eta}_{0,\mu+1} \xleftarrow{U} \mathbb{F}_q^{z_0-1}$ for $j = 0, \ldots, \mu,$ $$c_{0,j}^{(\tau,\kappa,0)} := (\overbrace{\delta(\gamma^j \cdot d_\tau(\gamma)^\kappa, \vec{e}_0^{(\tau,\kappa,0)}), 0, \ldots, 0}^{n_0}, \overbrace{0,0, \ldots, 0}^{u_0}, \overbrace{0, \ldots, 0}^{w_0}, \overbrace{\vec{\eta}_{0,j}}^{z_0})\mathbb{B}_0,$$

$$c_{0,j}^{(\tau,\kappa,1)} := (\overbrace{\delta(\gamma^j \cdot d_\tau(\gamma)^{f_\tau-\kappa}, \vec{e}_0^{(\tau,\kappa,1)}), 0, \ldots, 0}^{n_0}, \overbrace{0,0, \ldots, 0}^{u_0}, \overbrace{0, \ldots, 0}^{w_0}, \overbrace{\vec{\eta}_{0,j}}^{z_0})\mathbb{B}_0,$$

$s_0 := -a_0(\gamma)$ if $\iota = 0, s_0 := -b_0(\gamma)$ if $\iota = 1,$ $$c_{0,\mu+1}^{(\tau,\kappa,\iota)} := (\overbrace{\delta(s_0 + \pi_{\tau,\kappa,\iota}, \vec{e}_0^{(\tau,\kappa,\iota)}), 0, \ldots, 0}^{n_0}, \overbrace{0,0, \ldots, 0}^{u_0}, \overbrace{0, \ldots, 0}^{w_0}, \overbrace{\vec{\eta}_{0,\mu+1}, \zeta \chi_{\tau,\kappa,\iota}}^{z_0})\mathbb{B}_0,$$

-continued

[Formula 183]

for $i = 1, \ldots, L$, $\xi_{i,\tau,\iota} \xleftarrow{U} \mathbb{F}_q (i = 1, \ldots, L; \tau = 1, \ldots, m-1; \iota = 0, 1)$, $\xi_{i,m,\iota} := -\sum_{\tau=1}^{m-1} \xi_{i,\tau,\iota} (i = 1, \ldots, L; \iota = 0, 1)$, $s_i := -a_i(\gamma) + \xi_{i,\tau,0}$ if $\iota = 0$, $s_i := -b_i(\gamma) + \xi_{i,\tau,1}$ if $\iota = 1$, if $\rho(i) = (t, \vec{v}_i)$, $\theta_i \xleftarrow{U} \mathbb{F}_q$, $\vec{\eta}_i \xleftarrow{U} \mathbb{F}_q^{z_t}$, $c_i^{(\tau,\kappa,\iota)} := (\overbrace{\delta(s_i \vec{e}_1 + \theta_i \vec{v}_i), \vec{e}_i^{(\tau,\kappa,\iota)}}^{n_t}, 0, \ldots, \overbrace{0, 0}^{u_t}, \ldots, \overbrace{0}^{w_t}, \overbrace{\vec{\eta}_i}^{z_t}) \mathbb{B}_t$, if $\rho(i) = \neg (t, \vec{v}_i)$, $\vec{\eta}_i \xleftarrow{U} \mathbb{F}_q^{z_t}$, $c_i^{(\tau,\kappa,\iota)} := (\overbrace{\delta s_i \vec{v}_i, \vec{e}_i^{(\tau,\kappa,\iota)}}^{n_t}, 0, \ldots, \overbrace{0, 0}^{u_t}, \ldots \overbrace{0}^{w_t}, \overbrace{\vec{\eta}_i}^{z_t}) \mathbb{B}_t$, $c_{d+1} := g_T^\zeta msg$, return $ct_\mathbb{S} :=$ $(\mathbb{S}, \{c_{0,0}^{(\tau,\kappa,\iota)}, \ldots, c_{0,\mu+1}^{(\tau,\kappa,\iota)}, c_1^{(\tau,\kappa,\iota)}, \ldots, c_L^{(\tau,\kappa,\iota)}\}_{\tau=1,\ldots,m;\kappa=0,\ldots,f_\tau;\iota=0,1}, c_{d+1})$.

[Formula 184]

$Dec(pk, ct_\mathbb{S} := (\mathbb{S},$ $\{c_{0,0}^{(\tau,\kappa,\iota)}, \ldots, c_{0,\mu+1}^{(\tau,\kappa,\iota)}, c_1^{(\tau,\kappa,\iota)}, \ldots, c_L^{(\tau,\kappa,\iota)}\}_{\tau=1,\ldots,m;\kappa=0,\ldots,f_\tau;\iota=0,1}, c_{d+1})$, $sk_\Gamma := (\Gamma, k_0^*, \{k_t^*\}_{(t,\vec{x}_t) \in \Gamma}))$:

if $\mathbb{S} := (\mathcal{A}, \mathcal{B}, d(x), \rho)$ accepts $\Gamma := \{(t, \vec{x}_t)\}$, then compute $I_\delta \subseteq \{1, \ldots, L\}$, $(\alpha_1, \ldots, \alpha_L)$, $(\beta_1, \ldots, \beta_L)$ and $\kappa$ with $h_{\tau,\kappa,\iota}(x) := h_{\tau,\kappa,\iota,0} + h_{\tau,\kappa,\iota,1} x + \ldots + h_{\tau,\kappa,\iota,\mu} x^\mu$ for all $\tau = 1, \ldots, m$ and $\iota = 0, 1$ such that $h_{\tau,\kappa,0}(x) \cdot d_\tau(x)^\kappa = a_0(x) + \sum_{i=1}^{L} \alpha_i a_i(x)$, and $h_{\tau,\kappa,1}(x) \cdot d_\tau(x) f_\tau^{-\kappa} = b_0(x) + \sum_{i=1}^{L} \beta_i b_i(x)$, $K_{\tau,0} := e\left(k_0^*, \sum_{j=0}^{\mu} h_{\tau,\kappa,0,j} c_{0,j}^{(\tau,\kappa,0)}\right) \cdot e(k_0^*, c_{0,\mu+1}^{(\tau,\kappa,0)}) \cdot$ $\prod_{i \in I_{\delta,+}} e(k_t^*, c_i^{(\tau,\kappa,0)})\alpha_i \cdot \prod_{i \in I_{\delta,-}} e(k_t^*, c_i^{(\tau,\kappa,0)})\alpha_i / (\vec{v}_i \cdot \vec{x}_t)$, $K_{\tau,1} := e\left(k_0^*, \sum_{j=0}^{\mu} h_{\tau,\kappa,1,j} c_{0,j}^{(\tau,\kappa,1)}\right) \cdot e(k_0^*, c_{0,\mu+1}^{(\tau,\kappa,1)}) \cdot$ $\prod_{i \in I_{\delta,+}} e(k_t^*, c_i^{(\tau,\kappa,1)})\beta_i \cdot \prod_{i \in I_{\delta,-}} e(k_t^*, c_i^{(\tau,\kappa,1)})\beta_i / (\vec{v}_i \cdot \vec{x}_t)$, where $I_{\delta,+} := \{i \in I_\delta \mid \rho(i) = (t, \vec{v}_i)\}$ and $I_{\delta,-} := \{i \in I_\delta \mid \rho(i) = \neg (t, \vec{v}_i)\}$.

return $msg' := c_{d+1} / \left(\prod_{\tau=1}^{m} K_{\tau,0} K_{\tau,1}\right)$.

The functional encryption scheme has been described above. If the KeyGen algorithm and Dec algorithm are modified as indicated in Formulas 185 to 187, an attribute-based encryption scheme may be realized. With the attribute-based encryption scheme, in the Setup algorithm, $n_t$ is $2mf_{max}k_{max} + 2$. The Setup algorithm is the same as the Setup algorithm indicated in Formula 149, and the Enc algorithm is the same as the Enc algorithm indicated in Formula 152.

[Formula 185]

$$KeyGen\left(pk, sk, \mathbb{S} := \left(\mathcal{A}, \mathcal{B}, d(x) = \prod_{\tau=1}^{m} d_\tau(x)^{f_\tau}, \rho\right)\right):$$

$$\pi_\tau \xleftarrow{U} \mathbb{F}_q, (\tau = 1, \ldots, m-1), \pi_m := -\sum_{\tau=1}^{m-1} \pi_\tau,$$

$$\pi_{\tau,\kappa,0} \xleftarrow{U} \mathbb{F}_q,$$

$$\pi_{\tau,\kappa,1} := \pi_\tau - \pi_{\tau,\kappa,0}(\tau = 1, \ldots, m; \kappa = 0, \ldots, f_\tau),$$

$$\chi_\tau \xleftarrow{U} \mathbb{F}_q, (\tau = 1, \ldots, m-1), \chi_m := 1 - \sum_{\tau=1}^{m-1} \chi_\tau,$$

$$\chi_{\tau,\kappa,0} \xleftarrow{U} \mathbb{F}_q,$$

$$\chi_{\tau,\kappa,1} := \chi_\tau - \chi_{\tau,\kappa,0}(\tau = 1, \ldots, m; \kappa = 0, \ldots, f_\tau),$$

for $\tau = 1, \ldots, m, \kappa = 0, \ldots, f_\tau, \iota = 0, 1,$ $$\gamma \xleftarrow{U} \mathbb{F}_q, \vec{\eta}_{0,0}, \ldots, \vec{\eta}_{0,\mu+1} \xleftarrow{U} \mathbb{F}_q^{w_0},$$

for $j = 0, \ldots, \mu,$ $$k_{0,j}^{*(\tau,\kappa,0)} := \left(\overbrace{\delta(\gamma^j \cdot d_\tau(\gamma)^\kappa, \vec{e}_0^{(\tau,\kappa,0)})}^{n_0}, \overbrace{0, \ldots, 0}^{u_0}, \overbrace{\vec{\eta}_{0,j}}^{w_0}, \overbrace{0, \ldots, 0}^{z_0}\right)\mathbb{B}_0^*,$$

$$k_{0,j}^{*(\tau,\kappa,1)} := \left(\overbrace{\delta(\gamma^j \cdot d_\tau(\gamma)^{f_\tau-\kappa}, \vec{e}_0^{(\tau,\kappa,1)})}^{n_0}, \overbrace{0, \ldots, 0}^{u_0}, \overbrace{\vec{\eta}_{0,j}}^{w_0}, \overbrace{0, \ldots, 0}^{z_0}\right)\mathbb{B}_0^*,$$

$s_0 := -a_0(\gamma)$ if $\iota = 0$, $s_0 := -b_0(\gamma)$ if $\iota = 1$, $$k_{0,\mu+1}^{*(\tau,\kappa,\iota)} := \left(\overbrace{\delta(s_0 + \pi_{\tau,\kappa,\iota}, \vec{e}_0^{(\tau,\kappa,\iota)})}^{n_0}, \overbrace{0, \ldots, 0}^{u_0}, \overbrace{\vec{\eta}_{0,\mu+1}}^{w_0}, \overbrace{0, \ldots, 0, \chi_{\tau,\kappa,\iota}}^{z_0}\right)\mathbb{B}_0^*,$$

for $i = 1, \ldots, L,$ [Formula 186]

$$\xi_{i,\tau,\iota} \xleftarrow{U} \mathbb{F}_q (i = 1, \ldots, L; \tau = 1, \ldots, m-1; \iota = 0, 1),$$

$$\xi_{i,m,\iota} := -\sum_{\tau=1}^{m-1} \xi_{i,\tau,\iota} (i = 1, \ldots, L; \iota = 0, 1),$$

$s_i := -a_i(\gamma) + \xi_{i,\tau,0}$ if $\iota = 0,$ $s_i := -b_i(\gamma) + \xi_{i,\tau,1}$ if $\iota = 1,$ if $\rho(i) = (t, v_i), \theta_i \xleftarrow{U} \mathbb{F}_q, \vec{\eta}_i \xleftarrow{U} \mathbb{F}_q^{w_t},$ $$k_i^{*(\tau,\kappa,\iota)} := \left(\overbrace{\delta(s_i + \theta_i v_i, -\theta_i, \vec{e}_i^{(\tau,\kappa,\iota)})}^{n_t}, \overbrace{0, \ldots, 0}^{u_t}, \overbrace{\vec{\eta}_i}^{w_t}, \overbrace{0, \ldots, 0}^{z_t}\right)\mathbb{B}_t^*,$$

if $\rho(i) = \neg(t, v_i), \vec{\eta}_i \xleftarrow{U} \mathbb{F}_q^{w_t},$ $$k_i^{*(\tau,\kappa,\iota)} := \left(\overbrace{\delta(s_i v_i, s_i, \vec{e}_i^{(\tau,\kappa,\iota)})}^{n_t}, \overbrace{0, \ldots, 0}^{u_t}, \overbrace{\vec{\eta}_i}^{w_t}, \overbrace{0, \ldots, 0}^{z_t}\right)\mathbb{B}_t^*,$$

return $sk_\mathbb{S} :=$ $$\left(\mathbb{S}, \{k_{0,0}^{*(\tau,\kappa,\iota)}, \ldots, k_{0,\mu+1}^{*(\tau,\kappa,\iota)}, k_1^{*(\tau,\kappa,\iota)}, \ldots, k_L^{*(\tau,\kappa,\iota)}\}_{\tau=1,\ldots,m;\kappa=0,\ldots,f_\tau;\iota=0,1}\right).$$

$Dec(pk, sk_\mathbb{S} :=$ [Formula 187]

$$\left(\mathbb{S}, \{k_{0,0}^{*(\tau,\kappa,\iota)}, \ldots, k_{0,\mu+1}^{*(\tau,\kappa,\iota)}, k_1^{*(\tau,\kappa,\iota)}, \ldots, k_L^{*(\tau,\kappa,\iota)}\}_{\tau=1,\ldots,m;\kappa=0,\ldots,f_\tau;\iota=0,1}\right),$$

$ct_\Gamma := (\Gamma, c_0, \{c_t\}_{(t,x_t)\in\Gamma}, c_{d+1})):$ if $\mathbb{S} := (\mathcal{A}, \mathcal{B}, d(x), \rho)$ accepts $\Gamma := \{(t, x_t)\},$ -continued then compute $I_\delta \subseteq \{1, \ldots, L\}$, $(\alpha_1, \ldots, \alpha_L)$, $(\beta_1, \ldots, \beta_L)$ and $\kappa$ with $h_{\tau,\kappa,\iota}(x) := h_{\tau,\kappa,\iota,0} + h_{\tau,\kappa,\iota,1}x + \ldots + h_{\tau,\kappa,\iota,\mu}x^\mu$ for all $\tau = 1, \ldots, m$ and $\iota = 0, 1$ such that $$h_{\tau,\kappa,0}(x) \cdot d_\tau(x)^\kappa = a_0(x) + \sum_{i=1}^{L} \alpha_i a_i(x), \text{ and}$$

$$h_{\tau,\kappa,1}(x) \cdot d_\tau(x) f_\tau^{-\kappa} = b_0(x) + \sum_{i=1}^{L} \beta_i b_i(x),$$

$$K_{\tau,0} := e\left(c_0, \sum_{j=0}^{\mu} h_{\tau,\kappa,0,j} k_{0,j}^{*(\tau,\kappa,0)}\right) \cdot e(c_0, k_{0,\mu+1}^{*(\tau,\kappa,0)}) \cdot$$

$$\prod_{i \in I_{\delta,+}} e(c_t, k_i^{*(\tau,\kappa,0)})\alpha_i \cdot \prod_{i \in I_{\delta,-}} e(c_t, k_i^{*(\tau,\kappa,0)})\alpha_i/(v_i \cdot x_t),$$

$$K_{\tau,1} := e\left(c_0, \sum_{j=0}^{\mu} h_{\tau,\kappa,1,j} k_{0,j}^{*(\tau,\kappa,1)}\right) \cdot e(c_0, k_{0,\mu+1}^{*(\tau,\kappa,1)}) \cdot$$

$$\prod_{i \in I_{\delta,+}} e(c_t, k_i^{*(\tau,\kappa,1)})\beta_i \cdot \prod_{i \in I_{\delta,-}} e(c_t, k_i^{*(\tau,\kappa,1)})\beta_i/(v_i \cdot x_t),$$

where $I_{\delta,+} := \{i \in I_\delta \mid \rho(i) = (t, v_i)\}$ and
$I_{\delta,-} := \{i \in I_\delta \mid \rho(i) = \neg (t, v_i)\}$.

$$\text{return } msg' := c_{d+1} \Big/ \left(\prod_{\tau=1}^{m} K_{\tau,0} K_{\tau,1}\right).$$

By conducting the same modification, the CP-FE scheme indicated in Formulas 181 to 184 can be altered to the attribute-based encryption scheme.

In the above explanation, $n_0 + u_0 + w_0 + z_0$ is set in $N_0$ and $n_t + u_t + w_t + z_t$ is set in $N_t$. K for example, $u_0 = n_0$, $w_0 = n_0$, and $z_0 = 2$, then $n_0 + n_0 + n_0 + 2 = 3n_0 + 2$ may be set in $N_0$. If $u_t = n_t$, $w_t = n_t$, and $z_t = 2$, then $n_t + n + n_t + 2 = 3n_t + 2$ may be set in $N_t$.

The above explanation presents a functional encryption scheme in which, as with the functional encryption scheme according to Embodiment 2, the length of the decryption key and ciphertext increases but the number of bases decreases. Based on the functional encryption scheme according to Embodiments 3 and 4, the functional encryption scheme according to Embodiment 4 can be easily transformed into a functional encryption scheme in which the number of bases increases but the degree number of each basis decreases, as with the functional encryption scheme according to Embodiment 3.

The above embodiments explained the KP-FE scheme and the CP-FE scheme. The Unified-Policy FE (UP-FE) scheme described in Non-Patent Literature 4 can be easily constructed from the KP-FE scheme and the CP-FE scheme.

Embodiment 5.

In the above embodiments, the method of implementing the cryptographic process in the dual vector spaces has been described. In Embodiment 5, a method of implementing a cryptographic process in dual additive groups will be described.

In brief, in the above embodiments, a cryptographic primitive process is implemented in the cyclic group of the prime order q. If a ring R is expressed using a composite number M, as in Formula 188, the cryptographic process described in the above embodiments can be applied to an additive group having a ring R as a coefficient.

$$\mathbb{R} := \mathbb{Z}/M\mathbb{Z} \qquad \text{[Formula 188]}$$

where
$\mathbb{Z}$ : an integer; and
M: a composite number

If $F_q$ in the algorithm explained in the above embodiments is changed to R, the cryptographic primitive process in the dual additive group can be implemented.

In the above embodiments, from the viewpoint of security proof, $\rho(i)$ concerning each integer i of $i=1, \ldots, L$ can be limited to a positive tuple $(t, v^\rightarrow)$ or negative tuple $\neg (t, v^\rightarrow)$ for different corresponding identification information t.

In other words, let a function $\rho^\sim$ be map of $\{1, \ldots, L\} \rightarrow \{1, \ldots, d\}$ being $\rho^\sim(i)=t$ when $\rho(i)=(t, v^\rightarrow)$ or $\rho(i)=\neg (t, v^\rightarrow)$. In this case, $\rho^\sim$ may be limited to injection. Note that $\rho(i)$ is $\rho(i)$ in the access structure $S:=(M, \rho(i))$ described above.

The hardware configuration of a cryptographic processing system 10 (a key generation device 100, an encryption device 200, and a decryption device 300) in this embodiment will be described.

Figure 13:
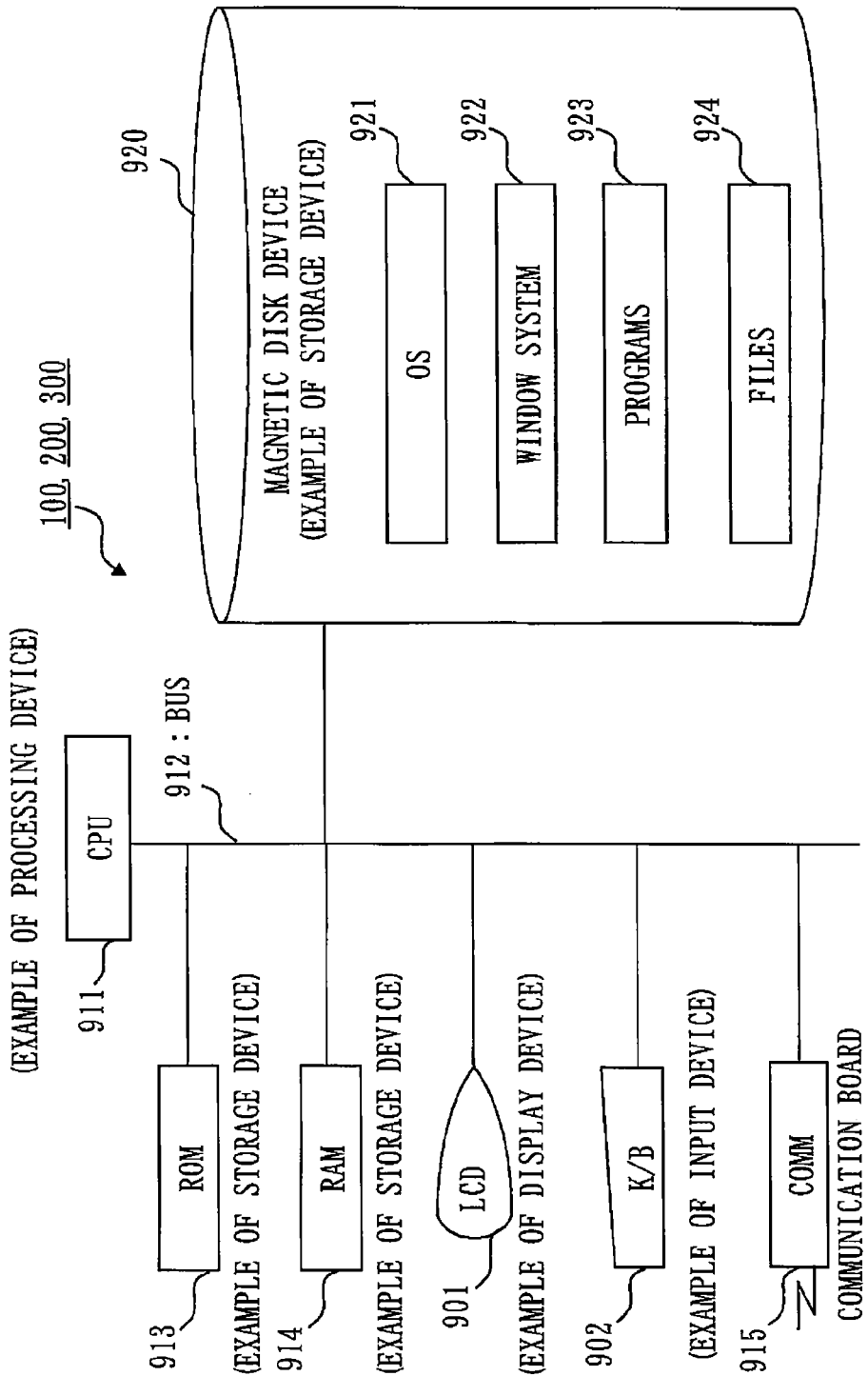
FIG. 13 is a diagram showing an example of the hardware configuration of the key generation device 100, the encryption device 200, and the decryption device 300.

FIG. 13 is a diagram showing an example of the hardware configuration of each of the key generation device 100, the encryption device 200, and the decryption device 300.

As shown in FIG. 13, each of the key generation device 100, encryption device 200, and decryption device 300 includes a CPU 911 (Central Processing Unit; also referred to as central processing device, processing device, computation device, microprocessor, microcomputer, or processor) which executes programs. The CPU 911 is connected to a ROM 913, a RAM 914, an LCD 901 (Liquid Crystal Display), a keyboard 902 (K/B), a communication board 915, and a magnetic disk device 920 via a bus 912, and controls these hardware devices. In place of the magnetic disk device 920 (fixed disk device), a storage device such as an optical disk device or memory card read/write device may be employed. The magnetic disk device 920 is connected via a predetermined fixed disk interface.

The ROM 913 and the magnetic disk device 920 are examples of a nonvolatile memory. The RAM 914 is an example of a volatile memory. The ROM 913, the RAM 914, and the magnetic disk device 920 are examples of the storage device (memory). The keyboard 902 and the communication board 915 are examples of an input device. The communication board 915 is an example of a communication device. Furthermore, the LCD 901 is an example of a display device.

The magnetic disk device 920, ROM 913, or the like stores an operating system 921 (OS), a window system 922, programs 923, and files 924. The CPU 911, the operating system 921, and the window system 922 execute each program of the programs 923.

The programs 923 store software and programs that execute the functions described as the "master key generation part 110", "master key storage part 120", "information input part 130", "decryption key generation part 140", "key distribution part 150", "public parameter acquisition part 210", "information input part 220", "encrypted data generation part 230", "data transmission part 240", "information acquisition part 310", "span program calculation part 320", "complementary coefficient calculation part 330", "decryption part 340", and the like in the above description, and other programs. The programs are read and executed by the CPU 911.

The files 924 store information, data, signal values, variable values, and parameters such as the "public parameters pk", "master secret key sk", "decryption keys $sk_v$ and $sk_\Gamma$", "ciphertexts $ct_\Gamma$ and $ct_s$", "access structure S", "attribute information", "message msg", and the like of the above explanation, as the items of a "file" and "database". The "file" and "database" are stored in a recording medium such as a disk or memory. The information, data, signal values, variable values, and parameters stored in the recording medium such as the disk or memory are read out to the main memory or cache memory by the CPU 911 through a read/write circuit, and are used for the operations of the CPU 911 such as extraction, search, look-up, comparison, computation, calculation, process, output, print, and display. The information, data, signal values, variable values, and parameters are temporarily stored in the main memory, cache memory, or buffer memory during the operations of the CPU 911 including extraction, search, look-up, comparison, computation, calculation, process, output, print, and display.

The arrows of the flowcharts in the above explanation mainly indicate input/output of data and signals. The data and signal values are recorded in the memory of the RAM 914, the recording medium such as an optical disk, or in an IC chip. The data and signals are transmitted online via a transmission medium such as the bus 912, signal lines, or cables; or electric waves.

The "part" in the above explanation may be a "circuit", "device", "equipment", "means" or "function"; or a "step", "procedure", or "process". The "device" may be a "circuit", "equipment", "means", or "function"; or a "step", "procedure", or "process". The "process" may be a "step". Namely, the "part" may be implemented by firmware stored in the ROM 913. Alternatively, the "part" may be implemented by only software; by only hardware such as an element, a device, a substrate, or a wiring line; by a combination of software and hardware; or furthermore by a combination of software, hardware, and firmware. The firmware and software are stored, as a program, in the recording medium such as the ROM 913. The program is read by the CPU 911 and executed by the CPU 911. Namely, the program causes the computer or the like to function as a "part" described above. Alternatively, the program causes the computer or the like to execute the procedure and method of the "part" described above.

REFERENCE SIGNS LIST

100: key generation device; 110: master key generation part; 120: master key storage part; 130: information input part; 140: decryption key generation part; 141: secret information generation part; 142: key element generation part; 150: key distribution part; 200: encryption device; 210: public parameter acquisition part; 220: information input part; 230: encrypted data generation part; 240: data transmission part; 300: decryption device; 311: decryption key acquisition part; 312: ciphertext acquisition part; 320: span program calculation part; 330: complementary coefficient calculation part; 331: polynomial selection part; 332: coefficient calculation part; 340: decryption part; 341: pairing operation part; 342: message calculation part

The invention claimed is:

1. A cryptographic system comprising:
an encryption device; and
a decryption device, wherein
the encryption device includes
a ciphertext generation part, implemented by encryption device circuitry, which generates one of first information and second information, as a ciphertext, the first information including a polynomial d(x), a plurality of polynomials $D_i(x)$, and predicate information, and the second information including attribute information;
the decryption device includes
a polynomial selection part, implemented by circuitry, which, treating as a decryption key one of the first information and the second information not generated as the ciphertext and based on the predicate information included in the first information and the attribute information included in the second information, selects at least one polynomial $D_i(x)$ from the plurality of polynomials $D_i(x)$,
a coefficient calculation part, implemented by the circuitry, which calculates a coefficient $\Delta_i$ that enables a polynomial constituted based on a polynomial $\Delta_i D_i(x)$ to be divided out by the polynomial d(x), the polynomial $\Delta_i D_i(x)$ being obtained by multiplying the polynomial $D_i(x)$ selected by the polynomial selection part, by the coefficient $\Delta_i$, and
a decryption part, implemented by the circuitry, which decrypts the ciphertext based on the coefficient $\Delta_i$ calculated by the coefficient calculation part.

2. The cryptographic system according to claim 1,
wherein the plurality of polynomials $D_i(x)$ include a polynomial $a_i(x)$ and a polynomial $b_i(x)$ concerning each integer i of i=0, . . . , L, L being an integer of 1 or more,
wherein the polynomial selection part, based on the attribute information and the predicate information, selects a set I of an integer i out of i=1, . . . , L, thereby selecting a polynomial $a_0(x)$ and a polynomial $b_0(x)$, and the polynomial $a_i(x)$ and the polynomial $b_i(x)$ concerning the integer i included in the set I, and
wherein the coefficient calculation part calculates, as the coefficient $\Delta_i$, a coefficient $\alpha_i$ and a coefficient that enable $\beta_i$ that enable $(a_0(x)+\Sigma_{i \in I}\alpha_i a_i(x))\cdot(b_0(x)+\Sigma_{i \in I}\beta_i b_i(x))$ to be divided out by the polynomial d(x).

3. The cryptographic system according to claim 2,
wherein the polynomial d(x) is factorized into a polynomial $d_\tau(x)^{\kappa_\tau}$ where $\tau=1, \ldots$ m, m being an integer of 1 or more,
wherein the coefficient calculation part calculates the coefficient $\alpha_i$, the coefficient $\beta_i$, and a degree $\kappa_\tau$ that enable $\Pi_{\tau=1}^m d_\tau(x)^{\kappa_\tau}$ to divide out $(a_0(x)+\Sigma_{i \in I}\alpha_i a_i(x))$ and enable $\Pi_{\tau=1}^m d_{96}(x)^{f_\tau - \kappa_\tau}$ to divide out $(b_0(x)+\Sigma_{i \in I}\beta_i b_i(x))$, and
wherein the decryption part decrypts the ciphertext based on the coefficient $\alpha_i$, the coefficient $\beta_i$, and the degree $\kappa_\tau$.

4. The cryptographic system according to claim 2,
wherein the attribute information includes an attribute vector $\vec{x}_t$, concerning at least one integer t of t=1, ..., d, d being an integer of 1 or more,
wherein the predicate information includes a tuple $(t, \vec{v}_i)$ of an identifier t and a predicate vector $\vec{v}_i$ concerning each integer i of i=1, ..., L, and
wherein the polynomial selection part determines, concerning the tuple $(t, \vec{v}_i)$ concerning each integer i of i=1, ..., L, whether or not the integer i is to be included in the set I, based on whether or not an inner-product of the predicate vector $\vec{v}_i$ of the tuple and the attribute vector $\vec{x}_t$ concerning the identification information t of the tuple is 0.

5. The cryptographic system according to claim 4,
wherein the tuple $(t, \vec{v}_i)$ is related to either one of a positive tuple and a negative tuple, and
wherein the polynomial selection part, when the tuple $(t, \vec{v}_i)$ is related to the positive tuple, includes the integer i into the set I if the inner-product is 0, and when the tuple $(t, \vec{v}_i)$ is related to the negative tuple, includes the integer i into the set I if the inner-product is not 0.

6. The cryptographic system according to claim 1,
wherein the polynomial d(x) is factorized into a polynomial $d_\tau(x)^{f_\tau}$ where τ=1, ..., m, m being an integer of 1 or more,
wherein the first information includes, for each polynomial $d_\tau(x)^{f_\tau}$, an element in which information obtained by the polynomial $d_\tau(x)^{f_\tau}$ is set, and
wherein the decryption part decrypts the ciphertext based on the coefficient $\Delta_i$ and the element.

7. The cryptographic system according to claim 6,
wherein the first information includes, for each polynomial $d_\tau(x)^{f_\tau}$ and concerning each integer κ of κ=0, ..., $f_\tau$ and each integer i of i=0, ..., L, an element in which a remainder of dividing the polynomial $a_i(x)$ by a polynomial $d_\upsilon(x)^\kappa$ is set and an element in which a remainder of dividing the polynomial $b_i(x)$ by a polynomial $d_\tau(x)^{f_\tau - \kappa}$ is set.

8. The cryptographic system according to claim 6,
wherein the first information includes, for each polynomial $d_\tau(x)^{f_\tau}$, an element in which a value substituted by a predetermined value γ is set.

9. The cryptographic system according to claim 6,
wherein the decryption part carries out, based on the coefficient $\Delta_i$, a predetermined operation concerning the element in order to render information obtained from the polynomial $d_\tau(x)^{f_\tau}$ to 0, thereby decrypting the ciphertext.

10. A cryptographic method comprising:
generating, with an encryption device, as a ciphertext, one of first information and second information, the first information including a polynomial d(x), a plurality of polynomials $D_i(x)$, and predicate information, and the second information including attribute information;
treating, with a decryption device, as a decryption key, one of the first information and the second information not generated as the ciphertext and based on the predicate information included in the first information and the attribute information included in the second information, selecting at least one polynomial $D_i(x)$ from the plurality of polynomials $D_i(x)$;
calculating, with the decryption device, coefficient $\Delta_i$ that enables a polynomial constituted based on a polynomial $\Delta_i D_i(x)$ to be divided out by the polynomial d(x), the polynomial $\Delta_i D_i(x)$ being obtained by multiplying the polynomial $D_i(x)$ selected in the selecting, by the coefficient $\Delta_i$; and
decrypting, with the decryption device, the ciphertext based on the coefficient $\Delta_i$ calculated in the calculating.

11. A non-transitory computer readable medium including a cryptographic program which causes a computer to execute:
generating, as a ciphertext, one of first information and second information, the first information including a polynomial d(x), a plurality of polynomials $D_i(x)$, and predicate information, and the second information including attribute information;
treating, as a decryption key, one of the first information and the second information not generated as the ciphertext and based on the predicate information included in the first information and the attribute information included in the second information, selecting at least one polynomial $D_i(x)$ from the plurality of polynomials $D_i(x)$;
calculating a coefficient $\Delta_i$ that enables a polynomial constituted based on a polynomial $\Delta_i D_i(x)$ to be divided out by the polynomial d(x), the polynomial $\Delta_i D_i(x)$ being obtained by multiplying the polynomial $D_i(x)$ selected in the selecting, by the coefficient $\Delta_i$; and
decrypting the ciphertext based on the coefficient $\Delta_i$ calculated in the calculating.

12. A decryption device comprising:
circuitry configured to
acquire, as a ciphertext, one of first information and second information, the first information including a polynomial d(x), a plurality of polynomials $D_i(x)$, and predicate information, and the second information including attribute information, and, as a decryption key, one of the first information and the second information not acquired as the ciphertext,
based on the predicate information included in the first information and the attribute information included in the second information, the first information and the second information being generated by the circuitry, select at least one polynomial $D_i(x)$ from the plurality of polynomials $D_i(x)$,
calculate a coefficient $\Delta_i$ that enables a polynomial constituted based on a polynomial $\Delta_i D_i(x)$ to be divided out by the polynomial d(x), the polynomial $\Delta_i D_i(x)$ being obtained by multiplying the polynomial $D_i(x)$ selected by the circuitry, by the coefficient $\Delta_i$, and
decrypt the ciphertext by the decryption key based on the coefficient $\Delta_i$ calculated by the circuitry.

* * * * *